US012752572B2

(12) United States Patent
Freese et al.

(10) Patent No.: US 12,752,572 B2
(45) Date of Patent: Oct. 6, 2026

(54) CASTER HAVING STATUS INDICATOR LIGHT

(71) Applicant: Hill-Rom Services, Inc., Batesville, IN (US)

(72) Inventors: Justin Freese, Batesville, IN (US); Robert Mark Zerhusen, Cincinnati, OH (US); David C. Newkirk, Lawrenceburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 19/331,244

(22) Filed: Sep. 17, 2025

(65) Prior Publication Data

US 2026/0084463 A1 Mar. 26, 2026

Related U.S. Application Data

(60) Provisional application No. 63/697,646, filed on Sep. 23, 2024.

(51) Int. Cl.

*B60B 7/00* (2006.01)
*A61G 7/05* (2006.01)
(Continued)

(52) U.S. Cl.

CPC ............ *B60B 7/006* (2013.01); *A61G 7/0516* (2016.11); *A61G 7/0528* (2016.11); *B60B 33/0028* (2013.01); *B60B 33/0068* (2013.01); *B60B 33/0078* (2013.01); *B60B 33/021* (2013.01); *B60Q 1/0017* (2013.01); *B60Q 1/0088* (2013.01); *B60Q 1/44* (2013.01); *B60Q 1/543* (2022.05); *B60Q 1/544* (2022.05)

(58) Field of Classification Search

CPC . B60B 7/006; B60B 33/0028; B60B 33/0068; B60B 33/0078; B60B 33/021; A61G 7/0516; A61G 7/0528; A61G 2205/60; A61G 7/05; B60Q 1/0017; B60Q 1/0088; B60Q 1/44; B60Q 1/543; B60Q 1/544

USPC ............................................................ 5/600

See application file for complete search history.

(56) References Cited

U.S. PATENT DOCUMENTS 5,718,499 A * 2/1998 De Caro ................ B60Q 1/326 362/500
7,150,070 B2 * 12/2006 Donakowski ........... B60B 3/048 16/45

(Continued)

FOREIGN PATENT DOCUMENTS

CN 207466254 U 6/2018
WO 0207829 A1 1/2002

OTHER PUBLICATIONS

International Search Report and Written Opinion mailed by the ISA/US on Jan. 5, 2026, for international application No. PCT/US2025/046731 (14 pages).

*Primary Examiner* — Justin C Mikowski
*Assistant Examiner* — Luke Hall
(74) *Attorney, Agent, or Firm* — Barnes & Thornburg LLP

(57) ABSTRACT

A patient support apparatus includes a frame, a plurality of wheels, and a status indicator light assembly coupled to at least one of the plurality of wheels. The status indicator light assembly is configured to provide notice to surrounding areas regarding a status of a plurality of casters included in the plurality of wheels.

20 Claims, 23 Drawing Sheets

(51) Int. Cl.

| | |
|---|---|
| ***B60B 33/00*** | (2006.01) |
| ***B60B 33/02*** | (2006.01) |
| ***B60Q 1/00*** | (2006.01) |
| ***B60Q 1/44*** | (2006.01) |
| ***B60Q 1/50*** | (2006.01) |

(56) References Cited

U.S. PATENT DOCUMENTS

| | | | | | |
|---|---|---|---|---|---|
| 7,980,740 | B2 * | 7/2011 | Hu | A63C 17/223 | 362/544 |
| 8,322,901 | B2 * | 12/2012 | Michelotti | B60B 27/0047 | 362/500 |
| 9,486,084 | B2 * | 11/2016 | Connell | A47C 17/86 | |
| 10,383,965 | B2 * | 8/2019 | Dombrowsky | A61G 5/10 | |
| 10,787,117 | B2 * | 9/2020 | Birgen | B60Q 1/326 | |
| 11,580,792 | B1 * | 2/2023 | Kraft | G06Q 10/20 | |
| 11,623,561 | B2 * | 4/2023 | Parker | F21V 23/001 | 362/549 |
| 2005/0093254 | A1 * | 5/2005 | Chiu | A63C 17/06 | 280/11.203 |
| 2010/0077548 | A1 * | 4/2010 | Genske | A61G 7/0528 | 116/307 |
| 2014/0237721 | A1 * | 8/2014 | Lemire | A61G 7/1046 | 188/1.12 |
| 2017/0124844 | A1 * | 5/2017 | Huster | A61G 7/012 | |
| 2017/0144593 | A1 * | 5/2017 | Gascón Rivera | B60K 35/10 | |
| 2019/0024882 | A1 * | 1/2019 | Jönsson | A61G 13/104 | |

* cited by examiner

CASTER HAVING STATUS INDICATOR LIGHT

CROSS-REFERENCE TO RELATED APPLICATIONS

This application claims priority to U.S. Provisional Application No. 63/697,646 filed on Sep. 23, 2024, the entire disclosure of which is incorporated herein by reference.

BACKGROUND

The present disclosure relates to patient support apparatuses. More particularly, the present disclosure relates to patient support apparatuses having lights.

Generally, patient support apparatuses include brake systems to lock casters of the patient support apparatus. However, it may be difficult to determine the status of the brake system and the casters. If the casters are not properly locked and secured via the brake system, injury to patients or caregivers may occur. For example, injuries may occur if the patient support apparatus rolls away from the patient due to the patient entering or exiting the patient support apparatus while the casters are not locked.

Some patient support apparatuses have small colored pedals that indicate the status of the brake system. However, these small pedals may be difficult to see, especially from a distance. Thus, providing notice to caregivers regarding the status of brake systems and casters of a patient support apparatus would be beneficial.

SUMMARY

An apparatus, system, or method may comprise one or more of the features recited in the appended claims and/or the following features which, alone or in any combination, may comprise patentable subject matter:

According to the present disclosure, a patient support apparatus may be provided. The patient support apparatus may include a frame, a plurality of wheels, and a status indicator light assembly. The frame may be positioned above a floor. The plurality of wheels may be coupled to the frame. The plurality of wheels may include a plurality of casters. The status indicator light assembly may be coupled with at least one of the plurality of wheels and configured to change between a first mode in which the status indicator light assembly illuminates a first visual indicator on the at least one of the plurality of wheels in response to the plurality of casters being in a brake mode during which movement of the plurality of casters is prevented and a second mode in which the status indicator light assembly illuminates a second visual indicator different than the first visual indicator on the at least one of the plurality of wheels in response to the plurality of casters being in a non-brake mode during which the plurality of casters are free to move.

Optionally, the non-brake mode may be a neutral mode during which a wheel of each of the plurality of casters is free to rotate and a housing of each of the plurality of casters is free to swivel. The status indicator light assembly may be further configured to change to a third mode in which the status indicator light assembly illuminates a third visual indicator on the at least one of the plurality of wheels in response to the plurality of casters being in a steer mode during which the wheel of each of the plurality of casters is free to rotate and swiveling of the housing of at least one of the plurality of casters is prevented. The third visual indicator may be different than the first and second visual indicators.

Further optionally, the status indicator light assembly may be further configured to change to a fourth mode in which the status indicator light assembly illuminates a fourth visual indicator on the at least one of the plurality of wheels indicative of a patient characteristic. The fourth visual indicator may be different than the first, second, and third visual indicators.

If desired, each of the plurality of casters may include a housing and a wheel configured to rotate relative to the respective housing. The housing of each of the plurality of casters may include a body and a stem extending upwardly from the respective body toward the frame. The at least one of the plurality of wheels may be at least one of the plurality of casters, and wherein the first visual indicator and the second visual indicator may be illuminated circumferentially around the housing of the at least one of the plurality of casters on a right side and a left side of the at least one of the plurality of casters.

Alternatively, a gap may be formed between the wheel and the housing of each of the plurality of casters and the first visual indicator and the second visual indicator may emit light through the gap of the at least one of the plurality of casters. The status indicator light assembly may include a plurality of light emitting diodes arranged on an interior of the housing of the at least one of the plurality of casters. The status indicator light assembly may include a first light emitting diode arranged on an interior of the housing of the at least one of the plurality of casters adjacent a right side of the respective wheel of the at least one of the plurality of casters and a second light emitting diode arranged on the interior of the housing of the at least one of the plurality of casters adjacent a left side of the respective wheel of the at least one of the plurality of casters.

Additionally, the status indicator light assembly may include a wire connector coupled to the stem of the at least one of the plurality of casters and configured to swivel with the respective stem about a housing axis. The wire connector may include a first track extending around the housing axis and a second track extending around the housing axis radially outward of the first track relative to the housing axis. The status indicator light assembly may further include a first wire fixed to the first track on a downwardly-facing surface of the wire connector, a second wire fixed to the second track on the downwardly-facing surface of the wire connector, a third wire contacting the first track on an upwardly-facing surface of the wire connector, and a fourth wire contacting the second track on the upwardly-facing surface of the wire connector.

Optionally, the first wire and the second wire may move with the stem and the wire connector as the stem and the wire connector swivel about the housing axis and the third wire and the fourth wire may be fixed relative to the stem and the wire connector such that the third wire and the fourth wire do not move with the stem and the wire connector. The first wire may be coupled to the wire connector at a first end thereof and coupled to a light emitting diode at the second end thereof.

Further optionally, the at least one of the plurality of wheels may be at least one of the plurality of casters, and wherein the status indicator light assembly may include a wire connector located above the stem of the at least one of the plurality of casters and spaced apart from the stem of the at least one of the plurality of casters. The status indicator light assembly may further include a first wire coupled to the wire connector to extend downwardly therefrom and configured to rotate relative to the wire connector, a second wire coupled to the wire connector to extend downwardly therefrom and configured to rotate relative to the wire connector, a third wire coupled to the wire connector to extend upwardly therefrom, and a fourth wire coupled to the wire connector to extend upwardly therefrom, the third and fourth wires being fixed relative to the wire connector. The first wire may be coupled to the wire connector at a first end thereof and coupled to a light emitting diode at the second end thereof.

If desired, the at least one of the plurality of wheels may be at least one of the plurality of casters, and wherein the housing of the at least one of the plurality of casters may include a translucent portion. The first visual indicator and the second visual indicator may emit light from the translucent portion. The translucent portion of the at least one of the plurality of casters may include a first translucent portion on a right side of the at least one of the plurality of casters and a second translucent portion on a left side of the at least one of the plurality of casters. The first translucent portion and the second translucent portion may extend entirely circumferentially about a respective wheel axis of the wheel of the at least one of the plurality of casters.

Alternatively, the first translucent portion may comprise a plurality of first translucent portions that are spaced apart from one another about a respective wheel axis of the wheel of the at least one of the plurality of casters. The second translucent portion may comprise a plurality of second translucent portions that are spaced apart from one another about the respective wheel axis. The at least one of the plurality of wheels may be at least one of the plurality of casters, and wherein the status indicator light assembly may include a light emitting diode field arranged on an exterior of the body of the at least one of the plurality of casters. The status indicator light assembly may include a wire connector arranged in the stem of the at least one of the plurality of casters and configured to provide power to the light emitting diode field. The status indicator light assembly may further include an attachment piece extending between and interconnecting the wire connector and the light emitting diode field. The attachment piece may extend from an interior of the respective stem to an exterior of the respective stem via a through hole formed in the respective stem.

Additionally, the light emitting diode field may include a first light emitting diode field coupled to a right side of the body of the at least one of the plurality of casters and a second light emitting diode field coupled to a left side of the body of the at least one of the plurality of casters. The first visual indicator may be a first color and the second visual indicator may be a second color. The status indicator light assembly may be further configured to change to a third mode in which the status indicator light assembly illuminates a third visual indicator on the at least one of the plurality of wheels indicative of a patient characteristic. The third visual indicator may be different than the first and second visual indicators. The status indicator light assembly may include a receiver coupled to the at least one of the plurality of wheels and wirelessly coupled with a controller of the patient support apparatus to receive instructions therefrom, a plurality of light emitting diodes coupled to the at least one of the plurality of wheels and configured to emit light based on the instructions, and a battery coupled with the plurality of light emitting diodes to provide power to the plurality of light emitting diodes.

Optionally, the patient support apparatus may further comprise a controller in communication with the status indicator light assembly. The controller may include a processor and a memory having instructions stored therein which, when executed by the processor, cause the processor to control the status indicator light assembly to change between the first mode and the second mode in response to determining that the plurality of casters is in the brake mode or in the non-brake mode, respectively. The controller may be configured to receive a first signal from a sensor indicative of the plurality of casters being in the brake mode. In response to the first signal, the controller may change the status indicator light assembly to the first mode. The controller may be configured to receive a second signal from the sensor indicative of the plurality of casters being in the non-brake mode. In response to the second signal, the controller may change the status indicator light assembly from the first mode to the second mode.

Further according to the present disclosure, a patient support apparatus may be provided. The patient support apparatus may include a frame, a plurality of casters, and a status indicator light assembly. The frame may be positioned above a floor. The plurality of casters may be mounted to the frame. Each of the plurality of casters may include a wheel configured to rotate about a respective wheel axis and a housing coupled to the frame and configured to swivel about a respective housing axis. The status indicator light assembly may be coupled with each of the plurality of casters and configured to provide notice to surrounding areas regarding a status of the plurality of casters. The status indicator light assembly may be configured to change between a first mode in which the status indicator light assembly illuminates a first visual indicator on each of the plurality of casters in response to the plurality of casters being in a brake mode during which rotation of the wheel of each of the plurality of casters and swiveling of the housing of each of the plurality of casters is prevented and a second mode in which the status indicator light assembly illuminates a second visual indicator different than the first visual indicator on each of the plurality of casters in response to the plurality of casters being in a non-brake mode during which the wheel of each of the plurality of casters is free to rotate.

Optionally, the non-brake mode may be a neutral mode during which the wheel of each of the plurality of casters is free to rotate and the housing of each of the plurality of casters is free to swivel. The status indicator light assembly may be further configured to change to a third mode in which the status indicator light assembly illuminates a third visual indicator on each of the plurality of casters in response to the plurality of casters being in a steer mode during which the wheel of each of the plurality of casters is free to rotate and swiveling of the housing of at least one of the plurality of casters is prevented. The third visual indicator may be different than the first and second visual indicators. The status indicator light assembly may be further configured to change to a fourth mode in which the status indicator light assembly illuminates a fourth visual indicator on each of the plurality of casters indicative of a patient characteristic. The fourth visual indicator may be different than the first, second, and third visual indicators.

Further optionally, the first visual indicator and the second visual indicator may be illuminated circumferentially around the housing of each of the plurality of casters relative to the respective wheel axis on a right side and a left side of each of the plurality of casters. A gap may be formed between the wheel and the housing of each of the plurality of casters and the first visual indicator and the second visual indicator may emit light through the gap of each of the plurality of casters. The status indicator light assembly may include a plurality of light emitting diodes arranged on an interior of the housing of each of the plurality of casters. The status indicator light assembly may include a first light emitting diode arranged on an interior of the housing of each of the plurality of casters adjacent a right side of the respective wheel of each of the plurality of casters and a second light emitting diode arranged on the interior of the housing of each of the plurality of casters adjacent a left side of the respective wheel of each of the plurality of casters. The housing of each of the plurality of casters may include a body and a stem extending upwardly from the respective body toward the frame.

If desired, the status indicator light assembly may include a wire connector coupled to the stem of each of the plurality of casters and configured to swivel with the respective stem about the housing axis. The wire connector may include a first track extending around the housing axis and a second track extending around the housing axis radially outward of the first track relative to the housing axis. The status indicator light assembly may further include a first wire fixed to the first track on a downwardly-facing surface of the wire connector, a second wire fixed to the second track on the downwardly-facing surface of the wire connector, a third wire contacting the first track on an upwardly-facing surface of the wire connector, and a fourth wire contacting the second track on the upwardly-facing surface of the wire connector.

Alternatively, the first wire and the second wire may move with the stem and the wire connector as the stem and the wire connector swivel about the housing axis and the third wire and the fourth wire may be fixed relative to the stem and the wire connector such that the third wire and the fourth wire do not move with the stem and the wire connector. The first wire may be coupled to the wire connector at a first end thereof and coupled to a light emitting diode at the second end thereof. The status indicator light assembly may include a wire connector located above the stem of each of the plurality of casters and spaced apart from the stem of each of the plurality of casters. The status indicator light assembly may further include a first wire coupled to the wire connector to extend downwardly therefrom and configured to rotate relative to the wire connector, a second wire coupled to the wire connector to extend downwardly therefrom and configured to rotate relative to the wire connector, a third wire coupled to the wire connector to extend upwardly therefrom, and a fourth wire coupled to the wire connector to extend upwardly therefrom, the third and fourth wires being fixed relative to the wire connector.

Additionally, the housing of each of the plurality of casters may include a translucent portion. The first visual indicator and the second visual indicator may emit light from the translucent portion. The translucent portion of each of the plurality of casters may include a first translucent portion on a right side of each of the plurality of casters and a second translucent portion on a left side of each of the plurality of casters. The first translucent portion and the second translucent portion may extend entirely circumferentially about the respective wheel axis of the wheel of each of the plurality of casters. The first translucent portion may comprise a plurality of first translucent portions that are spaced apart from one another about the respective wheel axis of the wheel of each of the plurality of casters. The second translucent portion may comprise a plurality of second translucent portions that are spaced apart from one another about the respective wheel axis.

Optionally, the status indicator light assembly may include a light emitting diode field arranged on an exterior of the housing of each of the plurality of casters. The light emitting diode field may include a first light emitting diode field coupled to a right side of the housing of each of the plurality of casters and a second light emitting diode field coupled to a left side of the housing of each of the plurality of casters. The first visual indicator may be a first color and the second visual indicator may be a second color.

Further optionally, the patient support apparatus may further comprise a controller in communication with the status indicator light assembly. The controller may include a processor and a memory having instructions stored therein which, when executed by the processor, cause the processor to control the status indicator light assembly to change between the first mode and the second mode in response to determining that the plurality of casters is in the brake mode or in the non-brake mode, respectively. The controller may be configured to receive a first signal from a sensor indicative of the plurality of casters being in the brake mode, and, in response to the first signal, the controller may change the status indicator light assembly to the first mode. The controller may be configured to receive a second signal from the sensor indicative of the plurality of casters being in the non-brake mode, and, in response to the second signal, the controller may change the status indicator light assembly from the first mode to the second mode.

Further according to the present disclosure, a patient support apparatus is provided. The patient support apparatus may include a frame, a siderail, a plurality of wheels, and a status indicator light assembly. The frame may be positioned above a floor. The siderail may be coupled to the frame and moveable between a raised position and a lowered position. The plurality of wheels may be coupled to the frame. The plurality of wheels may include a plurality of casters. The plurality of casters may be moveable between a brake mode in which movement of the plurality of casters is prevented and a non-brake mode in which movement of the plurality of casters is permitted. The status indicator light assembly may be coupled with each of the plurality of wheels and configured to change between a first mode in which the status indicator light assembly illuminates a first visual indicator on each of the plurality of wheels in response to a plurality of safety features of the patient support apparatus being enabled and a second mode in which the status indicator light assembly illuminates a second visual indicator different than the first visual indicator on each of the plurality of wheels in response to at least one of the plurality of safety features of the patient support apparatus being disabled. The plurality of safety features may include the plurality of casters, the siderail, and/or the frame.

Optionally, the plurality of casters may be enabled when the plurality of casters is in the brake mode, and the plurality of casters may be disabled when the plurality of casters is in the non-brake mode. The siderail may be enabled when the siderail is in the raised position during which the siderail extends above an upper surface of a mattress of the patient support apparatus. The siderail may be disabled when the siderail is in the lowered position during which the siderail does not extend above the upper surface of the mattress. The status indicator light assembly may include a plurality of light emitting diodes and an inductive receiver coupled to the plurality of light emitting diodes and configured to provide power to the plurality of light emitting diodes.

Further optionally, the frame may include an upper frame and a lower frame arranged between the upper frame and the floor. The frame may be enabled when the upper frame is in a lowered position relative to the lower frame. The frame may be disabled when the upper frame is in a raised position relative to the lower frame. The status indicator light assembly may be further configured to change to a third mode in which the status indicator light assembly illuminates a third visual indicator on at least one of the plurality of wheels indicative of a patient characteristic. The third visual indicator may be different than the first and second visual indicators. The first visual indicator may be a first color, the second visual indicator may be a second color, and the third visual indicator may be a third color.

If desired, each of the plurality of casters may include a wheel configured to rotate about a respective wheel axis and a housing coupled to the frame and configured to swivel about a respective housing axis. The first visual indicator and the second visual indicator may be illuminated circumferentially around the housing of each of the plurality of casters relative to the respective wheel axis on a right side and a left side of each of the plurality of casters. A gap may be formed between the wheel and the housing of each of the plurality of casters and the first visual indicator and the second visual indicator may emit light through the gap of each of the plurality of casters.

Alternatively, the status indicator light assembly may include a plurality of light emitting diodes arranged on an interior of the housing of each of the plurality of casters. The status indicator light assembly may include a first light emitting diode arranged on an interior of the housing of each of the plurality of casters adjacent a right side of the respective wheel of each of the plurality of casters and a second light emitting diode arranged on the interior of the housing of each of the plurality of casters adjacent a left side of the respective wheel of each of the plurality of casters. The housing of each of the plurality of casters may include a body and a stem extending upwardly from the respective body toward the frame.

Additionally, the status indicator light assembly may include a wire connector coupled to the stem of each of the plurality of casters and configured to swivel with the respective stem about the housing axis. The wire connector may include a first track extending around the housing axis and a second track extending around the housing axis radially outward of the first track relative to the housing axis. The status indicator light assembly may further include a first wire fixed to the first track on a downwardly-facing surface of the wire connector, a second wire fixed to the second track on the downwardly-facing surface of the wire connector, a third wire contacting the first track on an upwardly-facing surface of the wire connector, and a fourth wire contacting the second track on the upwardly-facing surface of the wire connector. The first wire and the second wire may move with the stem and the wire connector as the stem and the wire connector swivel about the housing axis and the third wire and the fourth wire may be fixed relative to the stem and the wire connector such that the third wire and the fourth wire do not move with the stem and the wire connector.

Optionally, the status indicator light assembly may include a wire connector located above the stem of each of the plurality of casters and spaced apart from the stem of each of the plurality of casters. The housing of each of the plurality of casters may include a translucent portion. The first visual indicator and the second visual indicator may emit light from the translucent portion. The translucent portion of each of the plurality of casters may include a first translucent portion on a right side of each of the plurality of casters and a second translucent portion on a left side of each of the plurality of casters.

Further optionally, the status indicator light assembly may include a light emitting diode field arranged on an exterior of the housing of each of the plurality of casters. The light emitting diode field may include a first light emitting diode field coupled to a right side of the housing of each of the plurality of casters and a second light emitting diode field coupled to a left side of the housing of each of the plurality of casters. The patient support apparatus may further comprise a controller in communication with the status indicator light assembly. The controller may include a processor and a memory having instructions stored therein which, when executed by the processor, cause the processor to control the status indicator light assembly to change between the first mode and the second mode in response to determining that the plurality of safety features is enabled or at least one of the plurality of safety features is disabled.

Further according to the present disclosure, a patient support apparatus is provided. The patient support apparatus may include a frame, a plurality of casters, a status indicator light assembly, and a controller. The frame may be positioned above a floor. The plurality of casters may be mounted to the frame. Each of the plurality of casters may include a wheel configured to rotate about a respective wheel axis and a housing coupled to the frame and configured to swivel about a respective housing axis. The status indicator light assembly may be coupled with each of the plurality of casters and configured to change between a first mode in which the status indicator light assembly illuminates a first visual indicator on each of the plurality of casters in response to the plurality of casters being in a brake mode during which rotation of the wheel of each of the plurality of casters and swiveling of the housing of each of the plurality of casters is prevented and a second mode in which the status indicator light assembly illuminates a second visual indicator different than the first visual indicator on each of the plurality of casters in response to the plurality of casters being in a non-brake mode during which the wheel of each of the plurality of casters is free to rotate. The controller may be in communication with the status indicator light assembly. The controller may include a processor and a memory having instructions stored therein which, when executed by the processor, cause the processor to control the status indicator light assembly to change between the first mode and the second mode in response to determining that the plurality of casters is in the brake mode or in the non-brake mode, respectively.

Optionally, the controller may be configured to receive a first signal from a sensor indicative of the plurality of casters being in the brake mode. In response to the first signal, the controller may change the status indicator light assembly to the first mode. The controller may be configured to receive a second signal from the sensor indicative of the plurality of casters being in the non-brake mode. In response to the second signal, the controller may change the status indicator light assembly from the first mode to the second mode.

Further according to the present disclosure, a controller is provided. The controller may include a processor and a memory. The memory may have instructions stored therein executable by the processor to cause the processor to (a) determine a status of a plurality of casters included in a patient support apparatus and (b) in response to determining that the plurality of casters is in a non-brake mode, outputting a signal to a status indicator light assembly coupled with each of the plurality of casters to cause the status indicator light assembly to change from a first mode in which the status indicator light assembly illuminates a first visual indicator on each of the plurality of casters to a second mode in which the status indicator light assembly illuminates a second visual indicator different than the first visual indicator on each of the plurality of casters.

Optionally, the instructions stored in the memory may further include instructions executable by the processor to cause the processor to output a signal to the status indicator light assembly to cause the status indicator light assembly to change from the second mode to the first mode in response to the controller determining that the plurality of casters is in a brake mode.

Further according to the present disclosure, a method is provided. The method may include coupling a status indicator light assembly to a plurality of wheels of a patient support apparatus. The method may include determining a status of a plurality of casters included in the plurality of wheels. The method may include, in response to determining that the status of the plurality of casters is a brake mode, changing the status indicator light assembly to a first mode in which the status indicator light assembly illuminates a first visual indicator on at least one of the plurality of wheels. The method may include, in response to determining that the status of the plurality of casters is a non-brake mode, changing the status indicator light assembly from the first mode to a second mode in which the status indicator light assembly illuminates a second visual indicator on the at least one of the plurality of wheels different than the first visual indicator.

Additionally, the non-brake mode may be a neutral mode. The method may include, in response to determining that the status of the plurality of casters is a steer mode, changing the status indicator light assembly from the first mode or the second mode to a third mode in which the status indicator light assembly illuminates a third visual indicator on the at least one of the plurality of wheels different than the first and second visual indicators.

Optionally, movement of the plurality of casters may be prevented in the brake mode, a wheel of each of the plurality of casters may be free to rotate and a housing of each of the plurality of casters may be free to swivel in the neutral mode, and the wheel of each of the plurality of casters may be free to rotate and swiveling of the housing of at least one of the plurality of casters may be prevented in the steer mode. The method may include changing the status indicator light assembly to a fourth mode in which the status indicator light assembly illuminates a fourth visual indicator on the at least one of the plurality of wheels indicative of a patient characteristic, and wherein the fourth visual indicator may be different than the first, second, and third visual indicators.

Further optionally, the step of coupling may include coupling a wire connector of the status indicator light assembly to the at least one of the plurality of wheels. The wire connector may include a first track extending around a respective housing axis of the at least one of the plurality of wheels and a second track extending around the housing axis radially outward of the first track relative to the housing axis. The method may include fixing a first wire to the first track on a downwardly-facing surface of the wire connector, fixing a second wire to the second track on the downwardly-facing surface of the wire connector, contacting the first track on an upwardly-facing surface of the wire connector with a third wire, and contacting the second track on the upwardly-facing surface of the wire connector with a fourth wire.

Further according to the present disclosure, a patient support apparatus is provided. The patient support apparatus may include a lower frame, an upper frame, a first siderail, a second siderail, a plurality of casters, a status indicator light assembly, and a control system. The lower frame may be positioned above a floor. The upper frame may be supported by the lower frame and moveable between a lowered position and a raised position. The first siderail and the second siderail may be both coupled to the upper frame and may be both moveable between a lowered position and a raised position. The plurality of casters may be coupled to the lower frame and movable from a brake mode in which movement of the plurality of casters is prevented and a non-brake mode in which movement of the plurality of casters is permitted. The status indicator light assembly may be coupled with each of the plurality of casters. The control system may be configured to change the status indicator light assembly to a safe visual indicator on each of the plurality of casters in response to the plurality of casters being in the brake mode, both of the first and second siderails being in the raised position, and the upper frame being in the lowered position. The control system may be configured to change the status indicator light assembly to a caution visual indicator on each of the plurality of casters in response to at least one of the following: the plurality of casters being in the non-brake mode, at least one of the first and second siderails being in the lowered position, and the upper frame being in the raised position.

Additional features, which alone or in combination with any other feature(s), such as those listed above and/or those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The foregoing and other features of the various embodiments of the methods and apparatuses described herein will become more apparent from the following detailed description and the accompanying drawings in which:

FIG. 10 is a perspective view of an alternative caster for use with the patient support apparatus of FIG. 1 showing that a housing of the caster includes a translucent portion that the first, second, third, and fourth visual indicators emit light through;

FIG. 11 is a perspective view of an alternative caster for use with the patient support apparatus of FIG. 1 showing that the caster includes a plurality of translucent portions spaced apart from one another around a wheel axis that the first, second, third, and fourth visual indicators emit light through;

FIG. 12 is a perspective view of an alternative caster for use with the patient support apparatus of FIG. 1 showing that the caster includes a plurality of translucent portions spaced apart from one another around a wheel axis that the first, second, third, and fourth visual indicators emit light through;

FIG. 13 is a perspective view of an alternative caster for use with the patient support apparatus of FIG. 1 showing that the caster includes a translucent portion that the first, second, third, and fourth visual indicators emit light through;

FIG. 17 is a perspective view of an alternative caster for use with the patient support apparatus of FIG. 1 showing that the caster includes a translucent center that the first, second, third, and fourth visual indicators emit light through;

FIG. 25 is a perspective view of an alternative caster for use with the patient support apparatus of FIG. 1 showing that the caster includes a plurality of translucent portions spaced apart from one another around a wheel axis that the first, second, third, and fourth visual indicators emit light through;

FIG. 29 is a perspective view of an alternative wheel for use with the patient support apparatus of FIG. 1 showing that the wheel includes a translucent portion that the first, second, third, and fourth visual indicators emit light through.

DETAILED DESCRIPTION

The present disclosure relates to a patient support apparatus 10 that provides notice to caregivers in surrounding areas regarding a status of the patient support apparatus 10. For example, the patient support apparatus 10 provides notice to caregivers regarding the status of safety features of the patient support apparatus 10 as enabled or disabled. As another example, the patient support apparatus 10 provides notice to caregivers regarding the status of a plurality of casters 14 included in the patient support apparatus 10 as in a brake mode or in a non-brake mode.

Generally, patient support apparatuses include brake systems to lock the plurality of casters in the brake mode. However, it is difficult for caregivers to determine the status of the brake systems. Some brake systems include colored pedals, and a position of the colored pedals may be used by the caregivers to determine the status of the brake system. However, these colored pedals are small and may be difficult to see if the caregiver is not next to the patient support apparatus. Additionally, some patient support apparatuses include audible indicators that indicate the status of the brake systems. However, these audible indicators may be difficult to hear in a noisy environment, such as a hospital.

If the plurality of casters is not properly placed in the brake mode, injury to a patient, the caregiver, or a third party may result. For example, if the patient is entering or exiting the patient support apparatus while the plurality of casters is not in the brake mode, the patient support apparatus may roll away from the patient, which may cause instability to the patient leading to a fall.

Thus, the patient support apparatus 10 includes a status indicator light assembly 16 configured to provide notice to surrounding areas regarding the status of the plurality of casters 14 so that caregivers can determine the status of the plurality of casters 14 from a distance or at any location relative to the patient support apparatus 10.

Figure 1:
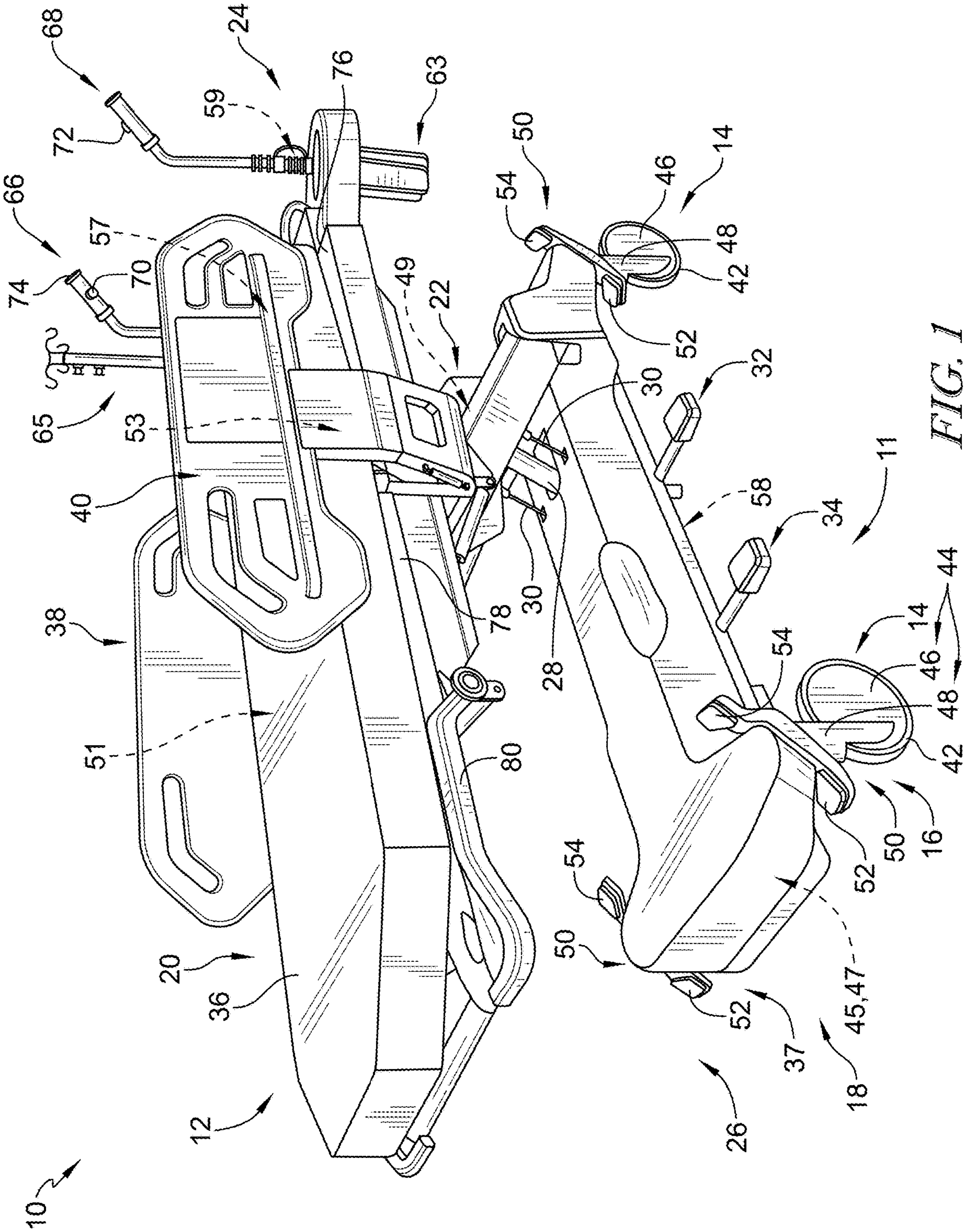
FIG. 1 is a perspective view of a patient support apparatus having a frame positioned above a floor, a plurality of wheels coupled to the frame, and a status indicator light assembly coupled with each of the plurality of wheels and configured to provide notice to surrounding areas regarding a status of the plurality of wheels.

In some embodiments, the patient support apparatus 10 is illustratively a stretcher 10, as shown in FIG. 1. In some embodiments, the patient support apparatus 10 is illustratively a hospital bed. The present disclosure is applicable to other patient support apparatuses including, for example, other types of beds, patient tables, wheel chairs, and the like. As will be described in further detail below, the present disclosure is focused primarily on various status indicator light assemblies that alert to surrounding areas the status of the plurality of casters 14 of the patient support apparatus 10.

Figure 2A:
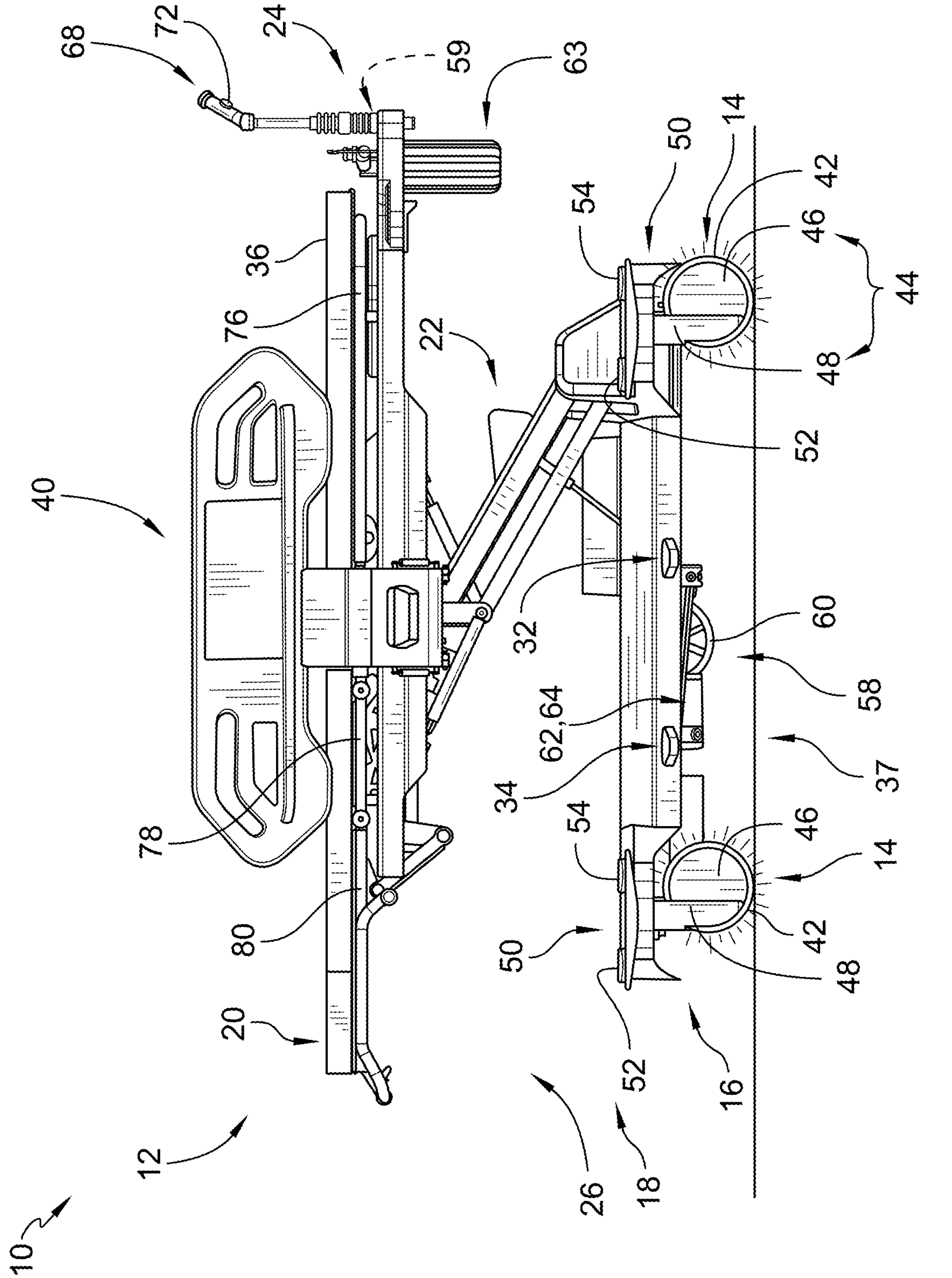
FIG. 2A is a side view of the patient support apparatus of FIG. 1 showing that the status indicator light assembly is coupled with each of the plurality of casters included in the plurality of wheels to illuminate each of the plurality of casters.

The patient support apparatus 10 includes a frame 12, a plurality of wheels 11 including the plurality of casters 14 and an auxiliary wheel 60, and the status indicator light assembly 16, as shown in FIGS. 1 and 2A. The frame 12 illustratively includes a lower frame 18 and an upper frame 20. The lower frame 18 is supported on the plurality of casters 14 and/or the auxiliary wheel 60 above a floor underlying the patient support apparatus 10. The plurality of casters 14 and/or the auxiliary wheel 60 roll along the floor as the patient support apparatus 10 is transported from one location to another. Each of the plurality of casters 14 is swivelable about substantially vertical axes, and the auxiliary wheel 60 is fixed against swiveling. The upper frame 20 is configured to support a patient thereon. The status indicator light assembly 16 is illustratively coupled with each of the plurality of wheels 11 to provide notice to surrounding areas that the plurality of casters 14 is in the brake mode or the non-brake mode.

The lower frame 18 supports a lift mechanism 22 near a head end 24 of the patient support apparatus 10, as shown in FIG. 1. The patient support apparatus 10 extends between the head end 24 and a foot end 26 thereof. The lift mechanism 22 provides cantilevered support of the upper frame 20 and is configured to raise, lower, and tilt the upper frame 20 relative to the lower frame 18 while the lift mechanism 22 is activated. The position of the lift mechanism 22 and the upper frame 20 relative to the lower frame 18 is determined by a sensor 49.

In some embodiments, the lift mechanism 22 is operated by a hydraulic cylinder 28 that is assisted by a pair of gas springs 30 as the lift mechanism 22 moves between various positions, as shown in FIG. 1. The hydraulic cylinder 28 is operated by a pedal 32, which may be acted upon by a caregiver with their foot to pump hydraulic fluid from a reservoir into the hydraulic cylinder 28 to cause the hydraulic cylinder 28 to extend and affect the movement of the lift mechanism 22. In the present embodiment, the hydraulic cylinder 28 is a single acting cylinder. To lower the lift mechanism 22, a pedal 34 may be activated by a caregiver to open a release valve between the hydraulic cylinder 28 and the reservoir to allow hydraulic fluid to be urged into the reservoir by the weight of the structure supported on the lift mechanism 22.

The upper frame 20 is supported above the lower frame 18 and configured to support a patient thereon, as suggested in FIG. 1. The upper frame 20 supports a mattress 36. The upper frame 20 also supports a right siderail 38 and a left siderail 40 of the patient support apparatus 10. The siderails 38, 40 are spaced from each other in a lateral dimension of the patient support apparatus 10, as shown in FIG. 1. The siderails 38, 40 are shown in raised positions in FIG. 1, but the siderails may be lowered to lowered positions. The position of the siderails 38, 40 is determined by sensors 51, 53, respectively.

The orientation of the sides and ends of the patient support apparatus 10 is established by the orientation of a patient supported on the patient support apparatus 10 in a supine position such that the right siderail 38 is positioned to the patient's right and the left siderail 40 is positioned to the patient's left. Similarly, references to the foot end 26 relate to the position of the patient's feet when in the supine position on the patient support apparatus 10. Likewise, the head end 24 is oriented at the end of the patient support apparatus 10 where a patient's head would be in a supine position.

Each of the plurality of casters 14 includes a caster wheel 42 and a caster housing 44, as shown in FIGS. 1 and 3-6. The caster wheel 42 of each of the plurality of casters 14 rotates about a respective wheel axis A1 to move the patient support apparatus 10 along the floor. The caster housing 44 of each of the plurality of casters 14 swivels about a respective housing axis A2 to alter a direction of the patient support apparatus 10. The caster housing 44 of each of the plurality of casters 14 includes a body 46 and a stem 48 extending upwardly from the body 46 to couple to the lower frame 18. Each caster wheel 42 is received in a respective caster housing 44 so that the respective caster housing 44 is arranged on both a right side and a left side of the respective caster wheel 42.

Figure 7:
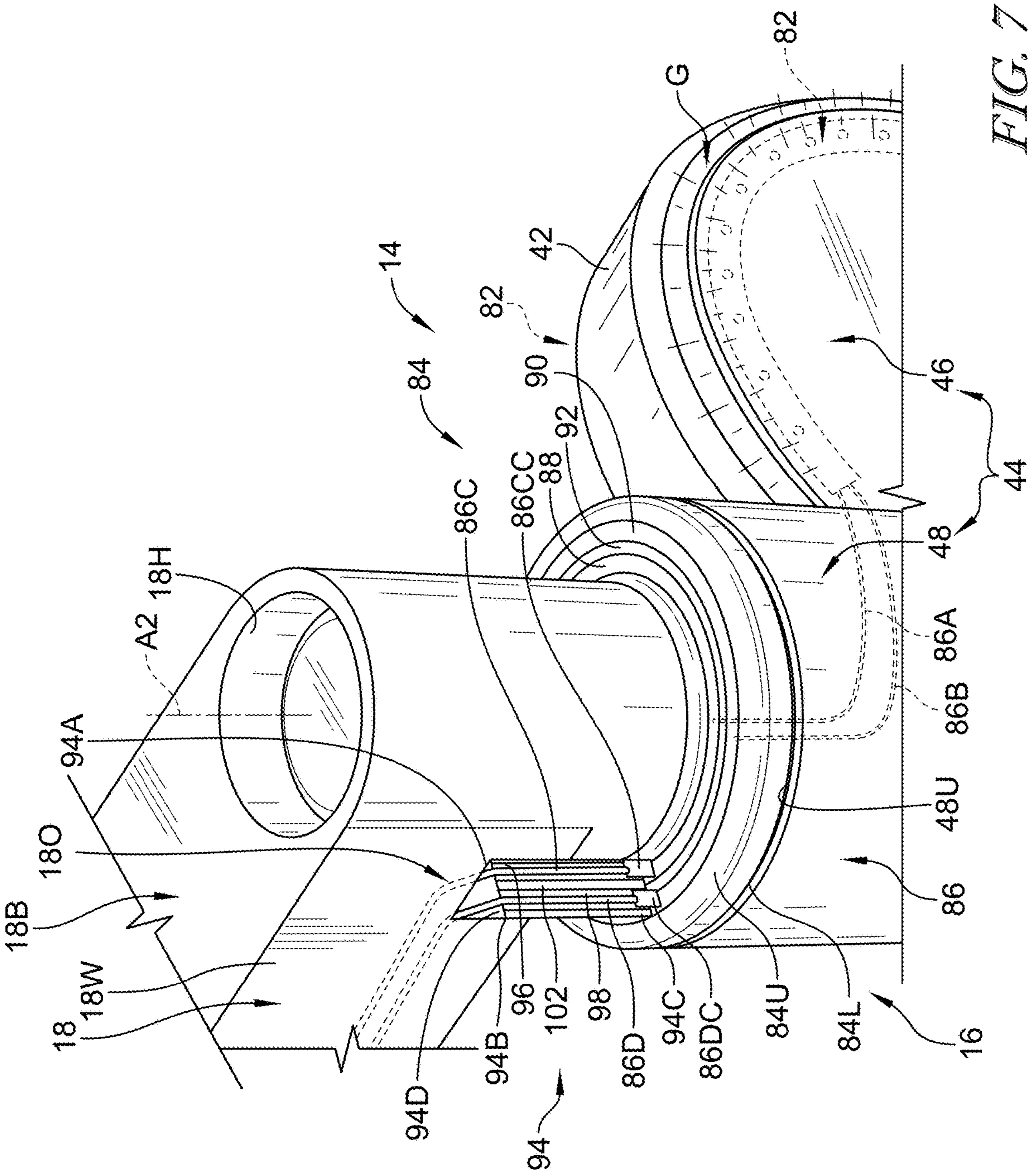
FIG. 7 is an enlarged view of one caster included in the plurality of casters of FIGS. 1-6 showing that the status indicator light assembly includes a plurality of light emitting diodes configured to provide the first, second, third, and fourth visual indicators, a wire connector coupled to a stem of the housing of the caster and configured to swivel with the housing, and a plurality of wires extending between the wire connector and the plurality of light emitting diodes and between the wire connector and a controller of the patient support apparatus.

The lower frame 18 illustratively includes a plurality of support bars 18B that couple with the plurality of casters 14, as shown in FIG. 7. For example, the lower frame 18 may include two support bars 18B (one for the head end casters 14 and one for the foot end casters 14). As another example, the lower frame 18 may include four support bars 18B (one for each caster 14). The support bars 18B extend laterally from the right side to left side of the patient support apparatus 10. A terminal end of each of the support bars 18B is formed to include a stem-receiving hole 18H, as shown in FIG. 7. The stem-receiving hole 18H extends along the housing axis A2. A portion of the stem 48 extends upwardly into the stem-receiving hole 18H and is mounted to the support bar 18B.

The patient support apparatus 10 includes a brake/steer mechanism 37 supported by the lower frame 18, as shown in FIGS. 1 and 2A. The brake/steer mechanism 37 is of the type known in the art and able to transition the operation of the plurality of casters 14 between the brake mode, a neutral mode, and a steer mode. In the brake mode of the plurality of casters 14, rotation of the caster wheel 42 of each of the plurality of casters 14 about the respective wheel axis A1 and rotation of the caster housing 44 (i.e., swiveling) of each of the plurality of casters 14 about the respective housing axis A2 is prevented. In the neutral mode of the plurality of casters 14, the caster wheel 42 of each of the plurality of casters 14 is free to rotate about the respective wheel axis A1 and the caster housing 44 of each of the plurality of casters 14 is free to rotate about the respective housing axis A2. In the steer mode of the plurality of casters 14, the caster wheel 42 of each of the plurality of casters 14 is free to rotate about the respective wheel axis A1 and at least one caster housing 44 is prevented from rotation (i.e., swiveling) about the respective housing axis A2. The caster 14 of the plurality of casters 14 that is prevented from swiveling serves as a tracking wheel to assist with steering of the patient support apparatus 10.

In the present embodiment, the caster 14 positioned at the left foot end of the patient support apparatus 10 serves as the steer caster. In other embodiments, a different caster 14 may serve as the steer caster. When the plurality of casters 14 is in the steer mode, the remaining casters 14 (i.e., the casters 14 other than the caster 14 having the caster housing 44 that is prevented from swiveling) are permitted to swivel.

The activation of the brake/steer mechanism 37 is provided by an actuator 50 which is positioned at each of the plurality of casters 14, as shown in FIG. 1. Each actuator 50 includes a brake pedal 52 and a steer pedal 54. The pedals 52, 54 allow a caregiver to actuate the brake/steer mechanism 37 at multiple positions about the periphery of the patient support apparatus 10.

Figure 3:
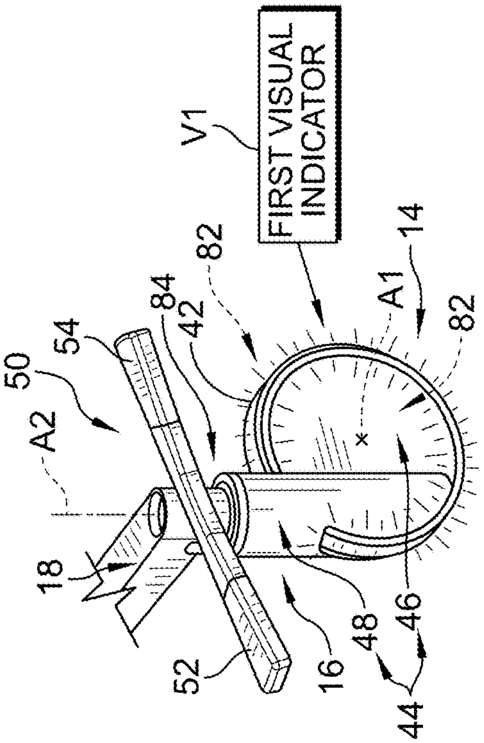
FIG. 3 is a perspective view of one caster included in the plurality of casters of FIGS. 1 and 2A showing that the status indicator light assembly changes to a first mode in which the status indicator light assembly illuminates a first visual indicator on the plurality of casters in response to the plurality of casters being in a brake mode during which movement of the plurality of casters is prevented.
Figure 4:
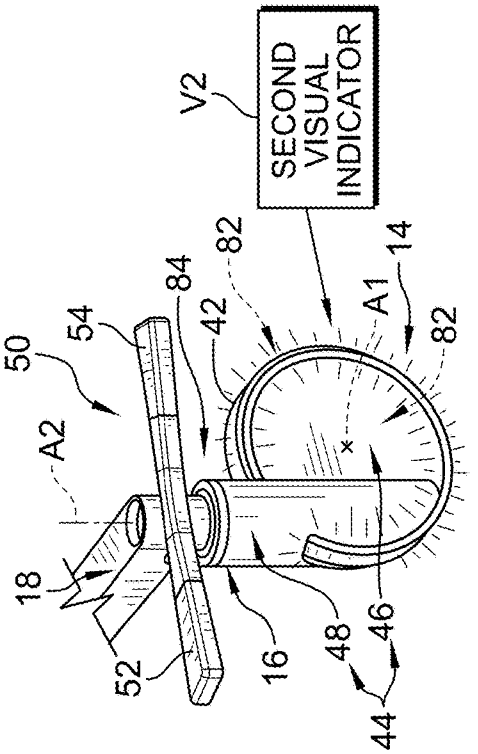
FIG. 4 is a perspective view of one caster included in the plurality of casters of FIGS. 1 and 2A showing that the status indicator light assembly changes to a second mode in which the status indicator light assembly illuminates a second visual indicator on the plurality of casters in response to the plurality of casters being in a neutral mode during which a wheel of each of the plurality of casters is free to rotate and a housing of each of the plurality of casters is free to swivel.
Figure 5:
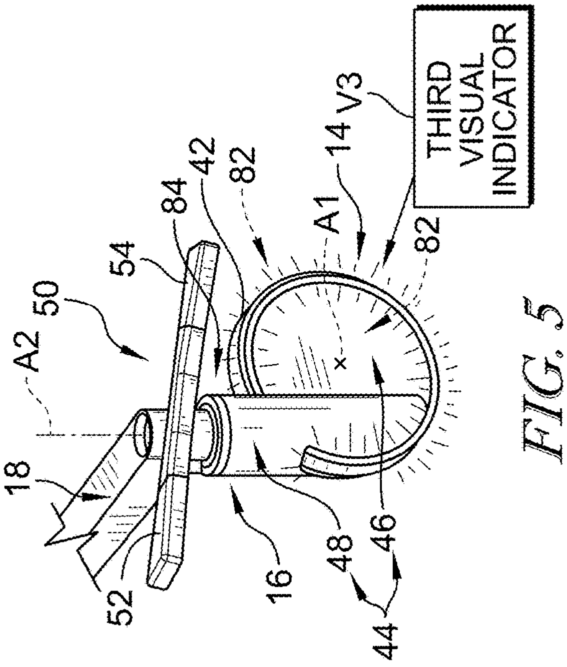
FIG. 5 is a perspective view of one caster included in the plurality of casters of FIGS. 1 and 2A showing that the status indicator light assembly changes to a third mode in which the status indicator light assembly illuminates a third visual indicator on the plurality of casters in response to the plurality of casters being in a steer mode during which the wheel of each of the plurality of casters is free to rotate and swiveling of the housing of at least one of the casters is prevented.
Figure 6:
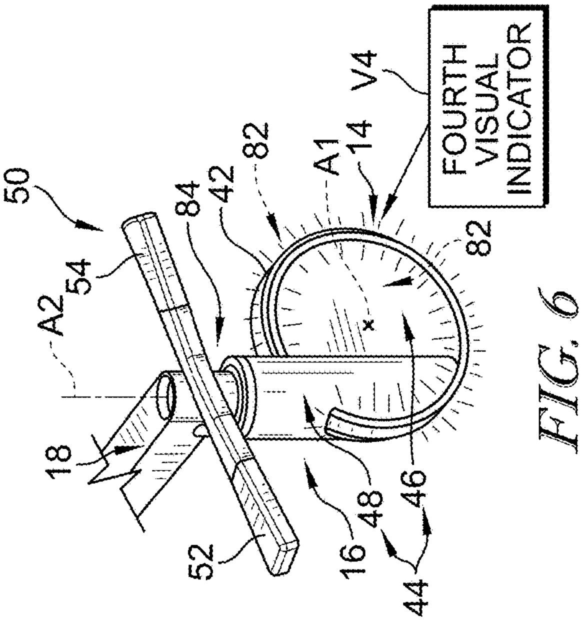
FIG. 6 is a perspective view of one caster included in the plurality of casters of FIGS. 1 and 2A showing that the status indicator light assembly changes to a fourth mode in which the status indicator light assembly illuminates a fourth visual indicator on at least one caster of the plurality of casters to indicate a patient characteristic.
Figure 8:
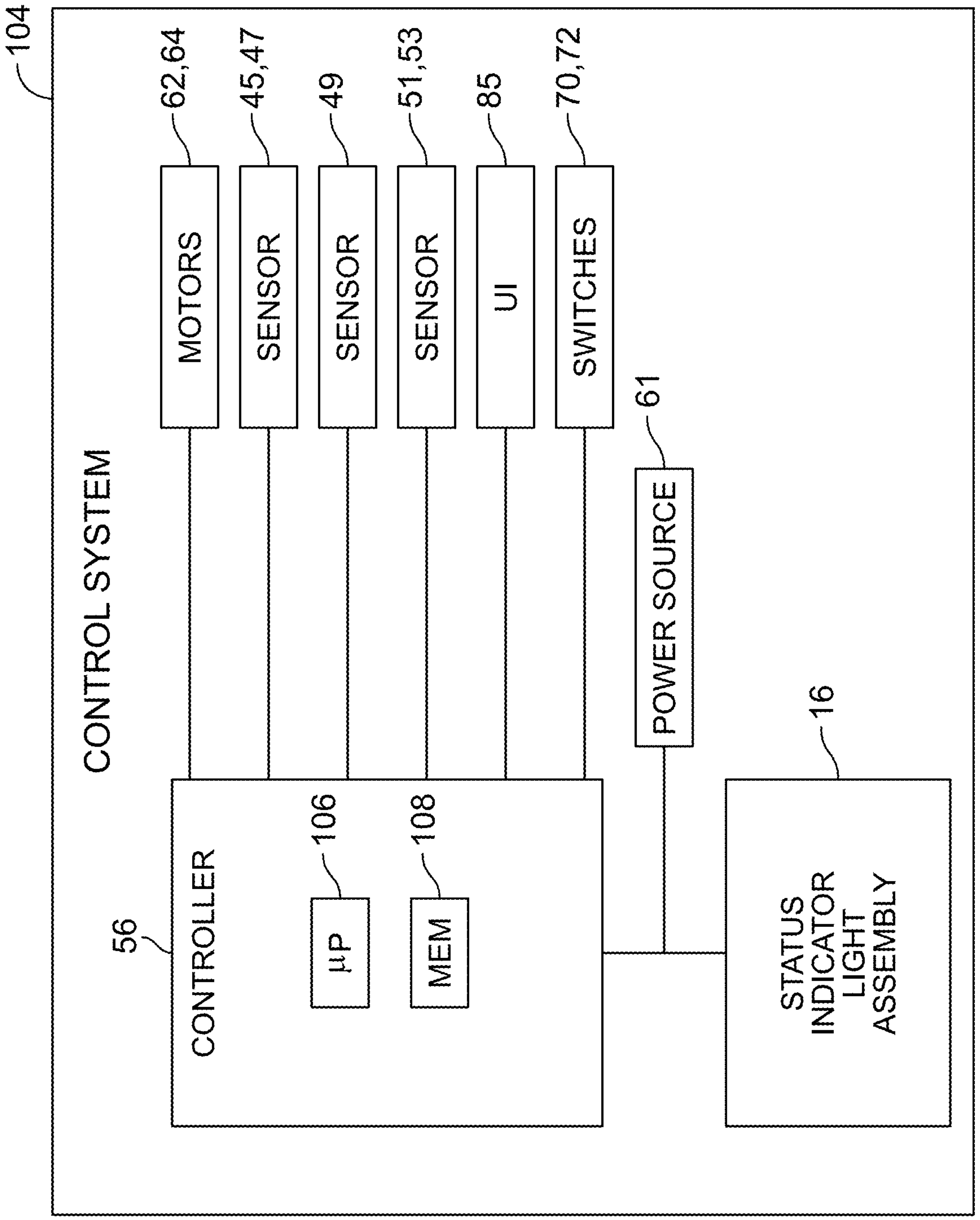
FIG. 8 is a block diagram of a control system of the patient support apparatus of FIG. 1 showing the controller coupled to various sensors and the status indicator light assembly to control the status indicator light assembly based on inputs from the various sensors.

The brake/steer mechanism 37 includes at least two sensors 45, 47 configured to provide information relative to the status of the plurality of casters 14 to a controller 56 of the patient support apparatus 10, as suggested in FIG. 8. When the plurality of casters 14 is placed in the brake mode via the brake pedal 52, as shown in FIG. 3, the sensor 45 is engaged so that the sensor 45 is activated to provide an indication to the controller 56 that the plurality of casters 14 is in the brake mode. While in the brake mode, the brake pedal 52 is closer to the floor than the steer pedal 54. When the plurality of casters 14 is placed in the steer mode via the steer pedal 54, as shown in FIG. 5, the sensor 47 is engaged to provide an indication to the controller 56 that the plurality of casters 14 is in the steer mode. While in the steer mode, the steer pedal 54 is closer to the floor than the brake pedal 52. When the plurality of casters 14 is placed in the neutral mode, as shown in FIG. 4, the sensors 45, 47 are not engaged, which provides an indication to the controller 56 that the plurality of casters 14 is in the neutral mode. While in the neutral mode, the brake pedal 52 and the steer pedal 54 are both the same distance from the floor. In some embodiments, the sensors 45, 47 are each a limit switch that is engaged to provide the signal to the controller 56.

Figure 2B:
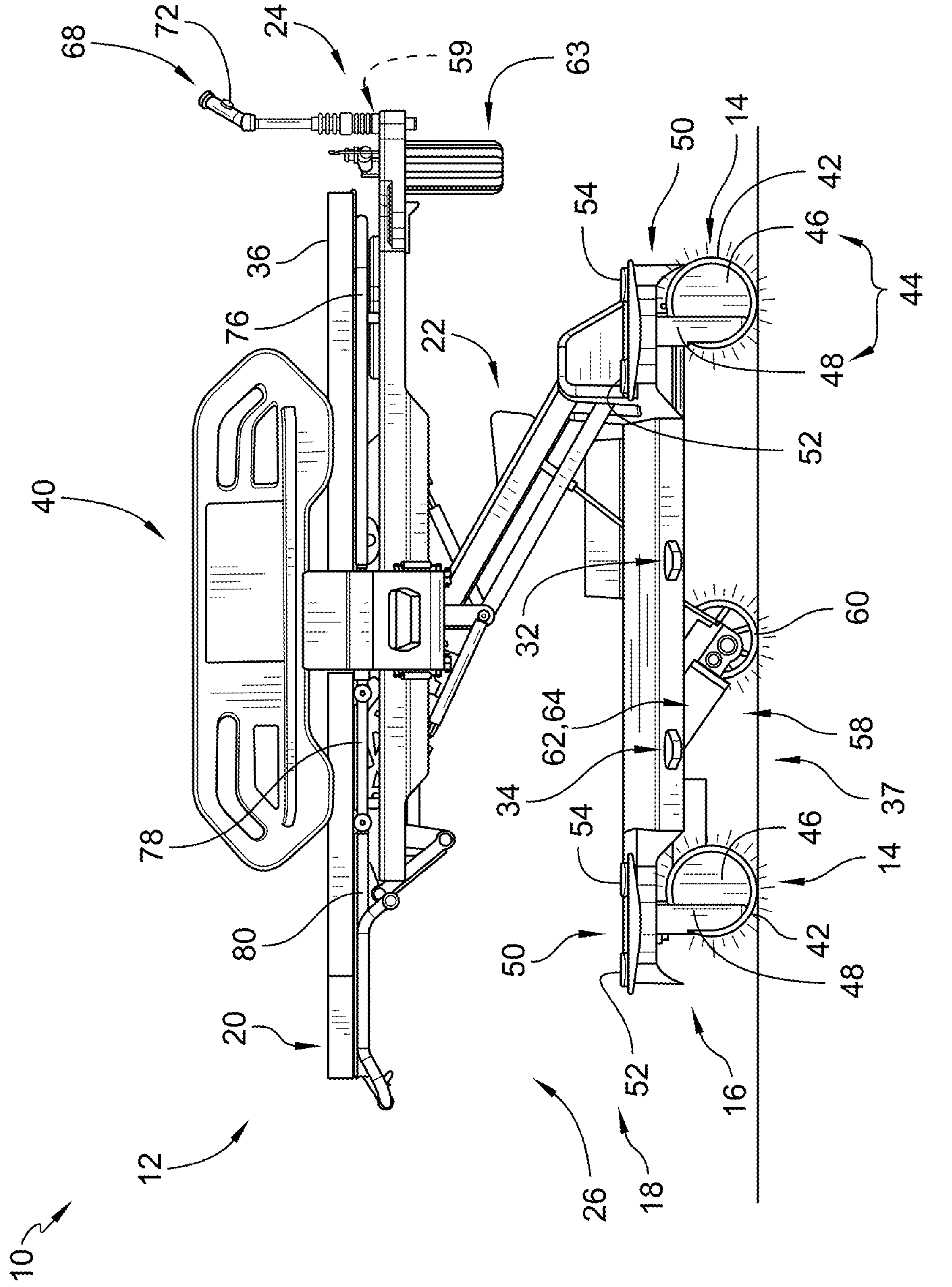
FIG. 2B is a side view of the patient support apparatus of FIG. 1 showing that an auxiliary wheel of the plurality of wheels is deployed to engage the floor, and further showing that the status indicator light assembly is coupled with the auxiliary wheel to illuminate the auxiliary wheel.

In some embodiments, the auxiliary wheel 60 is an unpowered wheel configured to facilitate enhanced turning and maneuverability of the patient support apparatus 10. In some embodiments, the auxiliary wheel 60 is included in a powered drive wheel assembly 58, as shown in FIG. 2B, to assist the caregiver in moving the patient support apparatus 10. The powered drive wheel assembly 58 includes the powered drive wheel 60 (i.e., the auxiliary wheel 60), a deploy motor 62, and a drive motor 64. The powered drive wheel assembly 58 is positioned in the center of the lower frame 18, as shown in FIG. 2B. The powered drive wheel 60 is deployed via the deploy motor 62 to engage the floor, and the drive motor 64 drives rotation of the powered drive wheel 60. In some embodiments, the deploy motor 62 and the drive motor 64 are communicatively coupled with the controller 56 to provide signals to the controller 56 regarding a status of the powered drive wheel assembly 58. For example, the motors 62, 64 may provide an indication that the powered drive wheel 60 is not deployed, deployed, not active, and/or active.

The patient support apparatus 10 includes a pair of push handles 66, 68 supported on the upper frame 20, as shown in FIG. 1. The push handles 66, 68 are collapsible into stowed positions so that the push handles 66, 68 can be positioned out of the way of a caregiver who needs access to a patient from the head end 24 of the patient support apparatus 10. In some embodiments, the push handles 66, 68 include respective activation switches 70, 72. The activation switches 70, 72 are used to enable the operation of the powered drive wheel assembly 58. For example, the activation switches 70, 72 may include force sensing load cells that provide an input to the powered drive wheel assembly 58. The activation switches 70, 72 are configured to be actuated by the hand of the caregiver when the caregiver grips the push handles 66, 68. In some embodiments, the activation switches 70, 72 provide a signal to the controller 56 indicative of operation of the powered drive wheel assembly 58. In some embodiments, when the push handles 66, 68 are in use, strain gauges 57, 59 are engaged. For example, when a caregiver applies pressure to the push handles 66, 68, the strain gauges 57, 59 provide a signal to the controller 56 indicative of the force being applied.

The push handle 66 further includes a user interface 74 that allows a caregiver to select the speed at which the powered drive wheel 60 of the powered drive wheel assembly 58 operates while the powered drive wheel assembly 58 is enabled by activation of the activation switches 70, 72. The powered drive wheel 60 operates to move the patient support apparatus 10 over the floor with minimal effort by a caregiver to assist with transport. In use, the caregiver places the plurality of casters 14 in the steer mode, and then engages both of the activation switches 70, 72 to activate the powered drive wheel assembly 58. In some embodiments, the powered drive wheel assembly 58 is omitted.

In some embodiments, the patient support apparatus 10 includes an oxygen tank holder 63 that supports an oxygen tank and an IV pole 65, as shown in FIG. 1. The IV pole 65 may fold downwardly as shown in FIG. 2. In some embodiments, the oxygen tank holder 63 and/or the IV pole 65 may be omitted.

The patient support apparatus 10 may be moved between a number of configurations. The upper frame 20 includes a head section 76, a thigh section 78, and a foot section 80, as shown in FIG. 1. Sections 76, 78, 80 are each movable relative to each other. For example, head section 76 pivotably raises and lowers relative to thigh section 78, whereas the foot section 80 pivotably raises and lowers relative to the thigh section 78. The patient support apparatus 10 may be the patient support apparatus of U.S. application Ser. No. 18/680,889 filed 31 May 2024, which is expressly incorporated by reference herein.

As shown in FIGS. 1-6, the status indicator light assembly 16 is coupled with at least one of the plurality of wheels 11. In some embodiments, the status indicator light assembly 16 is coupled with each of the plurality of casters 14 and/or the auxiliary wheel 60. Any number of the plurality of wheels 11 may be coupled with the status indicator light assembly 16, such as only one wheel 11, more than one wheel 11 but less than all wheels 11, or all wheels 11. The status indicator light assembly 16 changes between a first mode, in which the status indicator light assembly 16 illuminates a first visual indicator V1 on each of the plurality of casters 14 and/or the auxiliary wheel 60, and a second mode, in which the status indicator light assembly 16 illuminates a second visual indicator V2 different than the first visual indicator V1 on each of the plurality of casters 14 and/or the auxiliary wheel 60.

In illustrative embodiments, the status indicator light assembly 16 is changed to the first mode in response to the plurality of casters 14 and/or the auxiliary wheel 60 being in the brake mode during which movement of the plurality of casters 14 and/or the auxiliary wheel 60 is prevented, as shown in FIG. 3. The status indicator light assembly 16 is changed to the second mode in response to the plurality of casters 14 and/or the auxiliary wheel 60 being in the non-brake mode during which the plurality of casters 14 and/or the auxiliary wheel 60 is free to move. In illustrative embodiments, the non-brake mode of the plurality of casters 14 is the neutral mode of the plurality of casters 14 during which the wheel 42 of each of the plurality of casters 14 is free to rotate and the housing 44 of each of the plurality of casters 14 is free to swivel, as shown in FIG. 4.

The status indicator light assembly 16 also changes between the first mode or the second mode and a third mode, in which the status indicator light assembly 16 illuminates a third visual indicator V3 on each of the plurality of casters 14 and/or the auxiliary wheel 60 that is different than the first and second visual indicators V1, V2. The status indicator light assembly 16 is changed to the third mode in response to the plurality of casters 14 being in the steer mode during which the wheel 42 of each of the plurality of casters 14 is free to rotate and swiveling of the housing 44 of at least one of the plurality of casters 14 is prevented, as shown in FIG. 5.

The status indicator light assembly 16 is configured to change between the first, second, and third modes in any order. For example, the status indicator light assembly 16 can change from the first mode to the third mode, from the first mode to the second mode, from the third mode to the first mode, from the third mode to the second mode, from the second mode to the first mode, or from the second mode to the third mode.

The status indicator light assembly 16 gives notice to caregivers of the status of the plurality of casters 14. For example, the caregiver can see the status of the plurality of casters 14 of the patient support apparatus 10 in a room as the caregiver walks through a hallway. If the second or third visual indicator V2, V3 is illuminated on the plurality of casters 14 (i.e., the non-brake mode of the plurality of casters 14), the caregiver can then ensure that the plurality of casters 14 is properly placed in the brake mode so that risk of injury to the patient is minimized.

In the illustrative embodiment of FIGS. 1-6, the status indicator light assembly 16 is coupled to each of the plurality of casters 14 and/or the auxiliary wheel 60 so that each of the plurality of casters 14 is illuminated with the visual indicator V1, V2, V3. The status indicator light assembly 16 includes a plurality of light emitting diodes 82, a plurality of wire connectors 84, and a plurality of wires 86. For simplicity sake, one caster 14 of the plurality of casters 14 will be described in detail, however, each caster 14 is identical such that the description of one caster 14 applies to the other casters 14 of the plurality of casters 14. The description of the status indicator light assembly 16 as applied to the one caster 14 also applies to the auxiliary wheel 60.

As shown in FIGS. 3-7, the caster 14 includes a plurality of light emitting diodes 82 on a right side and on a left side of the caster 14. Illustratively, the plurality of light emitting diodes 82 is coupled to a right inner wall of the body 46 of the housing 44 and a left inner wall of the body 46 of the housing 44. The inner walls are interior surfaces of the body 46. The wheel 42 is located between the right inner wall of the body 46 and the left inner wall of the body 46 such that the plurality of light emitting diodes 82 is located on both sides of the wheel 42. A gap G is formed between the wheel 42 and the housing 44 on both the right and left sides of the wheel 42, as shown in FIG. 7.

Because the plurality of light emitting diodes 82 is located interior to or inside of the housing 44, the plurality of light emitting diodes 82 emits light (the visual indicators V1, V2, V3) through the gap G formed on each side of the wheel 42. As such, both the right and left sides of the caster 14 are illuminated with the visual indicator V1, V2, V3. In some embodiments, the plurality of light emitting diodes 82 is formed from a light emitting diode strip, such that one strip is coupled to, mounted to, or adhered to the right inner wall of the body 46 of the housing 44 and another strip (or the same strip continued) is coupled to, mounted to, or adhered to the left inner wall of the body 46 of the housing 44.

In some embodiments, when illuminated, the plurality of light emitting diodes 82 that forms the visual indicators V1, V2, V3 forms a partial circular shape that extends circumferentially about the wheel axis A1, as shown in FIGS. 3-6, when viewed from the right or left side of the caster 14.

When illuminated, the plurality of light emitting diodes 82 that forms the visual indicators V1, V2, V3 extends around a circumference of the body 46 of the housing 44.

The wire connector 84 is coupled with an upper end 48U of the stem 48, as shown in FIG. 7. The wire connector 84 swivels with the stem 48 about the housing axis A2. The wire connector 84 includes an upper surface 84U and a lower surface 84L opposite the upper surface 84U. The wire connector 84 is formed to include a first track 88 that extends circumferentially about the housing axis A2 and a second track 90 that extends circumferentially about the housing axis A2. The second track 90 is radially spaced apart from the first track 88 and located radially outward of the first track 88. The first and second tracks 88, 90 are illustratively formed as depressions that extend inwardly from the upper surface 84U and the lower surface 84L toward the opposing surface 84U, 84L of the wire connector 84. The first and second tracks 88, 90 cooperate to form a divider 92 that extends circumferentially about the housing axis A2 radially between the first and second tracks 88, 90.

In some embodiments, the wire connector 84 is formed to include additional tracks 88, 90. For example, the wire connector 84 may be formed to include three tracks, four tracks, five tracks, etc. Each of the tracks 88 90 is radially spaced apart from one another relative to the housing axis A2. In illustrative embodiments, the tracks 88, 90 comprise metal strips.

The plurality of wires 86 includes a first wire 86A, a second wire 86B, a third wire 86C, and a fourth wire 86D, as shown in FIG. 7. The first wire 86A and the second wire 86B are located inside of the housing 44 of the caster 14, as shown in FIG. 7. The third wire 86C and the fourth wire 86D are located, at least partially, inside of the lower frame 18.

In some embodiments, the plurality of wires 86 includes additional wires. For example, the plurality of wires may include three wires located, at least partially, inside of the lower frame 18, four wires located, at least partially, inside of the lower frame 18, etc. Each of the wires located, at least partially, inside of the lower frame 18 contacts an upwardly-facing surface of a respective track 88, 90 of the wire connector 84. As another example, the plurality of wires may include three wires located inside of the housing 44 of the caster 14, four wires located inside of the housing 44 of the caster 14, etc. Each of the wires located inside of the housing 44 of the caster 14 is fixed to a downwardly-facing surface of a respective track 88, 90 of the wire connector 84. In this way, the plurality of wires 86 may include four wires located inside of the housing 44 of the caster 14 and four wires located, at least partially, inside of the lower frame 18.

The first wire 86A is fixed to a downwardly-facing surface of the first track 88 of the wire connector 84, as shown in FIG. 7. The second wire 86B is fixed to a downwardly-facing surface of the second track 90 of the wire connector 84. The third wire 86C contacts an upwardly-facing surface of the first track 88 of the wire connector 84 via a contact 86CC. The fourth wire 86D contacts an upwardly-facing surface of the second track 90 of the wire connector 84 via a contact 86DC. The tracks 88, 90 are conductive to allow for electrical communication between the wires 86A, 86B, 86C, 86D. In some embodiments, the contacts 86CC, 86DC are spring-loaded contacts such that engagement between the contacts 86CC, 86DC and the tracks 88, 90 is maintained.

In some embodiments, the first and second wires 86A, 86B are circumferentially aligned with one another relative to the housing axis A2, as shown in FIG. 7. In some embodiments, the third and fourth wires 86C, 86D are circumferentially aligned with one another relative to the housing axis A2, as shown in FIG. 7. In some embodiments, the first and second wires 86A, 86B and the third and fourth wires 86C, 86D are not circumferentially aligned with one another, as shown in FIG. 7.

The third and fourth wires 86C, 86D are connected to the controller 56 and/or a power source 61 to receive power and electrical signals therefrom, as shown in FIG. 8. The power source 61 is illustratively a battery 61. The first wire 86A and the third wire 86C are electrically connected to one another through the first track 88, and the second wire 86B and the fourth wire 86D are electrically connected to one another through the second track 90. The wire connector 84 allows for the electrical connection between the stationary lower frame 18 and the rotating housing 44 of the caster 14 so that power and electrical signals can be transmitted from the stationary lower frame 18 to the rotating housing 44 of the caster 14.

Because the first wire 86A and the second wire 86B are fixed to the wire connector 84, the first wire 86A and the second wire 86B swivel with the housing 44 as the housing 44 swivels about the housing axis A2. The third wire 86C and the fourth wire 86D are fixed to the lower frame 18 such that the third wire 86C and the fourth wire 86D do not swivel with the housing 44 and the wire connector 84. Instead, as the wire connector 84 and the housing 44 swivel, the third wire 86C remains in contact with the first track 88 via the contact 86CC, and the fourth wire 86D remains in contact with the second track 90 via the contact 86DC. As the housing 44 and the wire connector 84 swivel, the contacts 86CC, 86DC remain within the tracks 88, 90 so that the contacts 86CC, 86DC remain in constant contact with the tracks 88, 90, respectively. The wire connector 84, thus, allows for swiveling of the housing 44 without breaking the electrical contact between the wires 86A, 86B, 86C, 86D or twisting, tangling, or breaking the wires 86A, 86B, 86C, 86D.

The first wire 86A is coupled to the wire connector 84 at a first end thereof and coupled to the plurality of light emitting diodes 82 at a second end thereof, as shown in FIG. 7. The second wire 86B is coupled to the wire connector 84 at a first end thereof and coupled to the plurality of light emitting diodes 82 at a second end thereof, as shown in FIG. 7. The third wire 86C is coupled to the contact 86CC at a first end thereof and coupled to the controller 56 at a second end thereof. The fourth wire 86D is coupled to the contact 86DC at a first end thereof and coupled to the controller 56 at a second end thereof.

Illustratively, the plurality of light emitting diodes 82 on the left side and the plurality of light emitting diodes 82 on the right side of the caster 14 are connected in series such that the wires 86A, 86B, 86C, 86D transmit power and electrical signals to both the plurality of light emitting diodes 82 on the left side and the plurality of light emitting diodes 82 on the right side of the caster 14.

In some embodiments, the status indicator light assembly 16 further includes a router 94, as shown in FIG. 7. The router 94 directs the wires 86C, 86D from inside of the lower frame 18 to outside of the lower frame 18 and downwardly toward the wire connector 84. The router 94 is coupled to the lower frame 18 above the wire connector 84. The router 94 includes a first side wall 94A, a second side wall 94B, a third side wall 94C, and a top wall 94D. The router 94 is illustratively triangular prism shaped though any shape is contemplated. The first side wall 94A is coupled with a wall 18W of the lower frame 18, the second side wall 94B extends outwardly away from the first side wall 94A and the wall 18W of the lower frame 18, and the third side wall extends outwardly away from the first side wall 94A and the wall 18W of the lower frame 18 to connect with the second side wall 94B. The top wall 94D extends between and interconnects the first, second, and third side walls 94A, 94B, 94C. Illustratively, the top wall 94D is perpendicular to the side walls 94A, 94B, 94C.

The wall 18W of the lower frame 18 is formed to include an opening 18O that directs the wires 86C, 86D from inside of the lower frame 18 to outside of the lower frame 18, as shown in FIG. 7. The opening 18O is arranged adjacent the top wall 94D of the router 94. The wires 86C, 86D extend through the opening 18O and are then directed downwardly along the third side wall 94C. Illustratively, the third side wall 94C is formed to include a first track 96 extending inwardly from an outer surface of the third side wall 94C and a second track 98 extending inwardly from the outer surface of the third side wall 94C. The second track 98 is spaced apart from the first track 96. The first and second tracks 96, 98 cooperate to form a divider 102 between the first and second tracks 96, 98.

The first track 96 of the third side wall 94C is aligned with the first track 88 of the wire connector 84, the second track 98 of the third side wall 94C is aligned with the second track 90 of the wire connector 84, and the divider 102 of the third side wall 94C is aligned with the divider 92 of the wire connector 84, as shown in FIG. 7. The third wire 86C extends through the opening 18O and along the first track 96 of the third side wall 94C so that the contact 86CC coupled to the third wire 86C contacts the first track 88 of the wire connector 84. The fourth wire 86D extends through the opening 18O and along the second track 98 of the third side wall 94C so that the contact 86DC coupled to the fourth wire 86D contacts the second track 90 of the wire connector 84.

There may be any number of wires 86A, 86B, 86C, 86D, tracks 88, 90 formed in the wire connector 84, dividers 92 formed in the wire connector 84, tracks 96, 98 formed in the router 94, and dividers 102 formed in the router 94 depending on the number of wires connected to the plurality of light emitting diodes 82.

In some embodiments, the status indicator light assembly 16 further includes a cover to protect the wires 86A, 86B, 86C, 86D and the wire connector 84. In some embodiments, the cover is coupled to the lower frame 18 such that the cover is stationary relative to the wire connector 84 and the housing 44 of the caster 14. In some embodiments, the cover is coupled to the housing 44 of the caster 14 such that the cover rotates with the wire connector 84 and the housing 44 of the caster 14.

In some embodiments, the status indicator light assembly 16 is further configured to change to a fourth mode in which the status indicator light assembly 16 illuminates a fourth visual indicator V4 on at least one of the plurality of casters 14 and/or the auxiliary wheel 60 indicative of a patient characteristic and/or a bed exit status. The fourth visual indicator V4 is different than the first, second, and third visual indicators V1, V2, V3. The patient characteristic can include whether the patient is a fall risk, whether the patient has a tendency for violence, and/or whether the patient has allergies, among others. The caregiver can determine which patient characteristic to display on the at least one caster 14 and/or the auxiliary wheel 60.

In some embodiments, in the fourth mode, the status indicator light assembly 16 illuminates the fourth visual indicator V4 on only one of the plurality of casters 14 and/or the auxiliary wheel 60, while the remaining plurality of casters 14 remain in the first, second, or third mode depending on the status of the plurality of casters 14. In some embodiments, in the fourth mode, the status indicator light assembly 16 illuminates the fourth visual indicator V4 on only two of the plurality of casters 14 and/or the auxiliary wheel 60, while the remaining plurality of casters 14 remain in the first, second, or third mode depending on the status of the plurality of casters 14. In some embodiments, in the fourth mode, the status indicator light assembly 16 illuminates the fourth visual indicator V4 on only three of the plurality of casters 14 and/or the auxiliary wheel 60, while the remaining plurality of casters 14 remain in the first, second, or third mode depending on the status of the plurality of casters 14. The caregiver can determine which caster(s) 14 and/or if the auxiliary wheel 60 is illuminated with the fourth visual indicator V4 based on, for example, the orientation of the patient support apparatus 10 in the room.

For example, three of the four casters 14 can be illuminated with the first visual indicator V1 to indicate that the plurality of casters 14 is in the brake mode. The remaining one of the four casters 14 can be illuminated with the fourth visual indicator V4 to indicate that the patient has a specific allergy. The caster 14 illuminated with the fourth visual indicator V4 can be the caster 14 at the head end 24 of the patient support apparatus 10 as the caregiver would need to be near the patient to administer medicine. In this way, the caster 14 most near the door to the room indicates that the plurality of casters 14 is in the brake mode so that caregivers outside of the room can see this indication from a distance.

As another example, three of the four casters 14 can be illuminated with the first visual indicator V1 to indicate that the plurality of casters 14 is in the brake mode. The remaining one of the four casters 14 can be illuminated with the fourth visual indicator V4 to indicate that the patient has a tendency for violence. The caster 14 illuminated with the fourth visual indicator V4 can be the caster 14 most near the door to the room so that caregivers outside of the room can see this indication from a distance before entering the room. Thus, the indication given by the fourth visual indicator V4 and the positioning of the fourth visual indicator V4 can be altered based on the needs of the caregiver, the type of characteristic that the fourth visual indicator V4 is indicating, and the orientation of the patient support apparatus 10 within the room.

In some embodiments, a user interface 85 is used by the caregiver to control which caster(s) 14 displays the fourth visual indicator V4 and to set which patient characteristic is indicated by the fourth visual indicator V4. The caregiver can control the status indicator light assembly 16 such that only the first, second, and third visual indicators V1, V2, V3 are displayed. In some embodiments, the user interface 85 forms a part of the patient support apparatus 10. In some embodiments, the user interface 85 is separate from the patient support apparatus 10, such as, for example, a tablet or a computer.

In some embodiments, the auxiliary wheel 60 is illuminated with the same visual indicator V1, V2, V3, V4 as the plurality of casters 14 to indicate the mode of the plurality of casters 14. In some embodiments, the auxiliary wheel 60 is illuminated with a different visual indicator to indicate the status of the powered drive wheel assembly 58. In some embodiments, the illumination of the auxiliary wheel 60 may provide a night light as the illumination reflects off the underlying floor. In some embodiments, the user interface 85 is used by the caregiver to control which visual indicator is displayed by the auxiliary wheel 60.

In some embodiments, the first visual indicator V1 is a first color, such as orange or red. In some embodiments, the second visual indicator V2 is a second color, such as blue. In some embodiments, the third visual indicator V3 is a third color, such as green. In some embodiments, the fourth visual indicator V4 is a fourth color, such as violet or yellow. In some embodiments, the visual indicators V1, V2, V3, V4 flash.

In some embodiments, the visual indicators V1, V2, V3, V4 form a logo, a message, a symbol, a shape, a letter, etc. In this way, in some embodiments, the visual indicators V1, V2, V3, V4 may form a shape or object other than a circle.

In some embodiments, in the first mode of the status indicator light assembly 16, the status indicator light assembly 16 illuminates the first visual indicator V1 on each of the plurality of casters 14 and/or the auxiliary wheel 60 in response to a plurality of safety features of the patient support apparatus 10 being enabled. In such an embodiment, the first visual indicator V1 may be a green color. In the second mode of the status indicator light assembly 16, the status indicator light assembly 16 illuminates the second visual indicator V2 on each of the plurality of casters 14 and/or the auxiliary wheel 60 in response to at least one of the plurality of safety features of the patient support apparatus 10 being disabled. In such an embodiment, the second visual indicator V2 may be a red color.

The plurality of safety features includes the plurality of casters 14 being in the brake mode, the siderails 38, 40 being in the raised position, a charge level or status of the power source 61 being sufficient or satisfactory, and/or the upper frame 20 being in a lowered position, among others. As an example, the plurality of casters 14 is enabled when the plurality of casters 14 is in the brake mode, and the plurality of casters 14 is disabled when the plurality of casters 14 is in the neutral mode or the steer mode. As another example, the siderails 38, 40 are enabled when both of the siderails 38, 40 are in the raised position during which the siderails 38, 40 extend above an upper surface of the mattress 36 of the patient support apparatus 10, as shown in FIGS. 1 and 2A, and the siderails 38, 40 are disabled when at least one of the left and right siderails 38, 40 is in a lowered position during which the at least one of the siderails 38, 40 does not extend above the upper surface of the mattress 36. As another example, the upper frame 20 is enabled when the upper frame 20 is in the lowered position relative to the lower frame 18, and the upper frame 20 is disabled when the upper frame 20 is in a raised position relative to the lower frame 18.

As another example, the charge level or status is enabled when the battery 61 charge level is at or above a certain percentage and/or when the battery 61 is operating properly. For example, the battery 61 charge level may be sufficient if the battery 61 charge level is at or above 80%, at or above 70%, at or above 60%, at or above 50%, at or above 40%, or at or above 30%. As another example, the battery 61 status may be satisfactory if the battery 61 is operating properly as expected. The battery 61 charge level or status may refer to the battery 61 that operates any electrical components of the patient support apparatus 10, such as, but not limited to, a weigh scale, actuators for section 76, 78, 80 articulation, actuators for upper frame 20 height/tilt adjustment, and/or the plurality of light emitting diodes 82.

The battery charge level or status may also refer to a motorized propulsion system battery to power the powered drive wheel assembly 58. In some embodiments, the motorized propulsion system battery is the same as the battery 61.

The battery 61 charge level or status may be disabled when the battery 61 charge level is insufficient or unsatisfactory. For example, the battery 61 charge level may be insufficient if the battery 61 charge level is below 80%, below 70%, below 60%, below 50%, below 40%, or below 30%. As another example, the battery 61 status may be unsatisfactory if the battery 61 is malfunctioning or inoperable, for example, due to overheating or quickly losing charge.

As shown in FIG. 8, the patient support apparatus 10 includes the controller 56 as part of a control system 104. The controller 56 includes a microprocessor 106 and a memory 108. The controller 56 is in communication with the status indicator light assembly 16, the sensors 45, 47 for the brake/steer mechanism 37, the sensor 49 for the lift mechanism 22, the sensors 51, 53 for the siderails 38, 40, the motors 62, 64 of the powered drive wheel assembly 58, the switches 70, 72, and the user interface 85. The microprocessor 106 receives inputs related to the status of the patient support apparatus 10 (i.e., the status of the plurality of casters 14, the status of the siderails 38, 40, the status of the powered drive wheel assembly 58, and/or the status of the upper frame 20) and inputs from the caregiver via the user interface 85. The microprocessor 106 utilizes instructions stored in the memory 108 to operate the status indicator light assembly 16. The inputs to the microprocessor 106 are from the sensors 45, 47, 49, 51, 53, the switches 70, 72, and/or the motors 62, 64. In some embodiments, the microprocessor 106 receives inputs from the caregiver via the user interface 85.

For example, the caregiver can input the patient characteristics and choose to illuminate one (or all or any combination) of the plurality of casters 14 and/or the auxiliary wheel 60 with the fourth visual indicator V4. The caregiver can also determine which (if not all) of the plurality of casters 14 and/or the auxiliary wheel 60 displays the fourth visual indicator V4. Thus, the controller 56 controls the status indicator light assembly 16 by determining which mode the status indicator light assembly 16 should be in based upon the status of the patient support apparatus 10 and/or inputs from the caregiver.

As an example, in response to the plurality of casters 14 being in the brake mode, the microprocessor 106 receives a signal from the sensor 45. Based on the signal indicating that the plurality of casters 14 is in the brake mode, the controller 56 sends a signal to the status indicator light assembly 16 to change the status indicator light assembly 16 from the second or third mode to the first mode to illuminate the plurality of casters 14 and/or the auxiliary wheel 60 with the first visual indicator V1, as shown in FIG. 3.

As another example, in response to the plurality of casters 14 being in the neutral mode, the microprocessor 106 does not receive a signal from the sensors 45, 47. In this way, the lack of a signal is the signal to the microprocessor 106 that the plurality of casters 14 is in the neutral mode. The controller 56 sends a signal to the status indicator light assembly 16 to change the status indicator light assembly 16 to the second mode to illuminate the plurality of casters 14 and/or the auxiliary wheel 60 with the second visual indicator V2, as shown in FIG. 4.

As another example, in response to the plurality of casters 14 being in the steer mode, the microprocessor 106 receives a signal from the sensor 47. Based on the signal indicating that the plurality of casters 14 is in the steer mode, the controller 56 sends a signal to the status indicator light assembly 16 to change the status indicator light assembly 16 to the third mode to illuminate the plurality of casters 14 and/or the auxiliary wheel 60 with the third visual indicator V3, as shown in FIG. 5.

The controller 56 determines and/or senses the actuator 50 position via input from the sensors 45, 47. Because all of the plurality of casters 14 and/or the auxiliary wheel 60 is illuminated (or all but one caster 14 if the fourth visual indicator V4 is being used), and both the right side and the left side of the plurality of casters 14 and/or the auxiliary wheel 60 are illuminated, the visual indicator V1, V2, V3, V4 can generally be seen at all locations within the room and from the hallway irrespective of the orientation of the patient support apparatus 10 within the room.

In some embodiments, the controller 56 determines and/or senses a light level in the room or hallway in which the patient support apparatus 10 is located. For example, the controller 56 may receive light level data from an ambient light sensor, a photocell, a light sensor, a lux meter, or any other suitable sensor. Based on the light level data, the controller 56 may adjust an intensity of the light emitted from the plurality of light emitting diodes 82. For example, if the room or hallway is relatively dark (i.e., the lights in the room or hallway are off and/or it is nighttime), the intensity of the plurality of light emitting diodes 82 may be lowered such that the plurality of light emitting diodes 82 does not negatively impact the patient's sleep. As another example, if the room or hallway is relatively bright (i.e., the lights in the room or hallway are on and/or it is daytime) the intensity of the plurality of light emitting diodes 82 may be increased to ensure that the visual indicators V1, V2, V3, V4 are visible.

The wires 86C, 86D are connected to AC and DC power source 61 to provide power to the plurality of light emitting diodes 82. In some embodiments, the plurality of light emitting diodes 82 is not powered by the AC and DC power source 61 and, instead, the rotation of the wheels 42 or the housing 44 generates power to illuminate the plurality of light emitting diodes 82.

Figure 9A:
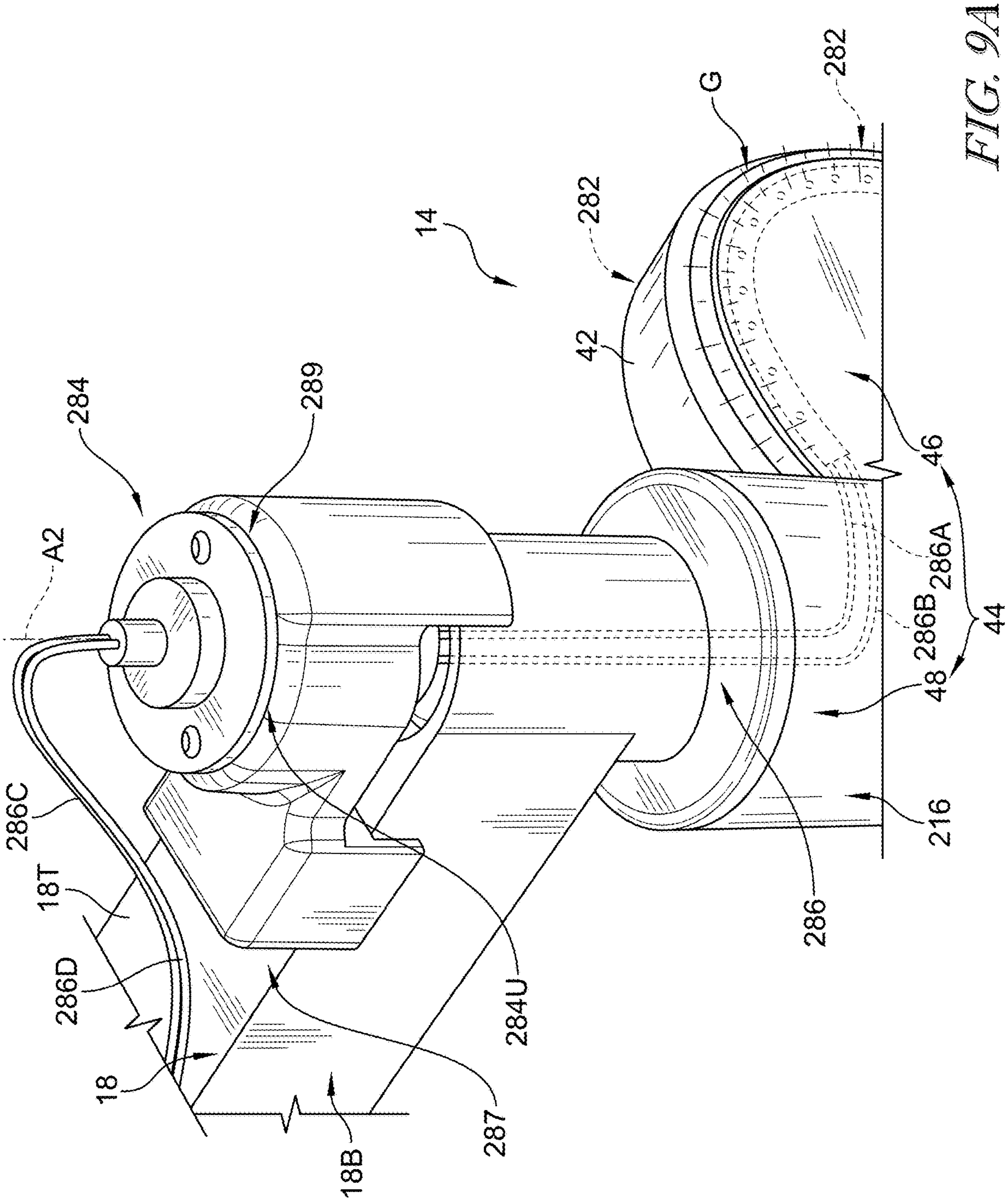
FIG. 9A is an enlarged view of an alternative status indicator light assembly for use with the patient support apparatus of FIG. 1 showing that the status indicator light assembly includes a plurality of light emitting diodes configured to provide the first, second, third, and fourth visual indicators, a wire connector located above the stem of the housing of the caster, and a plurality of wires extending between the wire connector and the plurality of light emitting diodes and between the wire connector and the controller of the patient support apparatus.

Another embodiment of a status indicator light assembly 216 for use with the patient support apparatus 10 of FIG. 1 is shown in FIG. 9A. The status indicator light assembly 216 is substantially similar to the status indicator light assembly 16 shown in FIGS. 2A-7 and described herein. Accordingly, similar reference numbers in the 200 series indicate features that are common between the status indicator light assembly 216 and the status indicator light assembly 16. The description of the status indicator light assembly 16 is incorporated by reference to apply to the status indicator light assembly 216, except in instances when it conflicts with the specific description and the drawings of the status indicator light assembly 216.

The status indicator light assembly 216 is coupled with each of the plurality of casters 14. The status indicator light assembly 216 changes between a first mode, in which the status indicator light assembly 216 illuminates a first visual indicator V1 on each of the plurality of casters 14, a second mode, in which the status indicator light assembly 216 illuminates a second visual indicator V2 different than the first visual indicator V1 on each of the plurality of casters 14, a third mode, in which the status indicator light assembly 216 illuminates a third visual indicator V3 different than the first and second visual indicators V1, V2 on each of the plurality of casters 14, and/or a fourth mode, in which the status indicator light assembly 216 illuminates a fourth visual indicator V4 different than the first, second, and third visual indicators V1, V2, V3 on each of the plurality of casters 14.

The status indicator light assembly 216 includes a plurality of light emitting diodes 282, a plurality of wire connectors 284, and a plurality of wires 286, as shown in FIG. 9A. For simplicity sake, one caster 14 of the plurality of casters 14 will be described in detail, however, each caster 14 is identical such that the description of the caster 14 applies to each caster 14 of the plurality of casters 14.

As shown in FIG. 9A, the plurality of light emitting diodes 282 is coupled to a right inner wall of the body 46 of the housing 44 and a left inner wall of the body 46 of the housing 44. The wheel 42 is located between the right inner wall of the body 46 and the left inner wall of the body 46 such that the plurality of light emitting diodes 282 is located on both sides of the wheel 42. Because the plurality of light emitting diodes 282 is located interior to or inside of the housing 44, the plurality of light emitting diodes 282 emits light (the visual indicators V1, V2, V3, V4) through the gap G formed on each side of the caster 14. As such, both the right and left sides of the caster 14 are illuminated with the visual indicators V1, V2, V3, V4.

The wire connector 284 is mounted external to and above the stem 48, as shown in FIG. 9A. In some embodiments, the wire connector 284 is mounted in the stem 48. Illustratively, the wire connector 284 is a slip ring as known in the art.

Illustratively, the status indicator light assembly 216 further includes a wire connector mount 287, as shown in FIG. 9A. The wire connector mount 287 is coupled with the lower frame 18. Specifically, in some embodiments, the wire connector mount 287 is coupled with a top wall 18T of the lower frame 18. The wire connector mount 287 may be coupled to the lower frame 18 via welding, fasteners, or any other suitable coupling mechanism. The wire connector mount 287 includes a through hole 289 sized to receive the wire connector 284 therein. A center point of the through hole 289 is aligned with the housing axis A2. The through hole 289 is also aligned with the stem 48 of the caster 14.

An upper wall 284U of the wire connector 284 sits on a top surface of the wire connector mount 287 around the through hole 289, as shown in FIG. 9A. The upper wall 284U is fixed to the wire connector mount 287 such that the upper wall 284U and the wire connector mount 287 move with the lower frame 18. The upper wall 284U is spaced apart from the top wall 18T of the lower frame 18.

The plurality of wires 286 includes a first wire 286A, a second wire 286B, a third wire 286C, and a fourth wire 286D, as shown in FIG. 9A. The first wire 286A and the second wire 286B extend downwardly through the stem-receiving hole 18H of the lower frame 18 and the stem 48 into the body 46 of the housing 44. The first wire 286A and the second wire 286B are coupled to the wire connector 284 to extend downwardly therefrom to the plurality of light emitting diodes 282. The third wire 286C and the fourth wire 286D extend from the wire connector 284 and along the support bar 18B of the lower frame 18. The third wire 286C and the fourth wire 286D are coupled to the wire connector 284 to extend upwardly therefrom to the controller 56.

The first wire 286A and the third wire 286C are electrically connected to one another, and the second wire 286B and the fourth wire 286D are electrically connected to one another. The first wire 286A and the second wire 286B are free to rotate as the stem 48 swivels about the housing axis A2, while the third wire 286C and the fourth wire 286D remain stationary relative to the stem 48. The wire connector 284 allows for the electrical connection between the stationary lower frame 18 and the rotating housing 44 of the caster 14 so that power and electrical signals can be transmitted from the stationary lower frame 18 to the rotating housing 44 of the caster 14. The wire connector 284, thus, allows for swiveling of the stem 48 and movement of the first and second wires 286A, 286B without breaking the electrical contact between the wires 286A, 286B, 286C, 286D or twisting, tangling, or breaking the wires 286A, 286B.

Illustratively, the plurality of light emitting diodes 282 on the left side and the plurality of light emitting diodes 282 on the right side of the caster 14 are connected in series such that the wires 286A, 286B, 286C, 286D transmit power and electrical signals to both the plurality of light emitting diodes 282 on the left side and the plurality of light emitting diodes 282 on the right side of the caster 14.

Figure 9B:
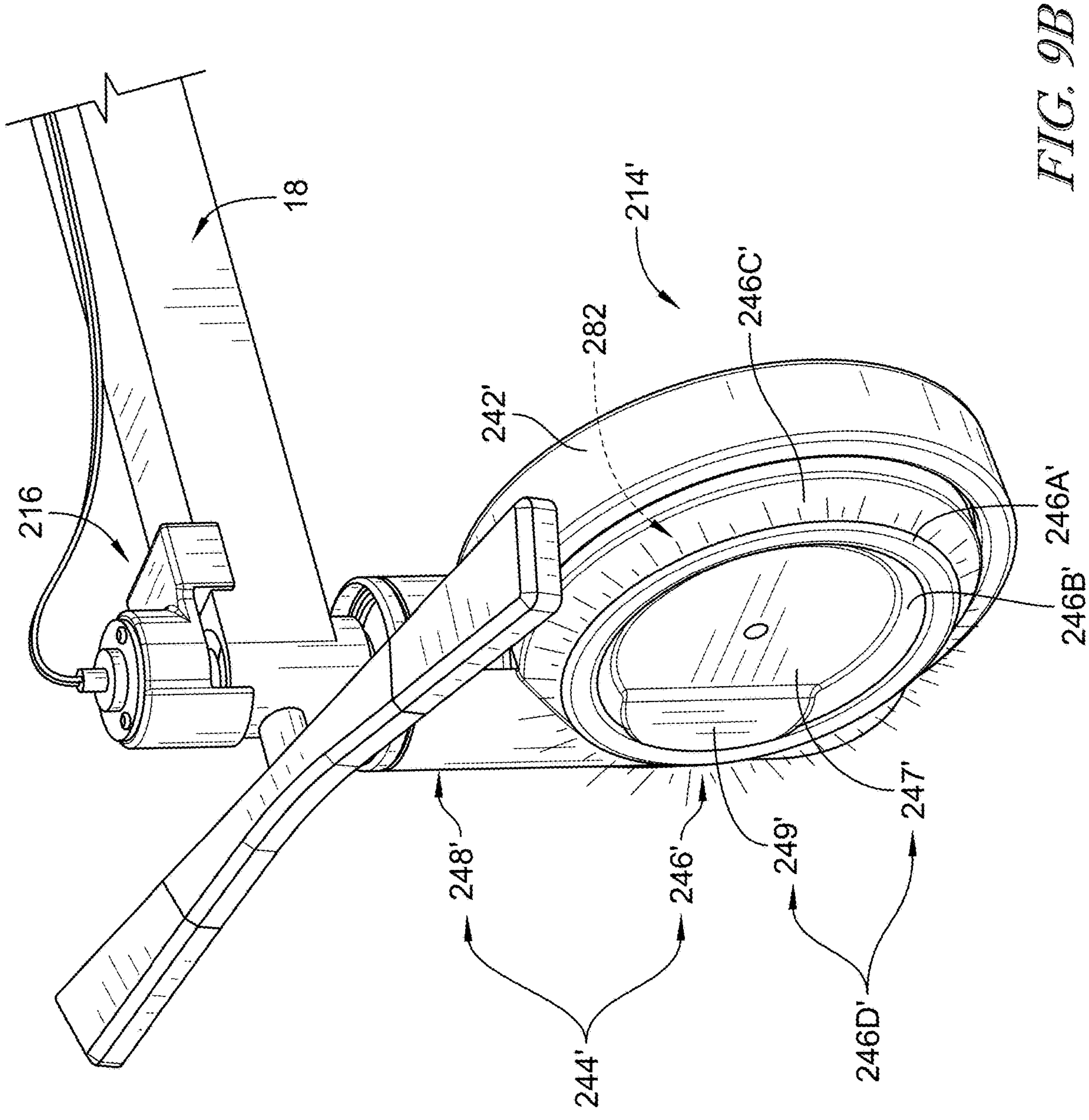
FIG. 9B is a perspective view of an alternative caster with the alternative status indicator light assembly of FIG. 9A, the caster including a cover.

Another embodiment of a caster 214' for use with the patient support apparatus 10 of FIG. 1 is shown in FIG. 9B. The caster 214' is substantially similar to the caster 14 shown in FIGS. 1-7 and 9A and described herein. Accordingly, similar reference numbers in the 200 series with a prime symbol indicate features that are common between the caster 214' and the caster 14. The description of the caster 14 is incorporated by reference to apply to the caster 214', except in instances when it conflicts with the specific description and the drawings of the caster 214'.

The caster 214' of FIG. 9B is shown with the alternative status indicator light assembly 216 of FIG. 9A. A single caster 214' is shown and described, however, the same description applies to each caster 214' included in the plurality of casters 214'. The plurality of casters 214' can be used with the status indicator light assembly 16 or the status indicator light assembly 216.

The caster 214' includes a caster wheel 242' and a caster housing 244', as shown in FIG. 9B. The caster wheel 242' rotates about a respective wheel axis to move the patient support apparatus 10 along the floor. The caster housing 244' swivels about a respective housing axis to alter a direction of the patient support apparatus 10. The caster housing 244' includes a body 246' and a stem 248' extending upwardly from the body 246' to couple to the lower frame 18. The caster wheel 242' is received in the caster housing 244' so that the caster housing 244' is arranged on both a right side and a left side of the caster wheel 242'.

The body 246' of the housing 244' of the caster 214' includes a translucent portion 246A', as shown in FIG. 9B. Illustratively, the translucent portion 246A' forms a circular shape extending circumferentially about the wheel axis.

In illustrative embodiments, the body 246' further includes non-translucent portions 246B', 246C', as shown in FIG. 9B. The non-translucent portion 246B' forms a central hub of the body 246', and the translucent portion 246A' extends around the non-translucent portion 246B'. The non-translucent portion 246C' extends away from the translucent portion 246A' toward the wheel 242'. The translucent portion 246A' is located between the non-translucent portion 246B' and the non-translucent portion 246C', as shown in FIG. 9B.

Both the right side and the left side of the body 246' are identical such that the body 246' includes two translucent portions 246A' (one on the right side and one on the left side), two non-translucent portion 246B' (one on the right side and one on the left side), and two non-translucent portion 246C' (one on the right side and one on the left side).

Illustratively, the caster 214' further includes a cover 246D', as shown in FIG. 9B. Because both the right side and the left side of the body 246' are identical, the caster 214' includes two covers 246D' (one on the right side and one on the left side). The cover 246D' is coupled to the non-translucent portion 246B'.

The cover 246D' includes a base 247' and a grip 249', as shown in FIG. 9B. The base 247' is illustratively substantially flat and coupled to an exterior of the non-translucent portion 246B', and the grip 249' extends outwardly away from the base 247' and the non-translucent portion 246B'. The grip 249' may be used to remove the cover 246D' from the body 246'. The cover 246D' covers and protects the plurality of light emitting diodes 282.

Figure 9C:
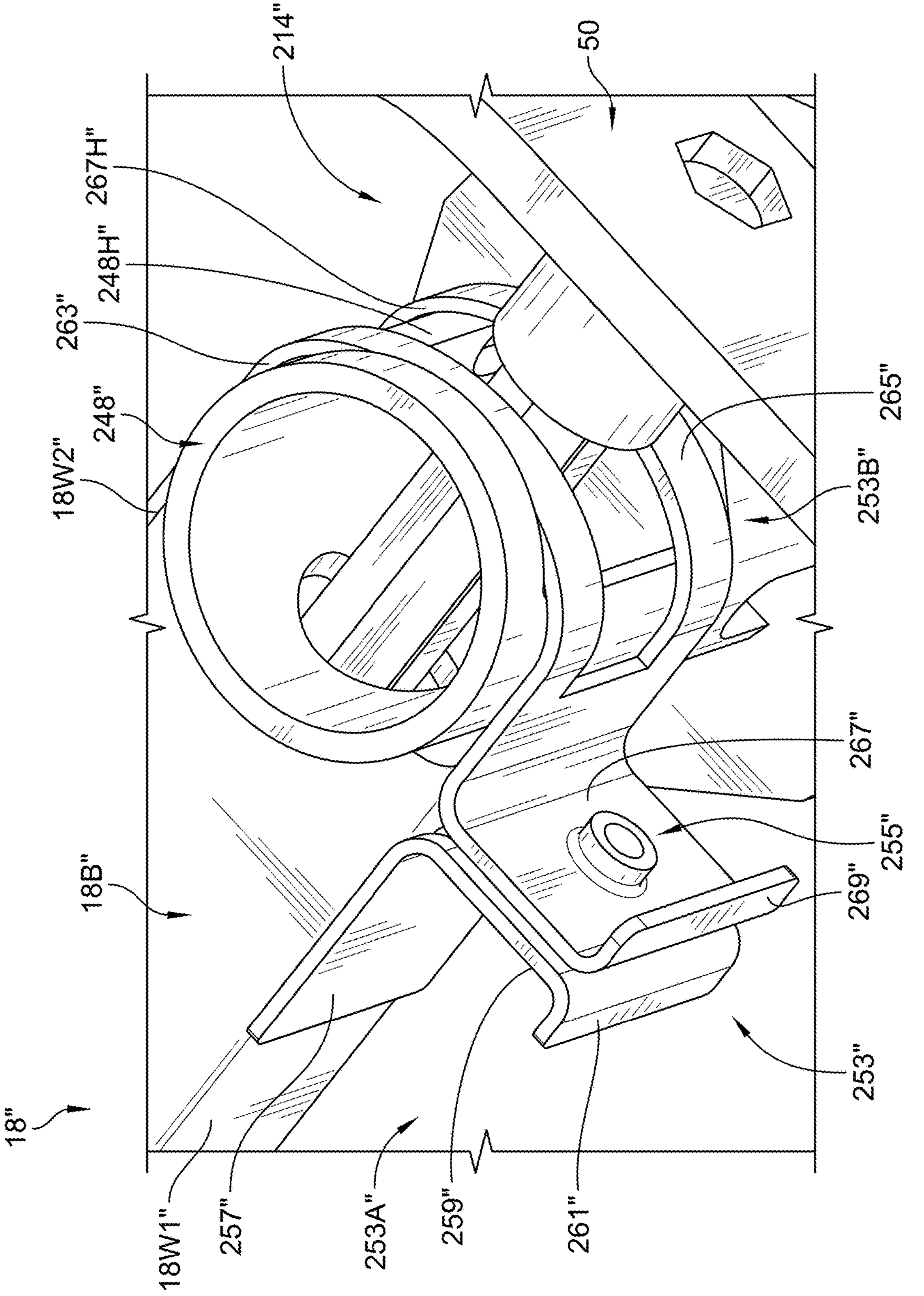
FIG. 9C is an enlarged view of an alternative coupling mechanism between the caster of FIG. 9B and the frame of the patient support apparatus of FIG. 1, the alternative coupling mechanism including a strap and a fastener that extends through the strap.

In some embodiments, as shown in FIG. 9C, a lower frame 18" and a caster 214" may be coupled together differently than the mechanism shown and described in FIG. 7. Thus, another embodiment of a connection mechanism between the lower frame 18" and the caster 214" is shown in FIG. 9C. The lower frame 18" is substantially similar to the lower frame 18 shown in FIGS. 1-7, 9A, and 9B and described herein. Accordingly, similar reference numbers with double prime symbols indicate features that are common between the lower frame 18" and the lower frame 18. The description of the lower frame 18 is incorporated by reference to apply to the lower frame 18", except in instances when it conflicts with the specific description and the drawings of the lower frame 18". The caster 214" is substantially similar to the previously described casters 14, 214, 214'. Accordingly, similar reference numbers in the 200 series with double prime symbols indicate features that are common between the caster 214" and the casters 14, 214, 214'. The description of the casters 14, 214, 214' is incorporated by reference to apply to the caster 214", except in instances when it conflicts with the specific description and the drawings of the caster 214".

As shown in FIG. 9C, the lower frame 18" illustratively includes a plurality of support bars 18B" that couple with the plurality of casters 214". For example, the lower frame 18" may include two support bars 18B" (one for the head end casters 214" and one for the foot end casters 214"). As another example, the lower frame 18" may include four support bars 18B" (one for each caster 214"). An upper portion of a stem 248" of the caster 214" is coupled with the support bar 18B" at a terminal end of the support bar 18B". The upper portion of the stem 248" and the support bar 18B" are coupled together via a strap 253" and a fastener 255".

Illustratively, the strap 253" includes a first band 253A" and a second band 253B", as shown in FIG. 9C. The first band 253A" is fixed to a first wall 18W1" of the support bar 18B". For example, the first band 253A" may be welded to the first wall 18W1" of the support bar 18B". The first band 253A" includes a first planar portion 257" and a second planar portion 259". The first planar portion 257" extends along and is coupled with the first wall 18W1" of the support bar 18B". The first planar portion 257" is illustratively substantially flat. The second planar portion 259" extends outwardly away from the first planar portion 257" and the first wall 18W1" of the support bar 18B". The second planar portion 259" is illustratively substantially flat and substantially perpendicular to the first planar portion 257". In some embodiments, the first band 253A" further includes a third planar portion 261" that extends outwardly away from the second planar portion 259" in the same direction that the first planar portion 257" extends such that the third planar portion 261" is substantially parallel to the first planar portion 257" and substantially perpendicular to the second planar portion 259".

The second band 253B" is shaped to extend around the upper portion of the stem 248", as shown in FIG. 9C. The second band 253B" includes a first planar portion 263", a rounded portion 265", and a second planar portion 267". The first planar portion 263" extends along a second wall 18W2"

of the support bar 18B" and along the upper portion of the stem 248". The first planar portion 263" is illustratively substantially flat and substantially parallel to the first planar portion 257" of the first band 253A". The rounded portion 265" extends between and interconnects the first and second planar portions 263", 267". The rounded portion 265" extends around the upper portion of the stem 248" to locate the stem 248" between the terminal end of the support bar 18B" and the rounded portion 265". The rounded portion 265" matches a contour of the upper portion of the stem 248". The second planar portion 267" extends outwardly away from the rounded portion 265" and the first wall 18W1" of the support bar 18B". The second planar portion 267" is illustratively substantially flat, substantially perpendicular to the first planar portion 263" of the second band 253B", and substantially parallel to the second planar portion 259" of the first band 253A". In some embodiments, the second band 253B" further includes a third planar portion 269" that extends outwardly away from the second planar portion 267" in a direction opposite the third planar portion 261" of the first band 253A".

The second planar portion 259" of the first band 253A" and the second planar portion 267" of the second band 253B" are located adjacent one another, as shown in FIG. 9C. The fastener 255" extends through the second planar portion 259" of the first band 253A" and the second planar portion 267" of the second band 253B" to couple the bands 253A", 253B" together. The fastener 255" may include a screw, a bolt, a pin, a rivet, a nail, or any other suitable fastener. Because the second band 253B" extends around the stem 248" of the caster 214", coupling the bands 253A", 253B" together couples the caster 214" to the lower frame 18". A shaft of the actuator 50 extends through a hole 267H" formed in the second planar portion 267" of the second band 253B", through a hole 248H" of the stem 248" of the caster 214", and through the support bar 18B", as shown in FIG. 9C.

Figure 10:
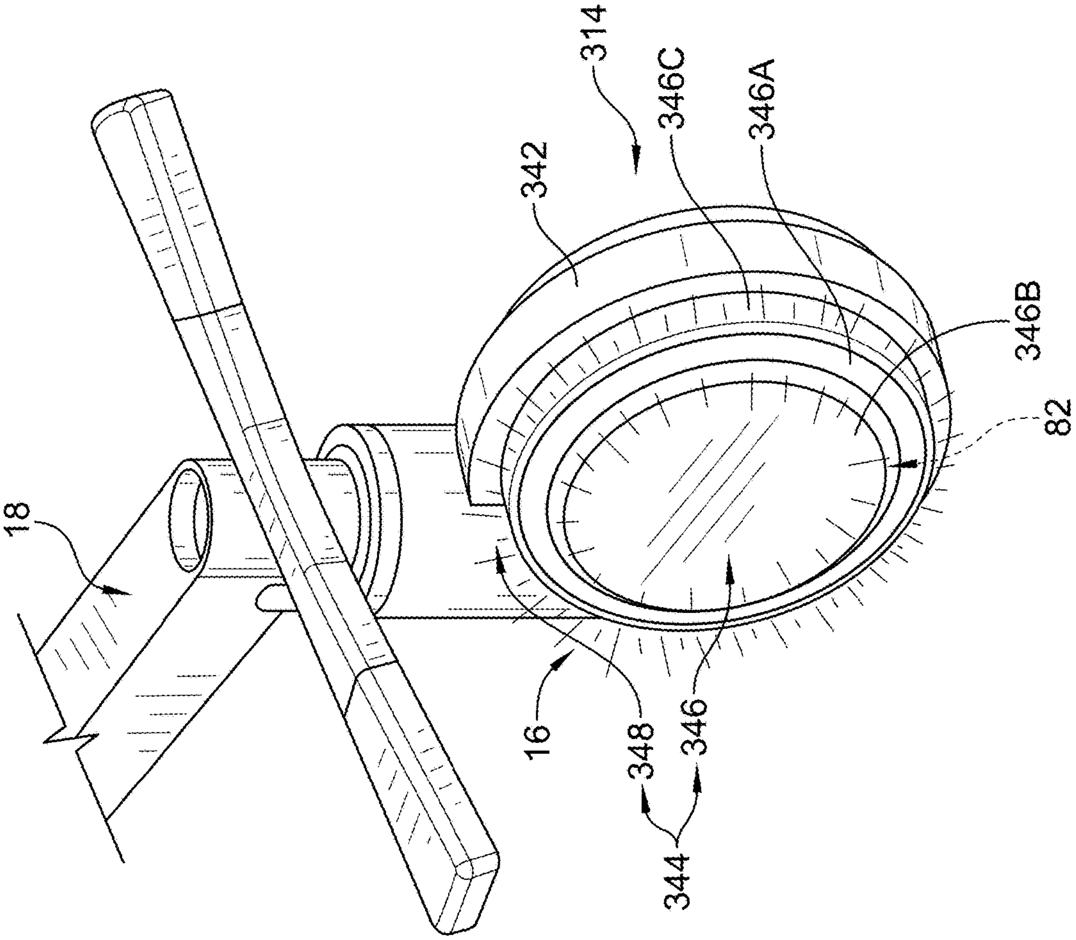

Another embodiment of a caster 314 for use with the patient support apparatus 10 of FIG. 1 is shown in FIG. 10. The caster 314 is substantially similar to the caster 14 shown in FIGS. 1-7 and 9A and described herein and the caster 214' shown in FIG. 9B and described herein. Accordingly, similar reference numbers in the 300 series indicate features that are common between the caster 314 and the caster 14, 214'. The description of the caster 14, 214' is incorporated by reference to apply to the caster 314, except in instances when it conflicts with the specific description and the drawings of the caster 314.

A single caster 314 is shown and described, however, the same description applies to each caster 314 included in the plurality of casters 314. The plurality of casters 314 can be used with the status indicator light assembly 16 or the status indicator light assembly 216.

The caster 314 includes a caster wheel 342 and a caster housing 344, as shown in FIG. 10. The caster wheel 342 rotates about a respective wheel axis to move the patient support apparatus 10 along the floor. The caster housing 344 swivels about a respective housing axis to alter a direction of the patient support apparatus 10. The caster housing 344 includes a body 346 and a stem 348 extending upwardly from the body 346 to couple to the lower frame 18. The caster wheel 342 is received in the caster housing 344 so that the caster housing 344 is arranged on both a right side and a left side of the caster wheel 342.

The body 346 of the housing 344 of the caster 314 includes a translucent portion 346A, as shown in FIG. 10. Illustratively, the translucent portion 346A forms a circular shape extending circumferentially about the wheel axis.

In illustrative embodiments, the body 346 further includes non-translucent portions 346B, 346C, as shown in FIG. 10. The non-translucent portion 346B forms a central hub of the body 346, and the translucent portion 346A extends around the non-translucent portion 346B. The translucent portion 346A and the non-translucent portion 346B form a side face of the body 346. The non-translucent portion 346C extends away from the translucent portion 346A toward the wheel 342. The non-translucent portion 346C forms an outer surface of the body 346. The translucent portion 346A is located between the non-translucent portion 346B and the non-translucent portion 346C, as shown in FIG. 10.

Both the right side and the left side of the body 346 are identical such that the body 346 includes two translucent portions 346A (one on the right side and one on the left side), two non-translucent portion 346B (one on the right side and one on the left side), and two non-translucent portion 346C (one on the right side and one on the left side).

The plurality of light emitting diodes 82 of the status indicator light assembly 16 is coupled to an interior surface of the body 346 of the housing 344 on both the right and left sides. Because the plurality of light emitting diodes 82 is located interior to or inside of the housing 344, the plurality of light emitting diodes 82 emits light (the visual indicators V1, V2, V3, V4) through the translucent portions 346A included on each side of the caster 314. As such, both the right and left sides of the caster 314 are illuminated with the visual indicators V1, V2, V3, V4.

In some embodiments, when illuminated, the plurality of light emitting diodes 82 that forms the visual indicators V1, V2, V3, V4 forms a circular shape that extends circumferentially about the wheel axis when viewed from the right or left side of the caster 314. When illuminated, the plurality of light emitting diodes 82 that forms the visual indicators V1, V2, V3, V4 extends around a circumference of the body 346 of the housing 344.

Though shown as a circular shape, the translucent portion 346A may have any shape or size such that the plurality of light emitting diodes 82 creates a specific light design while illuminated. In some embodiments, the body 346 of the housing 344 is entirely translucent. In some embodiments, the housing 344 is entirely translucent.

Figure 11:
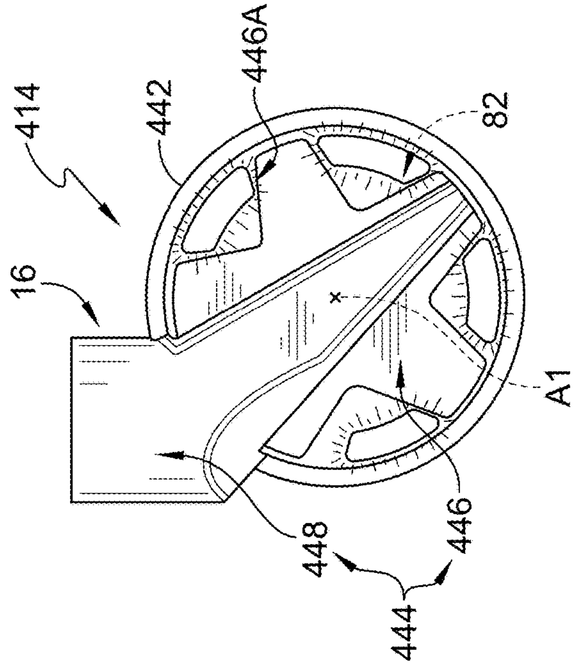

Another embodiment of a caster 414 for use with the patient support apparatus 10 of FIG. 1 is shown in FIG. 11. The caster 414 is substantially similar to the caster 14 shown in FIGS. 1-7 and 9A and described herein, the caster 214' shown in FIG. 9B and described herein, and the caster 314 shown in FIG. 10 and described herein. Accordingly, similar reference numbers in the 400 series indicate features that are common between the caster 414, the caster 314, the caster 214', and the caster 14. The description of the caster 14, 214', 314 is incorporated by reference to apply to the caster 414, except in instances when it conflicts with the specific description and the drawings of the caster 414.

A single caster 414 is shown and described, however, the same description applies to each caster 414 included in the plurality of casters 414. The plurality of casters 414 can be used with the status indicator light assembly 16 or the status indicator light assembly 216.

The caster 414 includes a caster wheel 442 and a caster housing 444, as shown in FIG. 11. The caster wheel 442 rotates about a wheel axis A1 to move the patient support apparatus 10 along the floor. The caster housing 444 swivels about a housing axis to alter a direction of the patient support apparatus 10. The caster housing 444 includes a body 446 and a stem 448 extending upwardly from the body 446 to couple to the lower frame 18. The caster wheel 442 is received in the caster housing 444 so that the caster housing 444 is arranged on both a right side and a left side of the caster wheel 442.

The body 446 of the housing 444 of the caster 414 includes a plurality of translucent portions 446A, as shown in FIG. 11. Illustratively, the plurality of translucent portions 446A is spaced apart circumferentially about the wheel axis A1 adjacent a circumference of the body 446. The plurality of translucent portions 446A is included on a side face of the body 446.

Both the right side and the left side of the body 446 are identical such that the body 446 includes the plurality of translucent portions 446A on the right side and the left side thereof.

The plurality of light emitting diodes 82 of the status indicator light assembly 16 is coupled to an interior surface of the body 446 of the housing 444 on both the right and left sides. Because the plurality of light emitting diodes 82 is located interior to or inside of the housing 444, the plurality of light emitting diodes 82 emits light (the visual indicators V1, V2, V3, V4) through the plurality of translucent portions 446A included on each side of the caster 414. As such, both the right and left sides of the caster 414 are illuminated with the visual indicators V1, V2, V3, V4. The plurality of translucent portions 446A allows the visual indicators V1, V2, V3, V4 to flicker during transport of the patient support apparatus 10.

In some embodiments, when illuminated, the plurality of light emitting diodes 82 that forms the visual indicators V1, V2, V3, V4 forms a circular shape that extends circumferentially about the wheel axis A1 when viewed from the right or left side of the caster 414, as shown in FIG. 11. When illuminated, the plurality of light emitting diodes 82 that forms the visual indicators V1, V2, V3, V4 extends around a circumference of the body 446 of the housing 444.

In some embodiments, the plurality of translucent portions 446A emit light differently around the circumference of the body 446 to depict a charge level of the battery 61 or a different battery included in the patient support apparatus 10. For example, if the battery charge level is at or near 100%, light is emitted from all of the plurality of translucent portions 446A. As another example, if the battery charge level is at or near 50%, light is emitted from the plurality of translucent portions 446A on one half of the caster 414. As another example, if the battery charge level is at or near 25%, light is emitted from the plurality of translucent portions 446A on one quarter of the caster 414. In other words, the plurality of translucent portions 446A emit light differently around the circumference of the body 446 depending on the battery charge level so that a caregiver may estimate the battery charge level based on the emitted light.

Figure 12:
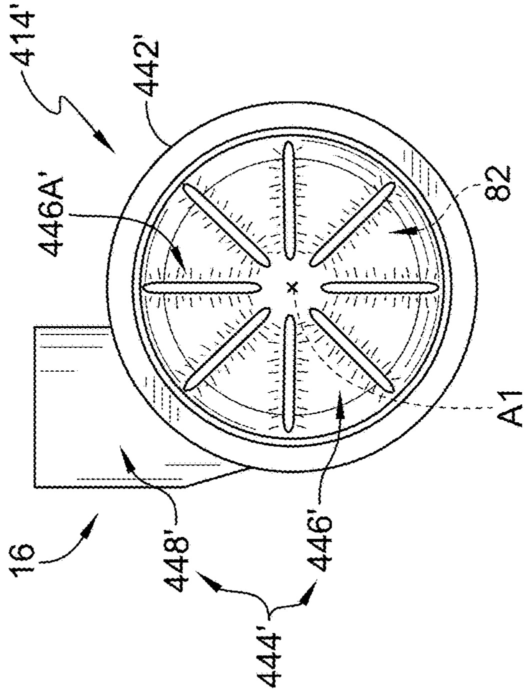

Another embodiment of a caster 414' for use with the patient support apparatus 10 of FIG. 1 is shown in FIG. 12. The caster 414' is substantially similar to the caster 14 shown in FIGS. 1-7 and 9A and described herein, the caster 214' shown in FIG. 9B and described herein, the caster 314 shown in FIG. 10 and described herein, and the caster 414 shown in FIG. 11 and described herein. Accordingly, similar reference numbers in the 400 series with a prime symbol indicate features that are common between the caster 414', the caster 414, the caster 314, the caster 214', and the caster 14. The description of the caster 14, 214', 314, 414 is incorporated by reference to apply to the caster 414', except in instances when it conflicts with the specific description and the drawings of the caster 414'.

A single caster 414' is shown and described, however, the same description applies to each caster 414' included in the plurality of casters 414'. The plurality of casters 414' can be used with the status indicator light assembly 16 or the status indicator light assembly 216.

The caster 414' includes a caster wheel 442' and a caster housing 444', as shown in FIG. 12. The caster wheel 442' rotates about a wheel axis A1 to move the patient support apparatus 10 along the floor. The caster housing 444' of swivels about a housing axis to alter a direction of the patient support apparatus 10. The caster housing 444' includes a body 446' and a stem 448' extending upwardly from the body 446' to couple to the lower frame 18. The caster wheel 442' is received in the caster housing 444' so that the caster housing 444' is arranged on both a right side and a left side of the caster wheel 442'.

The body 446' of the housing 444' of the caster 414' includes a plurality of translucent portions 446A'', as shown in FIG. 12. Illustratively, the plurality of translucent portions 446A' is spaced apart circumferentially about the wheel axis A1. The plurality of translucent portions 446A' is included on a side face of the body 446'. Each of the plurality of translucent portions 446A' extends from a position adjacent a central point of the body 446' through which the wheel axis A1 extends to a position adjacent a circumference of the body 446'.

Both the right side and the left side of the body 446' are identical such that the body 446' includes the plurality of translucent portions 446A' on the right side and the left side thereof.

The plurality of light emitting diodes 82 of the status indicator light assembly 16 is coupled to an interior surface of the body 446' of the housing 444' on both the right and left sides. Because the plurality of light emitting diodes 82 is located interior to or inside of the housing 444', the plurality of light emitting diodes 82 emits light (the visual indicators V1, V2, V3, V4) through the plurality of translucent portions 446A' included on each side of the caster 414'. As such, both the right and left sides of the caster 414' are illuminated with the visual indicators V1, V2, V3, V4.

In some embodiments, the plurality of translucent portions 446A' emit light differently around the circumference of the body 446' to depict a charge level of the battery 61 or a different battery included in the patient support apparatus 10. For example, if the battery charge level is at or near 100%, light is emitted from all of the plurality of translucent portions 446A''. As another example, if the battery charge level is at or near 50%, light is emitted from the plurality of translucent portions 446A' on one half of the caster 414'. As another example, if the battery charge level is at or near 25%, light is emitted from the plurality of translucent portions 446A' on one quarter of the caster 414'. In other words, the plurality of translucent portions 446A' emit light differently around the circumference of the body 446' depending on the battery charge level so that a caregiver may estimate the battery charge level based on the emitted light.

Figure 13:
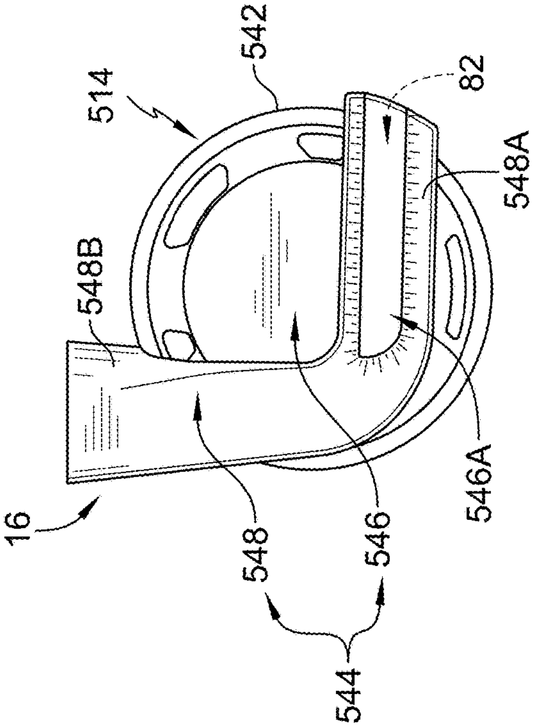

Another embodiment of a caster 514 for use with the patient support apparatus 10 of FIG. 1 is shown in FIG. 13. The caster 514 is substantially similar to the caster 14, 214', 314, 414, 414'. Accordingly, similar reference numbers in the 500 series indicate features that are common between the caster 514 and caster 14, 214', 314, 414, 414'. The description of the caster 14, 214', 314, 414, 414' is incorporated by reference to apply to the caster 514, except in instances when it conflicts with the specific description and the drawings of the caster 514.

A single caster 514 is shown and described, however, the same description applies to each caster 514 included in the plurality of casters 514. The plurality of casters 514 can be used with the status indicator light assembly 16 or the status indicator light assembly 216.

The caster 514 includes a caster wheel 542 and a caster housing 544, as shown in FIG. 13. The caster wheel 542 rotates about a wheel axis to move the patient support apparatus 10 along the floor. The caster housing 544 swivels about a housing axis to alter a direction of the patient support apparatus 10. The caster housing 544 includes a body 546 and a stem 548 extending upwardly from the body 546 to couple to the lower frame 18. The caster wheel 542 is received in the caster housing 544 so that the caster housing 544 is arranged on both a right side and a left side of the caster wheel 542. The stem 548 is illustratively L-shaped with a lower portion 548A of the L-shape (i.e., a horizontal portion) coupled to the body 546 of the housing 544 and an upper portion 548B of the L-shape (i.e., the vertical portion) extending upwardly from the body 546 to couple to the lower frame 18.

The lower portion 548A of the stem 548 includes a translucent portion 546A, as shown in FIG. 13. Illustratively, the translucent portion 546A extends along the lower portion 548A of the stem 548 substantially horizontal to the floor underlying the patient support apparatus 10. Both the right side and the left side of the stem 548 are identical such that the stem 548 includes the translucent portion 546A on the right side and the left side thereof.

The plurality of light emitting diodes 82 of the status indicator light assembly 16 is coupled to an interior surface of the body 546 of the housing 544 on both the right and left sides. Because the plurality of light emitting diodes 82 is located interior to or inside of the housing 544, the plurality of light emitting diodes 82 emits light (the visual indicators V1, V2, V3, V4) through the translucent portion 546A included on each side of the caster 514. As such, both the right and left sides of the caster 514 are illuminated with the visual indicators V1, V2, V3, V4.

In some embodiments, the translucent portion 546A emits light similar to a battery charge icon to depict a charge level of the battery 61 or a different battery included in the patient support apparatus 10. For example, if the battery charge level is at or near 100%, light is emitted throughout the entirety of the translucent portion 546A. As another example, if the battery charge level is at or near 50%, light is emitted from half of the translucent portion 546A. As another example, if the battery charge level is at or near 25%, light is emitted one quarter of the translucent portion 546A.

Figure 14:
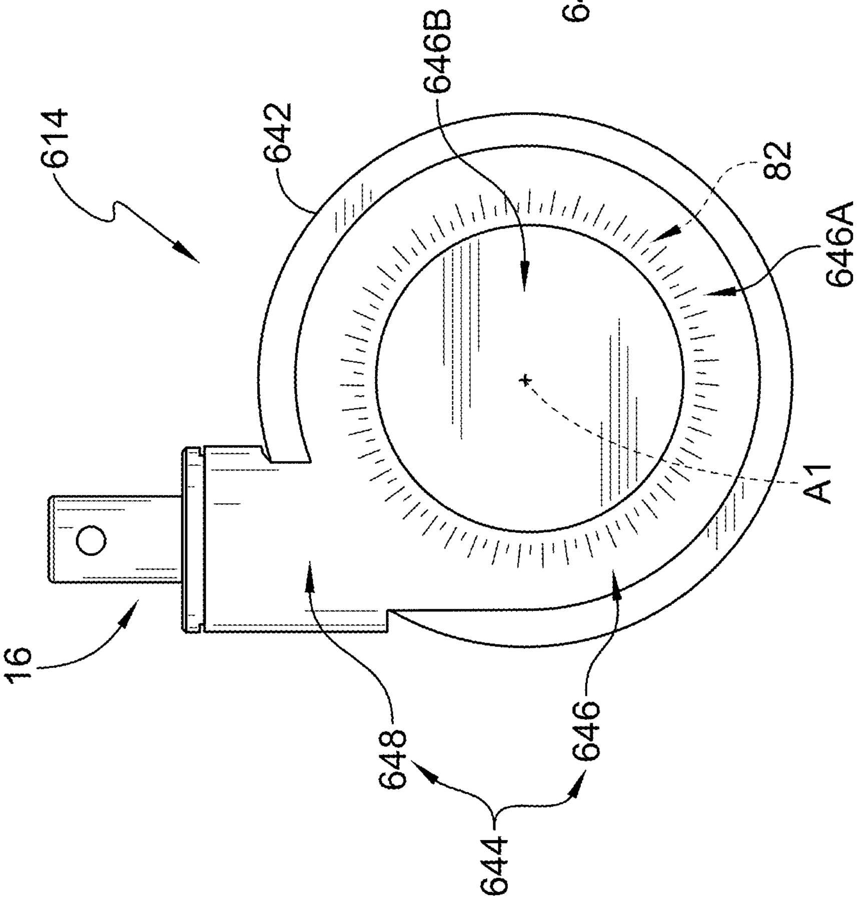
FIG. 14 is a perspective view of an alternative caster for use with the patient support apparatus of FIG. 1 showing that the caster includes a hub back-lit with the first, second, third, and fourth visual indicators.

Another embodiment of a caster 614 for use with the patient support apparatus 10 of FIG. 1 is shown in FIG. 14. The caster 614 is substantially similar to the caster 14, 214', 314, 414, 414', 514. Accordingly, similar reference numbers in the 600 series indicate features that are common between the caster 614 and caster 14, 214', 314, 414, 414', 514. The description of the caster 14, 214', 314, 414, 414', 514 is incorporated by reference to apply to the caster 614, except in instances when it conflicts with the specific description and the drawings of the caster 614.

A single caster 614 is shown and described, however, the same description applies to each caster 614 included in the plurality of casters 614. The plurality of casters 614 can be used with the status indicator light assembly 16 or the status indicator light assembly 216.

The caster 614 includes a caster wheel 642 and a caster housing 644, as shown in FIG. 14. The caster wheel 642 rotates about a wheel axis A1 to move the patient support apparatus 10 along the floor. The caster housing 644 swivels about a housing axis to alter a direction of the patient support apparatus 10. The caster housing 644 includes a body 646 and a stem 648 extending upwardly from the body 646 to couple to the lower frame 18. The caster wheel 642 is received in the caster housing 644 so that the caster housing 644 is arranged on both a right side and a left side of the caster wheel 642.

The body 646 of the housing 644 of the caster 614 includes a base 646A and a hub 646B, as shown in FIG. 14. Illustratively, a gap is formed between a back face of the hub 646B that faces toward the base 646A and a front face of the base 646A that faces toward the back face of the hub 646B. Both the right side and the left side of the body 646 are identical such that the body 646 includes two hubs 646B that cooperate with the base 646A to form two different gaps.

The plurality of light emitting diodes 82 of the status indicator light assembly 16 is coupled to an interior surface of the body 646 of the housing 644 on both the right and left sides. Because the plurality of light emitting diodes 82 is located interior to or inside of the housing 644, the plurality of light emitting diodes 82 emits light (the visual indicators V1, V2, V3, V4) through the gap between the base 646A and the hub 646B on each side of the caster 614. As such, both the right and left sides of the caster 614 are illuminated with the visual indicators V1, V2, V3, V4.

In some embodiments, when illuminated, the plurality of light emitting diodes 82 that forms the visual indicators V1, V2, V3, V4 forms a circular shape that extends circumferentially about the wheel axis A1. When illuminated, the plurality of light emitting diodes 82 that forms the visual indicators V1, V2, V3, V4 extends around a circumference of the hub 646B. In other words, the hub 646B is backlit by the plurality of light emitting diodes 82. Though shown as a circular shape, the hub 646B may have any shape or size such that the plurality of light emitting diodes 82 creates a specific light design while illuminated.

Figure 15:
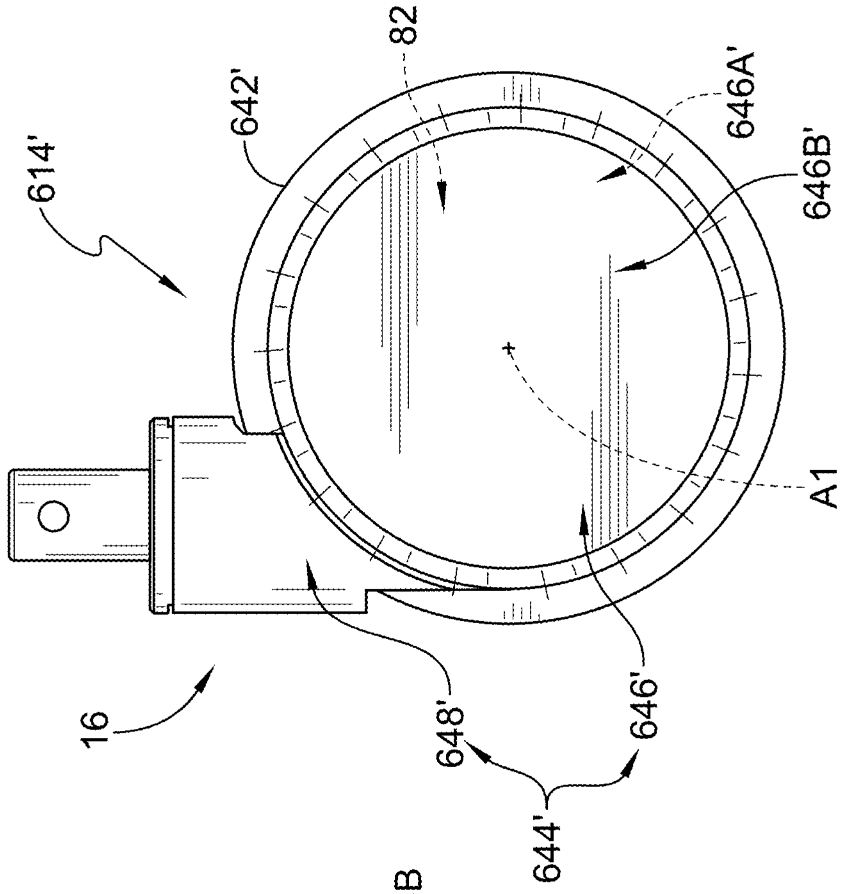
FIG. 15 is a perspective view of an alternative caster for use with the patient support apparatus of FIG. 1 showing that the caster includes a hub back-lit with the first, second, third, and fourth visual indicators.

Another embodiment of a caster 614' for use with the patient support apparatus 10 of FIG. 1 is shown in FIG. 15. The caster 614' is substantially similar to the caster 14, 214', 314, 414, 414', 514, 614. Accordingly, similar reference numbers in the 600 series with a prime symbol indicate features that are common between the caster 614' and caster 14, 214', 314, 414, 414', 514, 614. The description of the caster 14, 214', 314, 414, 414', 514, 614 is incorporated by reference to apply to the caster 614', except in instances when it conflicts with the specific description and the drawings of the caster 614'.

A single caster 614' is shown and described, however, the same description applies to each caster 614' included in the plurality of casters 614'. The plurality of casters 614' can be used with the status indicator light assembly 16 or the status indicator light assembly 216.

The caster 614' includes a caster wheel 642' and a caster housing 644', as shown in FIG. 15. The caster wheel 642' rotates about a wheel axis A1 to move the patient support apparatus 10 along the floor. The caster housing 644' swivels about a housing axis to alter a direction of the patient support apparatus 10. The caster housing 644' includes a body 646' and a stem 648' extending upwardly from the body 646' to couple to the lower frame 18. The caster wheel 642' is received in the caster housing 644' so that the caster housing 644' is arranged on both a right side and a left side of the caster wheel 642'.

The body 646' of the housing 644' of the caster 614' includes a base 646A' and a hub 646B", as shown in FIG. 15. Illustratively, a gap is formed between a back face of the hub 646B' that faces toward the base 646A' and a front face of the base 646A' that faces toward the back face of the hub 646B".

The plurality of light emitting diodes 82 of the status indicator light assembly 16 is coupled to an interior surface of the body 646' of the housing 644' on both the right and left sides. Because the plurality of light emitting diodes 82 is located interior to or inside of the housing 644', the plurality of light emitting diodes 82 emits light (the visual indicators V1, V2, V3, V4) through the gap between the base 646A' and the hub 646B' on each side of the caster 614'. As such, both the right and left sides of the caster 614' are illuminated with the visual indicators V1, V2, V3, V4.

As shown in FIGS. 14 and 15, the hub 646B, 646B' may have a varying diameter such that the visual indicators V1, V2, V3, V4 have varying diameters. For example, the hub 646B as shown in FIG. 14 has a smaller diameter than the hub 646B' as shown in FIG. 15.

In some embodiments, when illuminated, the plurality of light emitting diodes 82 that forms the visual indicators V1, V2, V3, V4 forms a circular shape that extends circumferentially about the wheel axis A1. When illuminated, the plurality of light emitting diodes 82 that forms the visual indicators V1, V2, V3, V4 extends around a circumference of the hub 646B". In other words, the hub 646B' is backlit by the plurality of light emitting diodes 82. Though shown as a circular shape, the hub 646B' may have any shape or size such that the plurality of light emitting diodes 82 creates a specific light design while illuminated.

Figure 16:
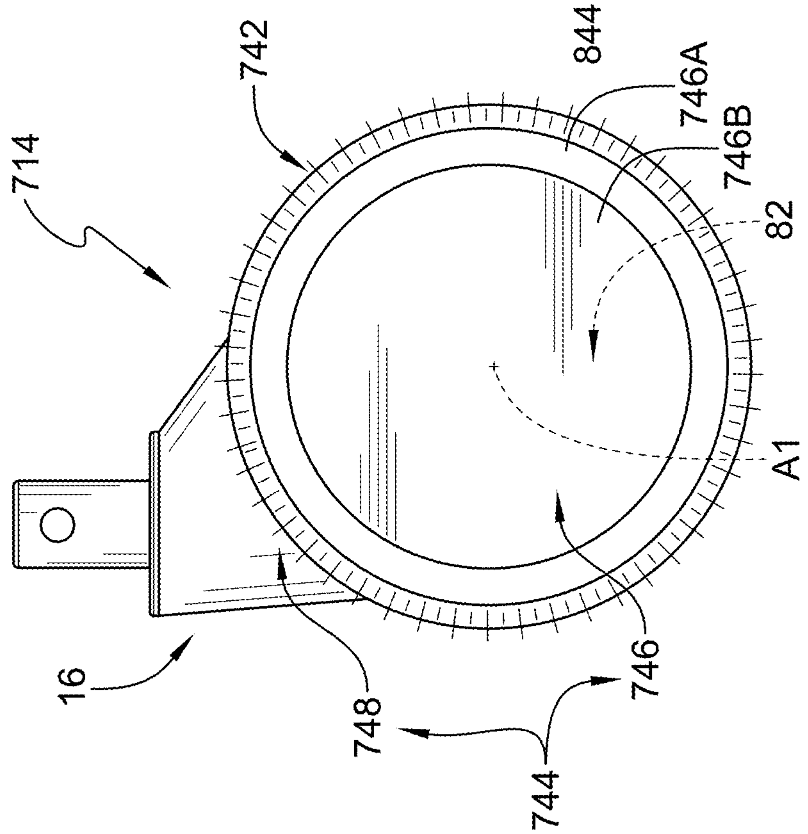
FIG. 16 is a perspective view of an alternative caster for use with the patient support apparatus of FIG. 1 showing that the caster includes an illuminated hub with the first, second, third, and fourth visual indicators.

Another embodiment of a caster 714 for use with the patient support apparatus 10 of FIG. 1 is shown in FIG. 16. The caster 714 is substantially similar to the caster 14, 214', 314, 414, 414', 514, 614, 614'. Accordingly, similar reference numbers in the 700 series indicate features that are common between the caster 714 and caster 14, 214', 314, 414, 414', 514, 614, 614'. The description of the caster 14, 214', 314, 414, 414', 514, 614, 614' is incorporated by reference to apply to the caster 714, except in instances when it conflicts with the specific description and the drawings of the caster 714.

A single caster 714 is shown and described, however, the same description applies to each caster 714 included in the plurality of casters 714. The plurality of casters 714 can be used with the status indicator light assembly 16 or the status indicator light assembly 216.

The caster 714 includes a caster wheel 742 and a caster housing 744, as shown in FIG. 16. The caster wheel 742 rotates about a wheel axis A1 to move the patient support apparatus 10 along the floor. The caster housing 744 swivels about a housing axis to alter a direction of the patient support apparatus 10. The caster housing 744 includes a body 746 and a stem 748 extending upwardly from the body 746 to couple to the lower frame 18. The caster wheel 742 is received in the caster housing 744 so that the caster housing 744 is arranged on both a right side and a left side of the caster wheel 742.

The body 746 of the housing 744 of the caster 714 includes a translucent ring 746A and a non-translucent hub 746B, as shown in FIG. 16. The translucent ring 746A extends around the non-translucent hub 746B. Both the right side and the left side of the body 746 are identical such that the body 746 includes two translucent rings 746A and two non-translucent hubs 746B.

The plurality of light emitting diodes 82 of the status indicator light assembly 16 is coupled to an interior surface of the body 746 of the housing 744 on both the right and left sides. Because the plurality of light emitting diodes 82 is located interior to or inside of the housing 744, the plurality of light emitting diodes 82 emits light (the visual indicators V1, V2, V3, V4) through the translucent ring 746A on each side of the caster 714 to illuminate the non-translucent hub 746B. As such, both the right and left sides of the caster 714 are illuminated with the visual indicators V1, V2, V3, V4.

Figure 17:
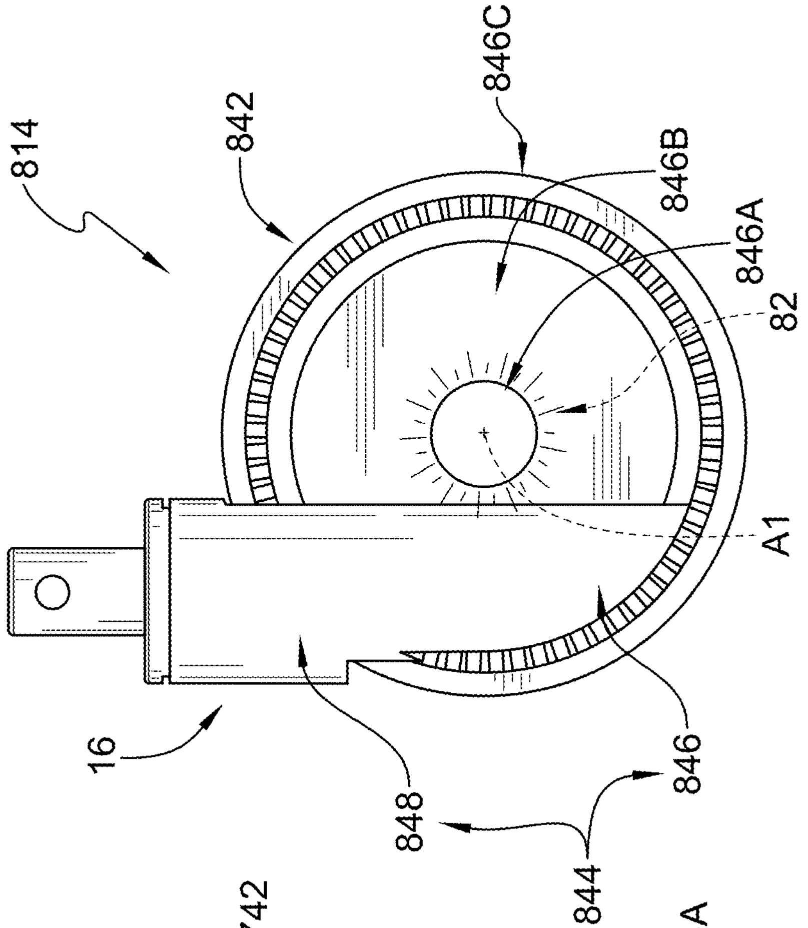

Another embodiment of a caster 814 for use with the patient support apparatus 10 of FIG. 1 is shown in FIG. 17. The caster 814 is substantially similar to the caster 14, 214', 314, 414, 414', 514, 614, 614', 714. Accordingly, similar reference numbers in the 800 series indicate features that are common between the caster 814 and caster 14, 214', 314, 414, 414', 514, 614, 614', 714. The description of the caster 14, 214', 314, 414, 414', 514, 614, 614', 714 is incorporated by reference to apply to the caster 814, except in instances when it conflicts with the specific description and the drawings of the caster 814.

A single caster 814 is shown and described, however, the same description applies to each caster 814 included in the plurality of casters 814. The plurality of casters 814 can be used with the status indicator light assembly 16 or the status indicator light assembly 216.

The caster 814 includes a caster wheel 842 and a caster housing 844, as shown in FIG. 17. The caster wheel 842 rotates about a wheel axis A1 to move the patient support apparatus 10 along the floor. The caster housing 844 swivels about a housing axis to alter a direction of the patient support apparatus 10. The caster housing 844 includes a body 846 and a stem 848 extending upwardly from the body 846 to couple to the lower frame 18. The caster wheel 842 is received in the caster housing 844 so that the caster housing 844 is arranged on both a right side and a left side of the caster wheel 842.

The body 846 of the housing 844 of the caster 814 includes a central translucent portion 846A, a non-translucent portion 846B, and a vented portion 846C, as shown in FIG. 17. The central translucent portion 846A is located at a center point of the body 846 through which the wheel axis A1 extends. The non-translucent portion 846B extends around the central translucent portion 846A to interconnect the central translucent portion 846A and the vented portion 846C. The vented portion 846C includes slats through which the plurality of light emitting diodes 82 emits light through. Both the right side and the left side of the body 846 are identical such that the body 846 includes two central translucent portions 846A, two non-translucent portions 846B, and two vented portions 846C.

The plurality of light emitting diodes 82 of the status indicator light assembly 16 is coupled to an interior surface of the body 846 of the housing 844 on both the right and left sides. Because the plurality of light emitting diodes 82 is located interior to or inside of the housing 844, the plurality of light emitting diodes 82 emits light (the visual indicators V1, V2, V3, V4) through the central translucent portion 846A and the vented portion 846C on each side of the caster 814. As such, both the right and left sides of the caster 814 are illuminated with the visual indicators V1, V2, V3, V4.

Figure 18:
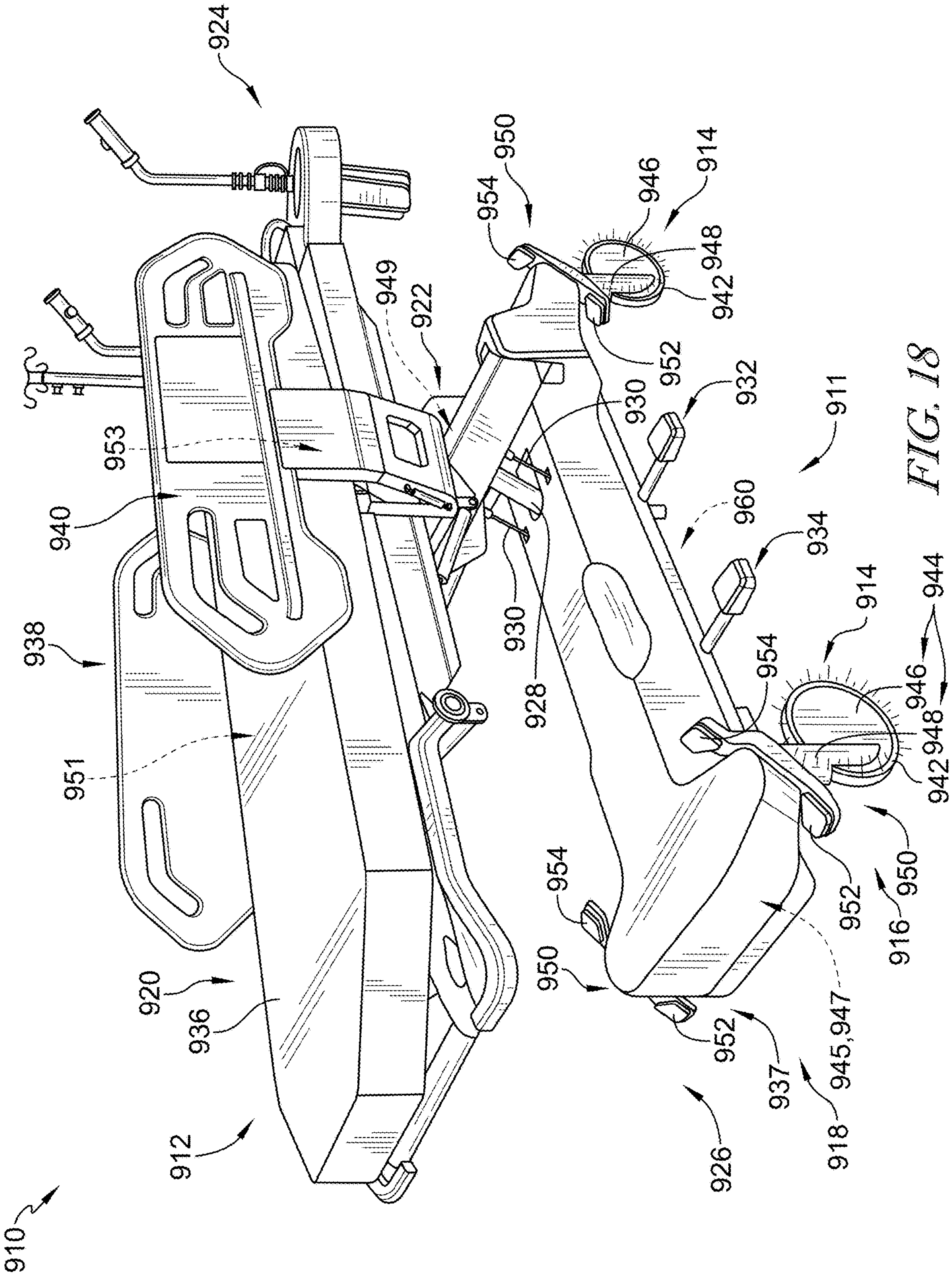
FIG. 18 is a perspective view of an alternative patient support apparatus showing that a status indicator light assembly is coupled with each of the plurality of wheels, and the status indicator light assembly includes a light emitting diode field coupled to an exterior of each of the plurality of wheels.

Another embodiment of a patient support apparatus 910 is shown in FIG. 18. The patient support apparatus 910 is substantially similar to patient support apparatus 10 shown in FIGS. 1-8 and described herein. Accordingly, similar reference numbers in the 900 series indicate features that are common between the patient support apparatus 910 and the patient support apparatus 10. The description of the patient support apparatus 10 is incorporated by reference to apply to the patient support apparatus 910, except in instances when it conflicts with the specific description and the drawings of the patient support apparatus 910.

The patient support apparatus 910 includes a frame 912, a plurality of wheels 911 including a plurality of casters 914 and an auxiliary wheel 960, and the status indicator light assembly 916, as shown in FIG. 18. The frame 912 illustratively includes a lower frame 918 and an upper frame 920. The lower frame 918 is supported on the plurality of casters 914 and/or the auxiliary wheel 960 above a floor underlying the patient support apparatus 910. The plurality of casters 914 and/or the auxiliary wheel 960 rolls along the floor as the patient support apparatus 910 is transported from one location to another. The upper frame 920 is configured to support a patient thereon. The status indicator light assembly 916 is illustratively coupled with each of the plurality of wheels 911 to provide notice to surrounding areas that the plurality of casters 914 is in the brake mode or the non-brake mode.

The lower frame 918 supports a lift mechanism 922 near a head end 924 of the patient support apparatus 910, as shown in FIG. 18. The patient support apparatus 910 extends between the head end 924 and a foot end 926 thereof. The lift mechanism 922 provides cantilevered support of the upper frame 920 and is configured to raise, lower, and tilt the upper frame 920 relative to the lower frame 918 while the lift mechanism 922 is activated. The position of the lift mechanism 922 and the upper frame 920 relative to the lower frame 918 is determined by a sensor 949.

In some embodiments, the lift mechanism 922 is operated by a hydraulic cylinder 928 that is assisted by a pair of gas springs 930 as the lift mechanism 922 moves between various positions, as shown in FIG. 18. The hydraulic cylinder 928 is operated by a pedal 932, which may be acted upon by a caregiver with their foot to pump hydraulic fluid from a reservoir into the hydraulic cylinder 928 to cause the hydraulic cylinder 928 to extend and affect the movement of the lift mechanism 922. In the present embodiment, the hydraulic cylinder 928 is a single acting cylinder. To lower the lift mechanism 922, a pedal 934 may be activated by a caregiver to open a release valve between the hydraulic cylinder 928 and the reservoir to allow hydraulic fluid to be urged into the reservoir by the weight of the structure supported on the lift mechanism 922.

The upper frame 920 is supported above the lower frame 918 and configured to support a patient thereon, as suggested in FIG. 18. The upper frame 920 supports a mattress 936. The upper frame 920 also supports a right siderail 938 and a left siderail 940 of the patient support apparatus 910. The siderails 938, 940 are spaced from each other in a lateral dimension of the patient support apparatus 910, as shown in FIG. 18. The siderails 938, 940 are shown in raised positions in FIG. 18, but the siderails may be lowered to lowered positions. The position of the siderails 938, 940 is determined by sensors 951, 953, respectively.

Figure 19:
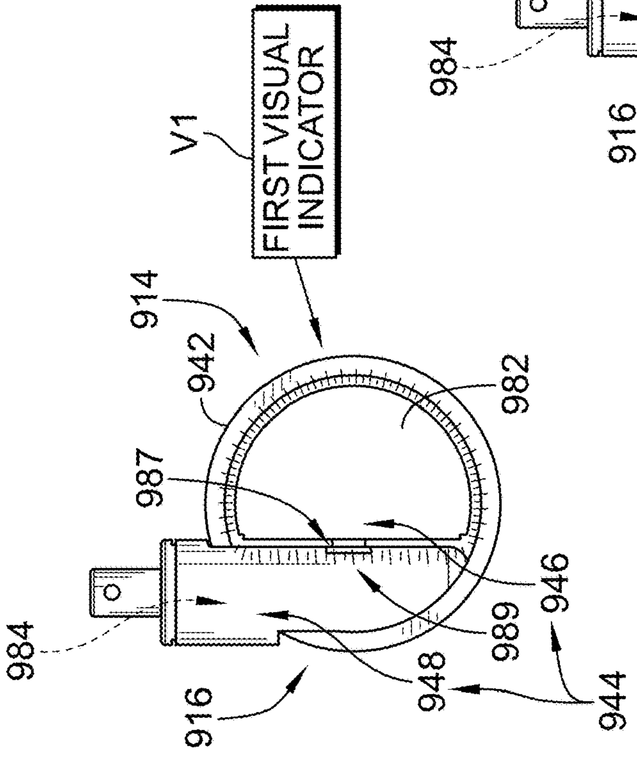
FIG. 19 is a perspective view of one caster included in the plurality of wheels of FIG. 18 showing that the status indicator light assembly includes the light emitting diode field coupled to the exterior of the caster and further showing that the status indicator light assembly changes to a first mode in which the status indicator light assembly illuminates a first visual indicator on the plurality of casters in response to the plurality of casters being in a brake mode during which movement of the plurality of casters is prevented.

Each of the plurality of casters 914 includes a caster wheel 942 and a caster housing 944, as shown in FIGS. 18 and 19. The caster wheel 942 of each of the plurality of casters 914 rotates about a respective wheel axis to move the patient support apparatus 910 along the floor. The caster housing 944 of each of the plurality of casters 914 swivels about a respective housing axis to alter a direction of the patient support apparatus 910. The caster housing 944 of each of the plurality of casters 914 includes a body 946 and a stem 948 extending upwardly from the body 946 to couple to the lower frame 918. Each caster wheel 942 is received in a respective caster housing 944 so that the respective caster housing 944 is arranged on both a right side and a left side of the respective caster wheel 942.

The patient support apparatus 910 includes a brake/steer mechanism 937 supported by the lower frame 918, as shown in FIG. 18. The brake/steer mechanism 937 is of the type known in the art and able to transition the operation of the plurality of casters 914 between the brake mode, a neutral mode, and a steer mode. In the brake mode of the plurality of casters 914, rotation of the caster wheel 942 of each of the plurality of casters 914 about the respective wheel axis and rotation of the caster housing 944 (i.e., swiveling) of each of the plurality of casters 914 about the respective housing axis is prevented. In the neutral mode of the plurality of casters 914, the caster wheel 942 of each of the plurality of casters 914 is free to rotate about the respective wheel axis and the caster housing 944 of each of the plurality of casters 914 is free to rotate about the respective housing axis. In the steer mode of the plurality of casters 914, the caster wheel 942 of each of the plurality of casters 914 is free to rotate about the respective wheel axis and at least one caster housing 944 is prevented from rotation (i.e., swiveling) about the respective housing axis.

The activation of the brake/steer mechanism 937 is provided by an actuator 950 which is positioned at each of the plurality of casters 914, as shown in FIG. 18. Each actuator 950 includes a brake pedal 952 and a steer pedal 954. The pedals 952, 954 allow a caregiver to actuate the brake/steer mechanism 937 at multiple positions about the periphery of the patient support apparatus 910.

The brake/steer mechanism 937 includes at least two sensors 945, 947 configured to provide information relative to the status of the plurality of casters 914 to a controller of the patient support apparatus 910. When the plurality of casters 914 is placed in the brake mode via the brake pedal 952, the sensor 945 is engaged so that the sensor 945 is activated to provide an indication to the controller that the plurality of casters 914 is in the brake mode. While in the brake mode, the brake pedal 952 is closer to the floor than the steer pedal 954, as shown in FIG. 18. When the plurality of casters 914 is placed in the steer mode via the steer pedal 54, the sensor 947 is engaged to provide an indication to the controller that the plurality of casters 914 is in the steer mode. When the plurality of casters 914 is placed in the neutral mode, the sensors 945, 947 are not engaged, which provides an indication to the controller that the plurality of casters 914 is in the neutral mode.

In some embodiments, the auxiliary wheel 960 is an unpowered wheel configured to facilitate enhanced turning and maneuverability of the patient support apparatus 910. In some embodiments, the auxiliary wheel 960 is included in a powered drive wheel assembly to assist the caregiver in moving the patient support apparatus 910. The powered drive wheel assembly includes the powered drive wheel 960 (i.e., the auxiliary wheel 960), a deploy motor, and a drive motor.

As shown in FIG. 18, the status indicator light assembly 916 is coupled with each of the plurality of casters 914 and/or the auxiliary wheel 960. The status indicator light assembly 916 changes between a first mode, in which the status indicator light assembly 916 illuminates a first visual indicator V1 on each of the plurality of casters 914 and/or the auxiliary wheel 960, and a second mode, in which the status indicator light assembly 916 illuminates a second visual indicator V2 different than the first visual indicator V1 on each of the plurality of casters 914 and/or the auxiliary wheel 960.

In illustrative embodiments, the status indicator light assembly 916 is changed to the first mode in response to the plurality of casters 914 being in the brake mode during which movement of the plurality of casters 914 is prevented, as shown in FIG. 19. The status indicator light assembly 916 is changed to the second mode in response to the plurality of casters 914 being in the non-brake mode during which the plurality of casters 914 is free to move. In illustrative embodiments, the non-brake mode of the plurality of casters 914 is the neutral mode of the plurality of casters 914 during which the wheel 942 of each of the plurality of casters 914 is free to rotate and the housing 944 of each of the plurality of casters 914 is free to swivel, as shown in FIG. 20.

Figure 21:
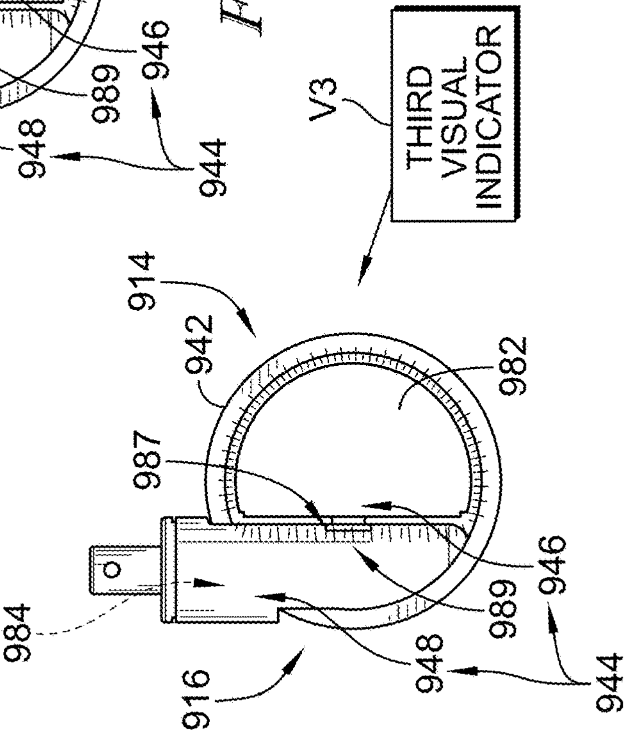
FIG. 21 is a perspective view of one caster included in the plurality of wheels of FIG. 18 showing that the status indicator light assembly changes to a third mode in which the status indicator light assembly illuminates a third visual indicator on the plurality of casters in response to the plurality of casters being in a steer mode during which the wheel of each of the plurality of casters is free to rotate and swiveling of the housing of at least one of the casters is prevented.

The status indicator light assembly 916 also changes between the first mode or the second mode and a third mode, in which the status indicator light assembly 916 illuminates a third visual indicator V3 on each of the plurality of casters 914 and/or the auxiliary wheel 960 that is different than the first and second visual indicators V1, V2, as shown in FIG. 21. The status indicator light assembly 916 is changed to the third mode in response to the plurality of casters 914 being in the steer mode during which the wheel 942 of each of the plurality of casters 914 is free to rotate and swiveling of the housing 944 of at least one of the plurality of casters 914 is prevented.

In the illustrative embodiment of FIGS. 18-22, the status indicator light assembly 916 is coupled to each of the plurality of casters 914 and/or the auxiliary wheel 960 so that each of the plurality of casters 914 is illuminated with the visual indicator V1, V2, V3. The status indicator light assembly 916 includes a plurality of light emitting diode fields 982, a plurality of wire connectors 984, and a plurality of attachment pieces 987. For simplicity sake, one caster 914 of the plurality of casters 914 will be described in detail, however, each caster 914 is identical such that the description of one caster 914 applies to the other casters 914 of the plurality of casters 914.

Figure 20:
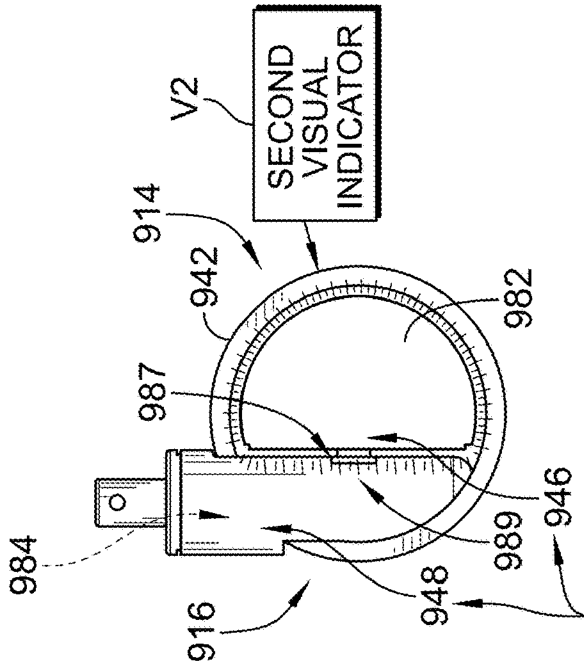
FIG. 20 is a perspective view of one caster included in the plurality of wheels of FIG. 18 showing that the status indicator light assembly changes to a second mode in which the status indicator light assembly illuminates a second visual indicator on the plurality of casters in response to the plurality of casters being in a neutral mode during which a wheel of each of the plurality of casters is free to rotate and a housing of each of the plurality of casters is free to swivel.

As shown in FIGS. 19-21, one of the light emitting diode fields 982 is coupled to an exterior of the body 946 of the housing 944 on a left side thereof. Another one of the light emitting diode fields 982 is coupled to the exterior of the body 946 of the housing 944 on a right side thereof so that both sides of the caster 914 are illuminated. Illustratively, the light emitting diode fields 982 are formed as plates with light emitting diodes thereon.

In some embodiments, the plurality of light emitting diode fields 982 are adhered to the exterior of the body 946. In some embodiments, the plurality of light emitting diode fields 982 are mounted to the exterior of the body 946.

Figure 22:
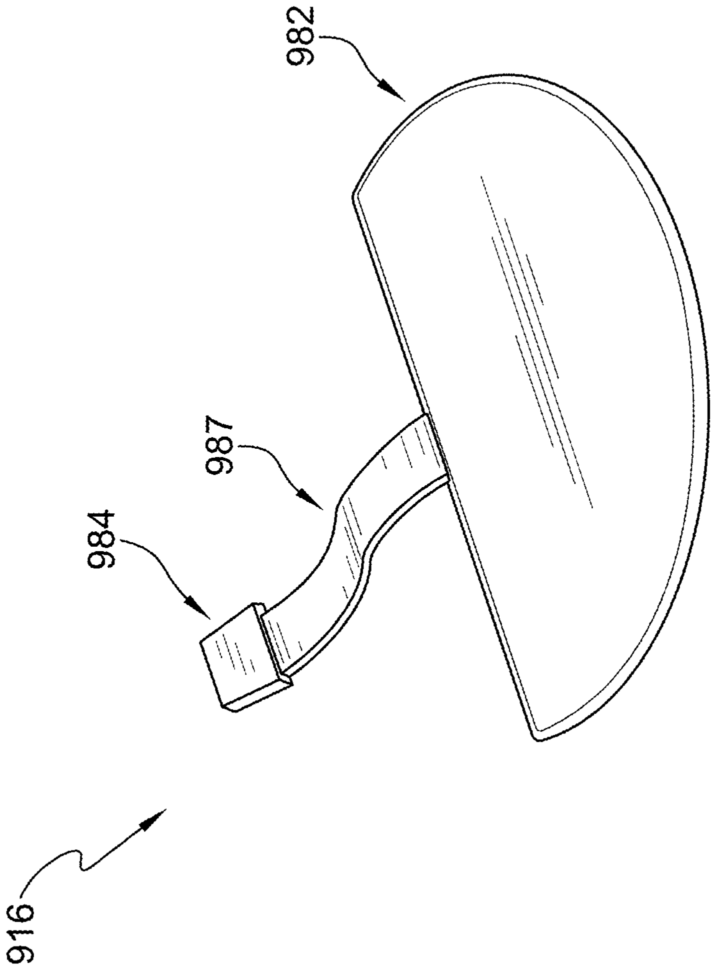
FIG. 22 is a perspective view of a portion of the status indicator light assembly of FIGS. 19-21 showing that the status indicator light assembly further includes a wire connector configured to be located in the stem of the caster and an attachment piece coupled to and extending between the wire connector and the light emitting diode field to transfer power and signals to the light emitting diode field from a control system.

The plurality of wire connectors 984 is located in the stem 948 of the housing 944, as suggested in FIGS. 19-21. Each light emitting diode field 982 is coupled with a respective wire connector 984 such that one stem 948 includes two wire connectors 984 therein. The plurality of attachment pieces 987 extend between and interconnect the plurality of wire connectors 984 and the plurality of light emitting diode fields 982. In other words, a single attachment piece 987 extends between and interconnects one wire connector 984 with one light emitting diode field 982, as shown in FIG. 22. Each caster 914, thus, includes two attachment pieces 987, two wire connectors 984, and two light emitting diode fields 982.

Illustratively, the stem 948 is formed to include two through holes 989, one for each of the plurality of wire connectors 984. The attachment piece 987 extends through a respective through hole 989 to couple with the wire connector 984 located inside of the stem 948, as shown in FIGS. 19-21.

The attachment pieces 987, the wire connectors 984, and the light emitting diode fields 982 swivel with the housing 944 of the caster 914. At least one wire is connected to the wire connectors 984 located in the stem 948 to couple the light emitting diode fields 982 with the controller to receive power and electrical signals therefrom.

In some embodiments, the status indicator light assembly 916 further includes a plurality of lenses (not shown) to cover and protect the plurality of light emitting diode fields 982. For example, one lens is coupled to the exterior of the body 946 on the left side of the caster 914 over the respective light emitting diode field 982 to protect the light emitting diode field 982.

Because the plurality of light emitting diode fields 982 is located on both sides of the housing 944, the plurality of light emitting diode fields 982 emits light (the visual indicators V1, V2, V3) on each side of the caster 914 and/or the auxiliary wheel 960. As such, both the right and left sides of the caster 914 and/or the auxiliary wheel 960 are illuminated with the visual indicator V1, V2, V3.

In some embodiments, the status indicator light assembly 916 is further configured to change to a fourth mode in which the status indicator light assembly 916 illuminates a fourth visual indicator on at least one of the plurality of casters 914 and/or the auxiliary wheel 960 indicative of a patient characteristic. In some embodiments, in the first mode of the status indicator light assembly 916, the status indicator light assembly 916 illuminates the first visual indicator V1 on each of the plurality of casters 914 and/or the auxiliary wheel 960 in response to a plurality of safety features of the patient support apparatus 910 being enabled. In the second mode of the status indicator light assembly 916, the status indicator light assembly 916 illuminates the second visual indicator V2 on each of the plurality of casters 914 and/or the auxiliary wheel 960 in response to at least one of the plurality of safety features of the patient support apparatus 910 being disabled.

Figure 23:
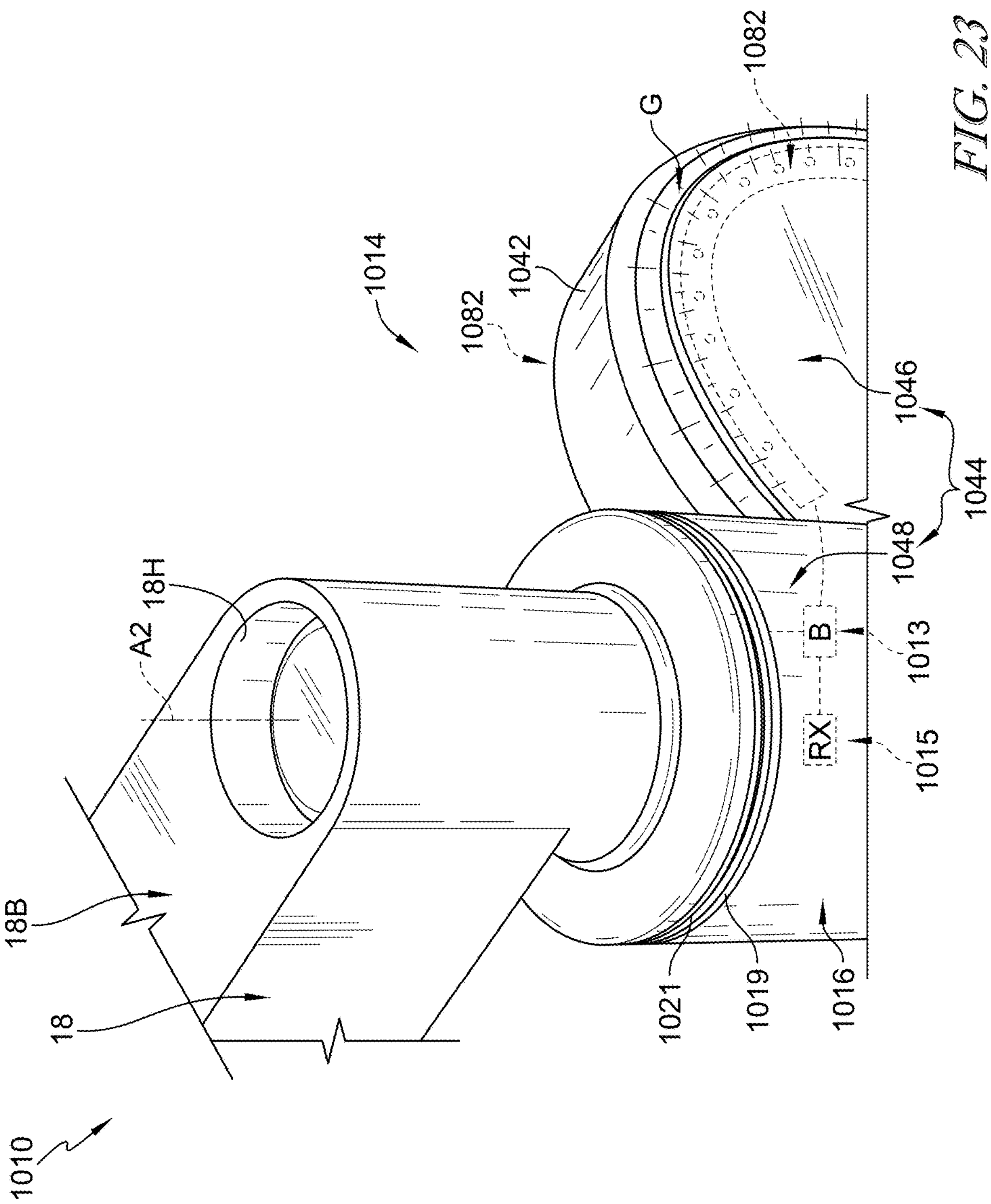
FIG. 23 is a perspective view of an alternative status indicator light assembly including a receiver configured to wirelessly communicate with a controller of the patient support apparatus, a battery, and a plurality of light emitting diodes powered by the battery.

Another embodiment of a patient support apparatus 1010 is shown in FIG. 23. The patient support apparatus 1010 is substantially similar to patient support apparatus 10 shown in FIGS. 1-8 and described herein and the patient support apparatus 910 shown in FIGS. 18-22 and described herein. Accordingly, similar reference numbers in the 1000 series indicate features that are common between the patient support apparatus 1010 and the patient support apparatus 10, 910. The description of the patient support apparatus 10, 910 is incorporated by reference to apply to the patient support apparatus 1010, except in instances when it conflicts with the specific description and the drawings of the patient support apparatus 1010.

Figure 24:
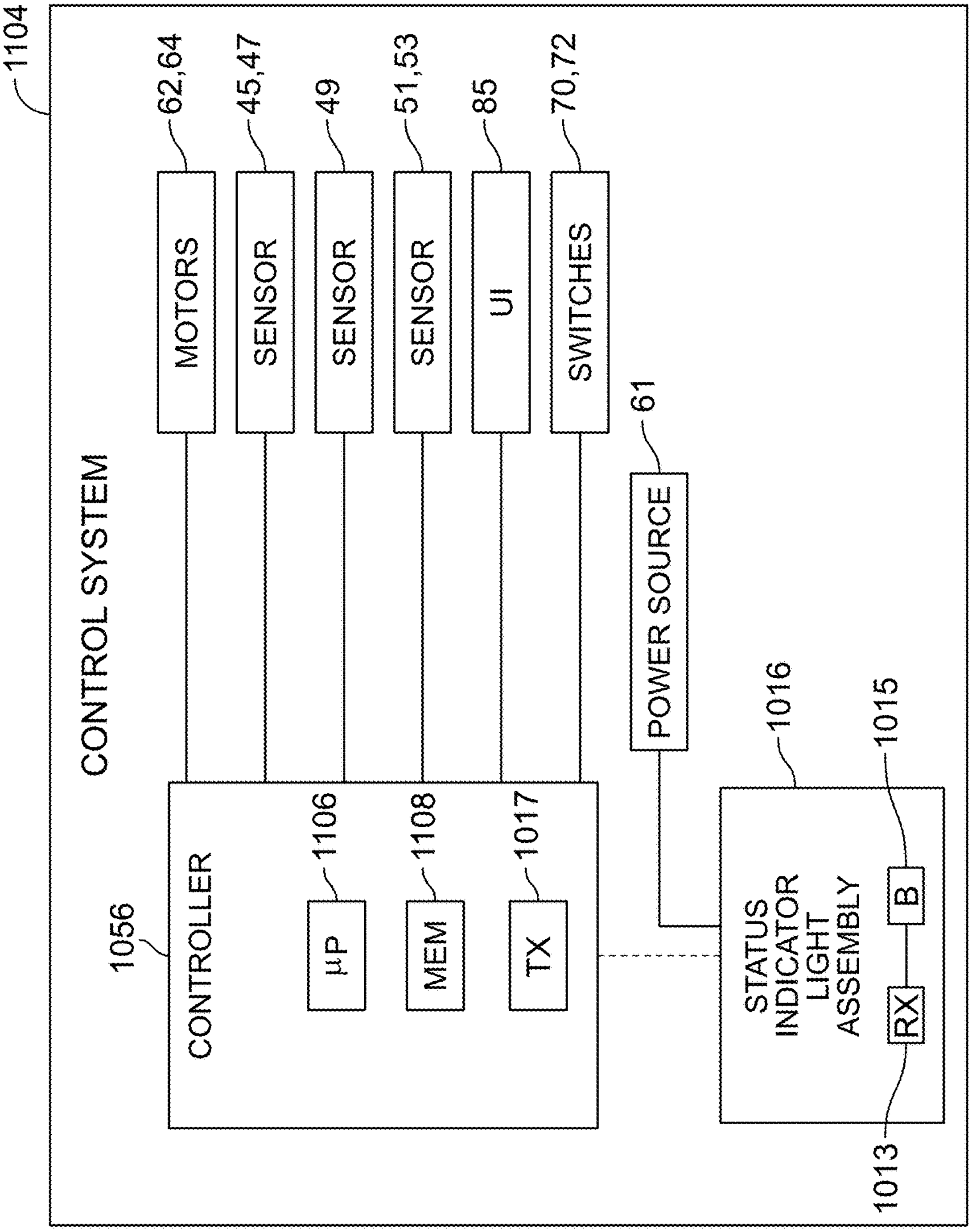
FIG. 24 is a block diagram of an alternative control system of the patient support apparatus of FIG. 1 for use with the status indicator light assembly of FIG. 23 showing the controller includes a transmitter configured to wirelessly communicate with the receiver of the status indicator light assembly.

The patient support apparatus 1010 includes a different control system 1104, as shown in FIG. 24, as compared to the control system 104 of the patient support apparatus 10 shown in FIG. 8 and a different status indicator light assembly 1016 as compared to the status indicator light assembly 16 of the patient support apparatus 10. The remaining portions of the patient support apparatus 1010 are the same as the patient support apparatus 10.

Each of the plurality of casters 1014 includes a caster wheel 1042 and a caster housing 1044, as shown in FIG. 23. The caster wheel 1042 of each of the plurality of casters

1014 rotates about a respective wheel axis to move the patient support apparatus 1010 along the floor. The caster housing 1044 of each of the plurality of casters 1014 swivels about a respective housing axis to alter a direction of the patient support apparatus 1010. The caster housing 1044 of each of the plurality of casters 1014 includes a body 1046 and a stem 1048 extending upwardly from the body 1046 to couple to the lower frame 18. Each caster wheel 1042 is received in a respective caster housing 1044 so that the respective caster housing 1044 is arranged on both a right side and a left side of the respective caster wheel 1042.

As shown in FIG. 23, the status indicator light assembly 1016 is coupled with each of the plurality of casters 1014 and/or the auxiliary wheel 60. The status indicator light assembly 1016 changes between a first mode, in which the status indicator light assembly 1016 illuminates a first visual indicator on each of the plurality of casters 1014 and/or the auxiliary wheel 60, and a second mode, in which the status indicator light assembly 1016 illuminates a second visual indicator different than the first visual indicator on each of the plurality of casters 1014 and/or the auxiliary wheel 60.

In illustrative embodiments, the status indicator light assembly 1016 is changed to the first mode in response to the plurality of casters 1014 being in the brake mode during which movement of the plurality of casters 1014 is prevented. The status indicator light assembly 1016 is changed to the second mode in response to the plurality of casters 1014 being in the non-brake mode. In illustrative embodiments, the non-brake mode of the plurality of casters 1014 is the neutral mode of the plurality of casters 1014.

The status indicator light assembly 1016 also changes between the first mode or the second mode and a third mode, in which the status indicator light assembly 1016 illuminates a third visual indicator on each of the plurality of casters 1014 and/or the auxiliary wheel 60 that is different than the first and second visual indicators. The status indicator light assembly 1016 is changed to the third mode in response to the plurality of casters 1014 being in the steer mode.

In some embodiments, in the first mode of the status indicator light assembly 1016, the status indicator light assembly 1016 illuminates the first visual indicator on each of the plurality of casters 1014 and/or the auxiliary wheel 60 in response to a plurality of safety features of the patient support apparatus 1010 being enabled. In such an embodiment, the first visual indicator may be a green color. In the second mode of the status indicator light assembly 1016, the status indicator light assembly 1016 illuminates the second visual indicator on each of the plurality of casters 1014 and/or the auxiliary wheel 60 in response to at least one of the plurality of safety features of the patient support apparatus 1010 being disabled. In such an embodiment, the second visual indicator may be a red color.

The plurality of safety features includes the plurality of casters 1014 being in the brake mode, the siderails 38, 40 being in the raised position, a battery charge level or status being sufficient or satisfactory, and/or the upper frame 20 being in a lowered position, among others.

The status indicator light assembly 1016 is coupled to each of the plurality of casters 1014 and/or the auxiliary wheel 60 so that each of the plurality of casters 1014 and/or the auxiliary wheel 60 is illuminated with the visual indicator. The status indicator light assembly 1016 includes a plurality of light emitting diodes 1082, a plurality of batteries 1013, and a plurality of receivers 1015. For simplicity sake, one caster 1014 of the plurality of casters 1014 will be described in detail, however, each caster 1014 is identical such that the description of one caster 1014 applies to the other casters 1014 of the plurality of casters 1014. The description of the status indicator light assembly 1016 as applied to the one caster 1014 also applies to the auxiliary wheel 60.

As shown in FIG. 23, the caster 1014 includes the plurality of light emitting diodes 1082 on a right side and on a left side of the caster 1014. Illustratively, the plurality of light emitting diodes 1082 is coupled to a right inner wall of the body 1046 of the housing 1044 and a left inner wall of the body 1046 of the housing 1044. The inner walls are interior surfaces of the body 1046. The wheel 1042 is located between the right inner wall of the body 1046 and the left inner wall of the body 1046 such that the plurality of light emitting diodes 1082 is located on both sides of the wheel 1042. A gap G is formed between the wheel 1042 and the housing 1044 on both the right and left sides of the wheel 1042.

Because the plurality of light emitting diodes 1082 is located interior to or inside of the housing 1044, the plurality of light emitting diodes 1082 emits light (the visual indicators) through the gap G formed on each side of the wheel 1042. As such, both the right and left sides of the caster 1014 are illuminated with the visual indicator. In some embodiments, the plurality of light emitting diodes 1082 is formed from a light emitting diode strip, such that one strip is coupled to, mounted to, or adhered to the right inner wall of the body 1046 of the housing 1044 and another strip (or the same strip continued) is coupled to, mounted to, or adhered to the left inner wall of the body 1046 of the housing 1044.

The plurality of light emitting diodes 1082 in the one caster 1014 of FIG. 23 is coupled to at least one of the plurality of batteries 1013. For example, the status indicator light assembly 1016 may include one battery 1013 per caster 1014. The battery 1013 provides power to the plurality of light emitting diodes 1082.

Each of the plurality of receivers 1015 is coupled to a respective battery 1013 and/or a respective set of the plurality of light emitting diodes 1082. As an example, the status indicator light assembly 1016 may include one receiver 1015 per caster 1014. The receiver 1015 is in communication with the controller 1056 of the patient support apparatus 1010. Specifically, the receiver 1015 is wirelessly connected with a transmitter 1017 of the controller 1056. The receiver 1015 and the transmitter 1017 wirelessly communicate with one another via Bluetooth, for example. In this way, the plurality of light emitting diodes 1082 are not connected to the controller 1056 or the power source 61 via the plurality of wires. In this embodiment, the plurality of wires, the wire connector, and/or the router are omitted.

As shown in FIG. 24, the controller 1056 includes a microprocessor 1106 and a memory 1108. The controller 1056 is in communication with the status indicator light assembly 1016, the sensors 45, 47 for the brake/steer mechanism 37, the sensor 49 for the lift mechanism 22, the sensors 51, 53 for the siderails 38, 40, the motors 62, 64, the switches 70, 72, and the user interface 85. The microprocessor 1106 receives inputs related to the status of the patient support apparatus 1010 (i.e., the status of the plurality of casters 1014, the status of the siderails 38, 40, the status of the auxiliary wheel 60, and/or the status of the upper frame 20) and inputs from the caregiver via the user interface 85. The microprocessor 1106 utilizes instructions stored in the memory 1108 to operate the status indicator light assembly 1016 via the transmitter 1017. The inputs to the microprocessor 1106 are from the sensors 45, 47, 49, 51, 53, the motor 62, 64, and/or the switches 70, 72. In some embodiments, the microprocessor 1106 receives inputs from the caregiver via the user interface 85. Based on the inputs to the microprocessor 1106, the transmitter 1017 wirelessly communicates with the receiver 1015 to control operation of the status indicator light assembly 1016.

In some embodiments, the plurality of batteries 1013 are removable and replaceable batteries 1013. In some embodiments, the plurality of batteries 1013 are wirelessly rechargeable batteries 1013. In such an embodiment, the status indicator light assembly 1016 further includes a plurality of power receivers 1019 and a plurality of power transmitters 1021, as shown in FIG. 23. For example, each caster 1014 may include one power receiver 1019 and one power transmitter 1021.

The power receiver 1019 is coupled with an upper end of the stem 1048, as shown in FIG. 23. The power receiver 1019 swivels with the stem 1048 about the housing axis A2. The power receiver 1019 is coupled with the battery 1013 to recharge the battery 1013. The power transmitter 1021 is coupled to a lower end of the support bar 18B such that the power transmitter 1021 does not swivel with the stem 1048. The power transmitter 1021 is coupled with the power source 61 to receive power therefrom.

Illustratively, the power receiver 1019 and the power transmitter 1021 are both formed as coils. The power receiver 1019 and the power transmitter 1021 both extend around the housing axis A2, as shown in FIG. 23. The power receiver 1019 and the power transmitter 1021 are coaxially aligned with one another. Alignment of the power receiver 1019 and the power transmitter 1021 allows for and/or maximizes recharging of the battery 1013.

In use, electric current is induced in the power receiver 1019 due to electromagnetic induction via the power transmitter 1021. The electric current charges the battery 1013. The battery 1013 may be wirelessly recharged through inductive or resonant wireless power transfer.

Illustratively, the plurality of light emitting diodes 1082 on the left side and the plurality of light emitting diodes 1082 on the right side of the caster 1014 are connected in series such that the battery 1013 and the receiver 1015 transmit power and electrical signals to both the plurality of light emitting diodes 1082 on the left side and the plurality of light emitting diodes 1082 on the right side of the caster 1014.

Figure 25:
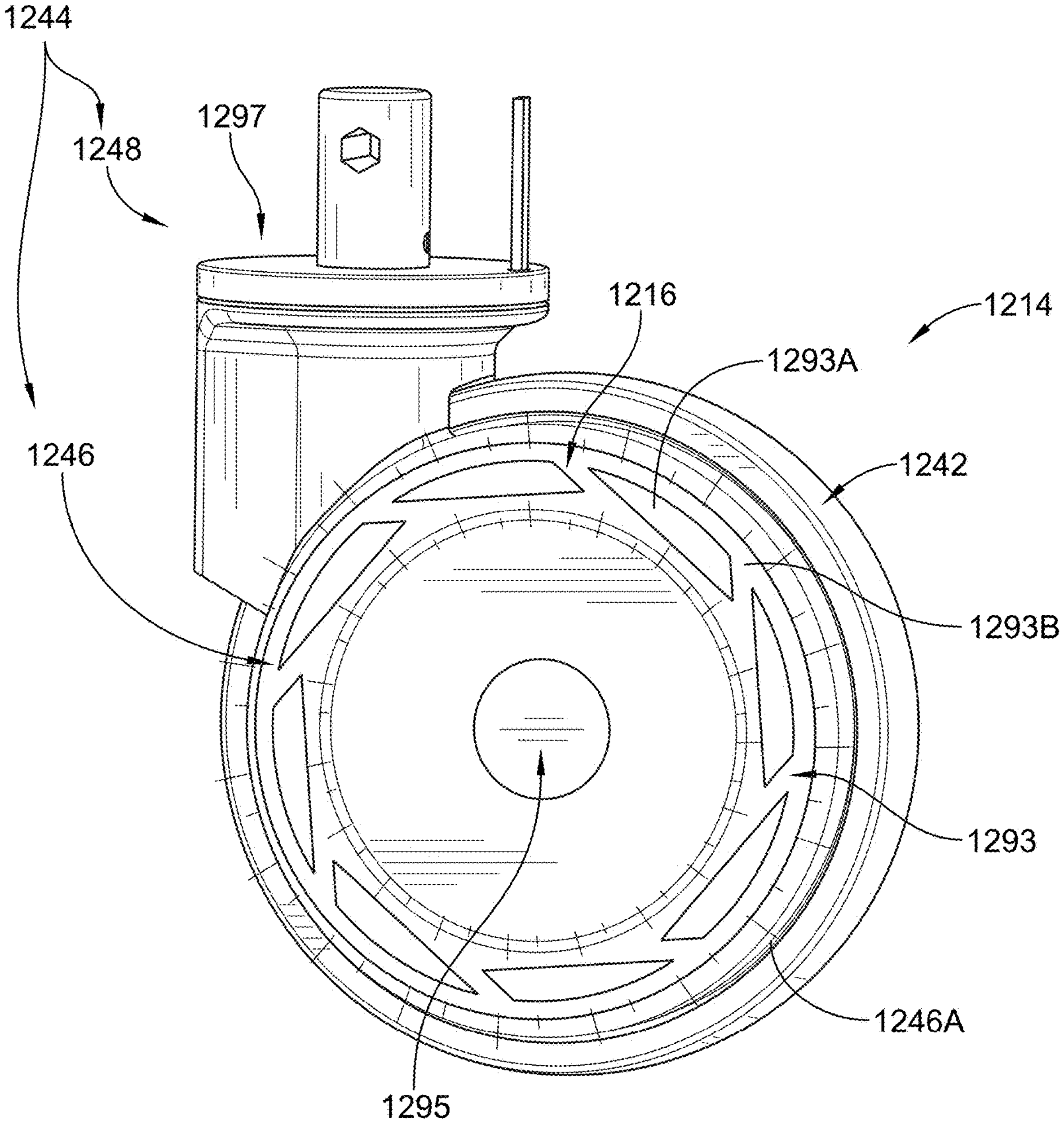
Figure 26:
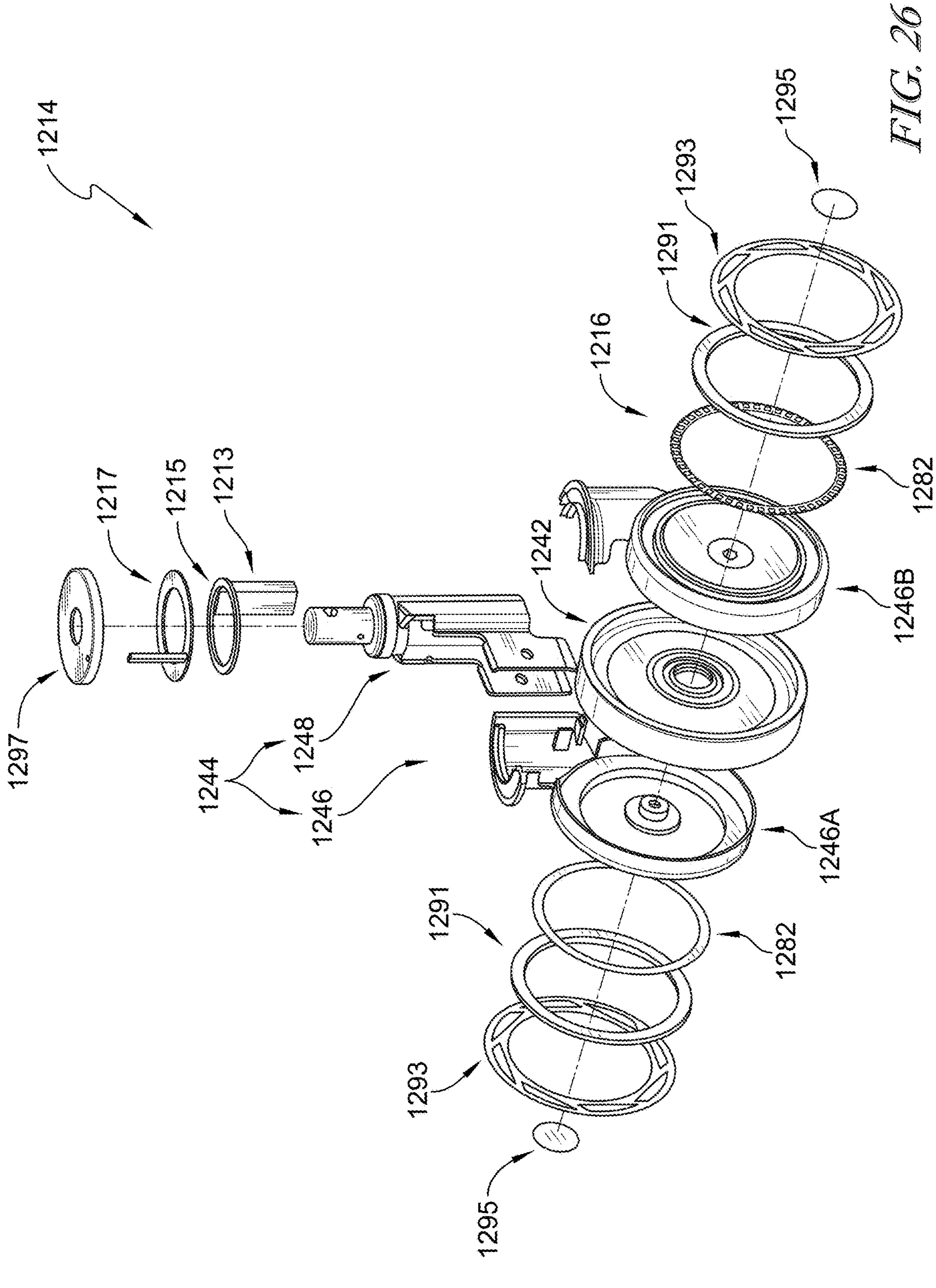
FIG. 26 is an exploded view of the caster of FIG. 25.

Another embodiment of a caster 1214 and a status indicator light assembly 1216 are shown in FIGS. 25 and 26 for use with the patient support apparatus 10. The caster 1214 and the status indicator light assembly 1216 are substantially similar to the previously described casters and status indicator light assemblies. Accordingly, similar reference numbers in the 1200 series indicate features that are common between the caster 1214 and the status indicator light assembly 1216 and the previously described casters and status indicator light assemblies.

Each of the plurality of casters 1214 includes a caster wheel 1242 and a caster housing 1244, as shown in FIG. 25. The caster wheel 1242 of each of the plurality of casters 1214 rotates about a respective wheel axis to move the patient support apparatus 10 along the floor. The caster housing 1244 of each of the plurality of casters 1214 swivels about a respective housing axis to alter a direction of the patient support apparatus 10. The caster housing 1244 of each of the plurality of casters 1214 includes a body 1246 and a stem 1248 extending upwardly from the body 1246 to couple to the lower frame 18. In some embodiments, as shown in FIG. 26, the body 1246 includes a first portion 1246A and a second portion 1246B located on opposing sides of the caster wheel 1242. Each caster wheel 1242 is received in a respective caster housing 1244 so that the respective caster housing 1244 is arranged on both a right side and a left side of the respective caster wheel 1242.

As shown in FIG. 25, the status indicator light assembly 1216 is coupled with each of the plurality of casters 1214. The status indicator light assembly 1216 changes between a first mode, in which the status indicator light assembly 1216 illuminates a first visual indicator on each of the plurality of casters 1214, and a second mode, in which the status indicator light assembly 1216 illuminates a second visual indicator different than the first visual indicator on each of the plurality of casters 1214.

In illustrative embodiments, the status indicator light assembly 1216 is changed to the first mode in response to the plurality of casters 1214 being in the brake mode during which movement of the plurality of casters 1214 is prevented. The status indicator light assembly 1216 is changed to the second mode in response to the plurality of casters 1214 being in the non-brake mode. In illustrative embodiments, the non-brake mode of the plurality of casters 1214 is the neutral mode of the plurality of casters 1214.

The status indicator light assembly 1216 also changes between the first mode or the second mode and a third mode, in which the status indicator light assembly 1216 illuminates a third visual indicator on each of the plurality of casters 1214 that is different than the first and second visual indicators. The status indicator light assembly 1216 is changed to the third mode in response to the plurality of casters 1214 being in the steer mode.

In some embodiments, in the first mode of the status indicator light assembly 1216, the status indicator light assembly 1216 illuminates the first visual indicator on each of the plurality of casters 1214 in response to a plurality of safety features of the patient support apparatus 10 being enabled. In such an embodiment, the first visual indicator may be a green color. In the second mode of the status indicator light assembly 1216, the status indicator light assembly 1216 illuminates the second visual indicator on each of the plurality of casters 1214 in response to at least one of the plurality of safety features of the patient support apparatus 10 being disabled. In such an embodiment, the second visual indicator may be a red color.

The plurality of safety features includes the plurality of casters 1214 being in the brake mode, the siderails 38, 40 being in the raised position, a battery charge level or status being sufficient or satisfactory, and/or the upper frame 20 being in a lowered position, among others.

The status indicator light assembly 1216 is coupled to each of the plurality of casters 1214 so that each of the plurality of casters 1214 is illuminated with the visual indicator. The status indicator light assembly 1216 includes a plurality of light emitting diodes 1282, at least one battery 1213, at least one receiver 1215, and at least one transmitter 1217. For simplicity sake, one caster 1214 of the plurality of casters 1214 will be described in detail, however, each caster 1214 is identical such that the description of one caster 1214 applies to the other casters 1214 of the plurality of casters 1214.

As shown in FIG. 26, the caster 1214 includes the plurality of light emitting diodes 1282 on a right side and on a left side of the caster 1214. Illustratively, the plurality of light emitting diodes 1282 is coupled to the respective portion 1246A, 1246B of the body 1246 of the housing 1244. As shown in FIG. 26, the plurality of light emitting diodes 1282 is received in a recess of the respective portion 1246A, 1246B of the body 1246 of the housing 1244. The wheel 1242 is located between the portions 1246A, 1246B of the body 1246 such that the plurality of light emitting diodes 1282 is located on both sides of the wheel 1242.

As shown in FIG. 26, the caster 1214 further includes a plurality of light diffusers 1291, a plurality of translucent plates 1293, and/or a plurality of caps 1295. The plurality of light diffusers 1291 is located between the plurality of light emitting diodes 1282 and the plurality of translucent plates 1293. The plurality of translucent plates 1293 is located outward of the plurality of light diffusers 1291. As shown in FIG. 26, one set of light emitting diode 1282, one light diffuser 1291, and one translucent plate 1293 is located on each side of the wheel 142. The plurality of light diffusers 1291 and the plurality of translucent plates 1293 are received in the recess of the respective portion 1246A, 1246B of the body 1246 of the housing 1244. Each of the plurality of caps 1295 is coupled to a respective portion 1246A, 1246B of the body 1246 of the housing 1244.

As shown in FIG. 25, the plurality of translucent plates 1293 includes translucent portions 1293A and non-translucent portions 1293B. The translucent portions 1293A may form any shape. The light emitted from the plurality of light emitting diodes 1282 shines through the translucent portions 1293A.

The plurality of light emitting diodes 1282 in the one caster 1214 of FIG. 25 is coupled to the at least one battery 1213. The battery 1213 provides power to the plurality of light emitting diodes 1282.

The at least one receiver 1215 is coupled to the at least one battery 1213 and/or the plurality of light emitting diodes 1282. The receiver 1215 is wirelessly connected with the transmitter 1217. The receiver 1215 and the transmitter 1217 wirelessly communicate with one another via Bluetooth, for example. In this way, the plurality of light emitting diodes 1282 are not connected directly to a controller via wires. The transmitter 1217 wirelessly communicates with the receiver 1215 to control operation of the status indicator light assembly 1216. The receiver 1215 and the transmitter 1217 allow for inductive charging of the at least one battery 1213. As shown in FIG. 26, the at least one receiver 1215 and the at least one transmitter 1217 extend circumferentially about the stem 1248.

As shown in FIGS. 25 and 26, the caster 1214 further includes a top cap 1297 that extends circumferentially about the stem 1248. The top cap 1297 is located on the stem 1248 above the transmitter 1217. Wires of the transmitter 1217 extend through the top cap 1297, as shown in FIG. 25, to couple to the controller of the patient support apparatus 10.

Figure 27:
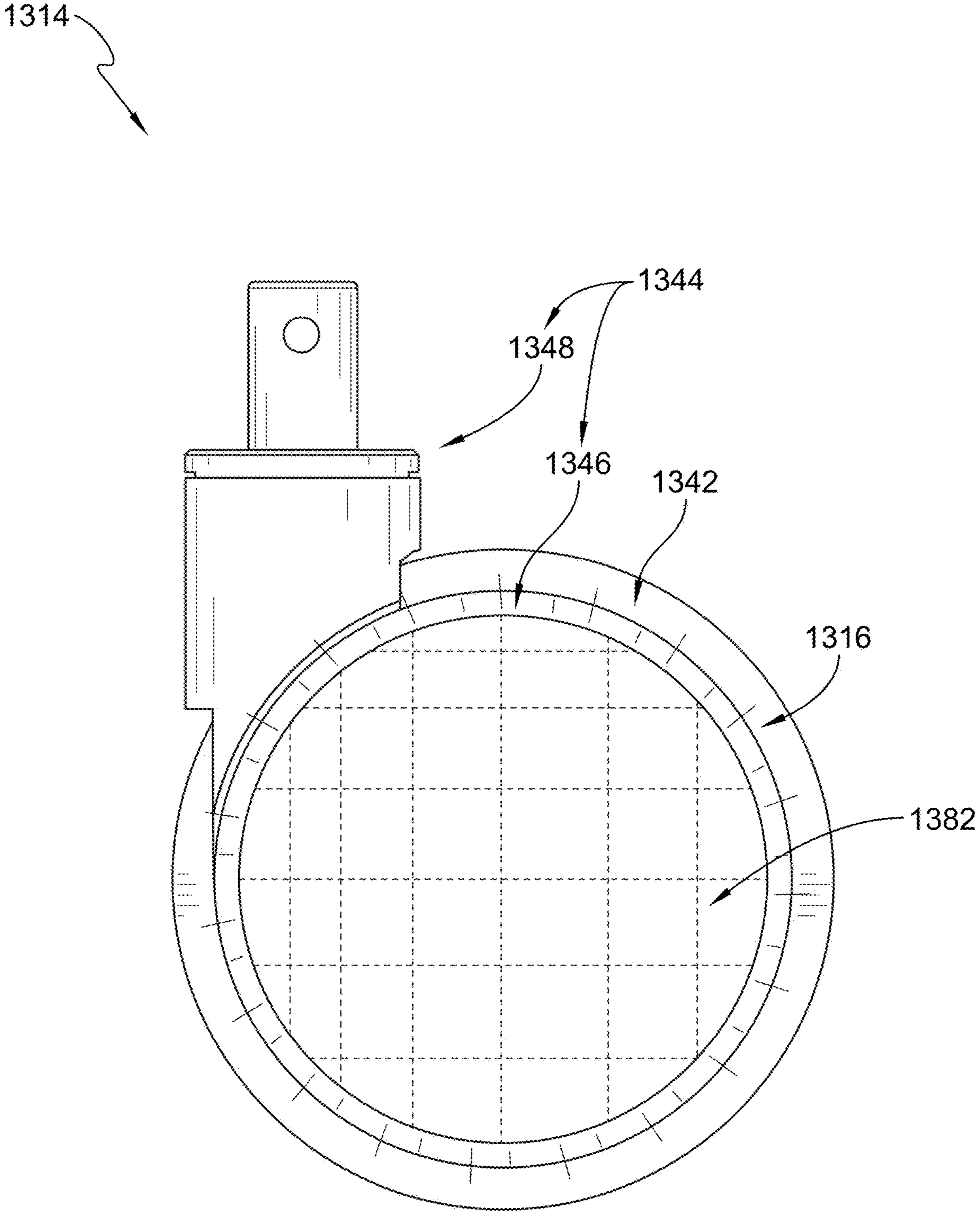
FIG. 27 is a perspective view of an alternative status indicator light assembly for use with the patient support apparatus of FIG. 1 showing that the status indicator light assembly includes a matrix of light emitting diodes that emit the first, second, third, and fourth visual indicators.

Another embodiment of a status indicator light assembly 1316 and a caster 1314 for use with the patient support apparatus 10 of FIG. 1 is shown in FIG. 27. The status indicator light assembly 1316 is substantially similar to the status indicator light assembly 16, 216, 916, 1016, 1216. Accordingly, similar reference numbers in the 1300 series indicate features that are common between the status indicator light assembly 1316 and the status indicator light assembly 16, 216, 916, 1016, 1216. The description of the status indicator light assembly 16, 216, 916, 1016, 1216 is incorporated by reference to apply to the status indicator light assembly 1316, except in instances when it conflicts with the specific description and the drawings of the status indicator light assembly 1316.

A single caster 1314 is shown and described, however, the same description applies to each caster 1314 included in the plurality of casters 1314. The caster 1314 includes a caster wheel 1342 and a caster housing 1344, as shown in FIG. 27. The caster wheel 1342 rotates about a wheel axis to move the patient support apparatus 10 along the floor. The caster housing 1344 swivels about a housing axis to alter a direction of the patient support apparatus 10. The caster housing 1344 includes a body 1346 and a stem 1348 extending upwardly from the body 1346 to couple to the lower frame 18. The caster wheel 1342 is received in the caster housing 1344 so that the caster housing 1344 is arranged on both a right side and a left side of the caster wheel 1342.

The status indicator light assembly 1316 includes a plurality of light emitting diodes 1382, as shown in FIG. 27. The plurality of light emitting diodes 1382 illustratively forms a matrix of light emitting diodes 1382. The caster 1314 includes the matrix of light emitting diodes 1382 on a right side and on a left side of the caster 1314. Illustratively, the plurality of light emitting diodes 1382 is coupled to an outer wall of the body 1346 of the housing 1344 on both a right and left side thereof.

In some embodiments, the visual indicators V1, V2, V3, V4 form a logo, a message, a symbol, a shape, a letter, etc. on the caster 1314. In this way, in some embodiments, the visual indicators V1, V2, V3, V4 may form a shape or object other than a circle. The matrix of light emitting diodes 1382 allows the logo, message, symbol, shape, letter, etc. to be formed. As an example, the status indicator light assembly 1316 may illuminate the first visual indicator V1 on the caster 1314, and the first visual indicator V1 may include orange or red illumination and the letter B to indicate that the plurality of casters 1314 is in the brake mode. As another example, the status indicator light assembly 1316 may illuminate the second visual indicator V2 on the caster 1314, and the second visual indicator V2 may include blue illumination and the letter N to indicate that the plurality of casters 1314 is in the neutral mode. As another example, the status indicator light assembly 1316 may illuminate the third visual indicator V3 on the caster 1314, and the third visual indicator V3 may include green illumination and the letter S to indicate that the plurality of casters 1314 is in the steer mode.

The logo, message, symbol, shape, letter, etc. as at least a portion of the visual indicators V1, V2, V3, V4 provides additional graphics for the caregiver to determine the status of the plurality of casters 1314. For example, there may be confusion between different colors of the plurality of visual indicators V1, V2, V3, V4, and the additional graphics aid the caregiver in confirming the status of the plurality of casters 1314.

Figure 28:
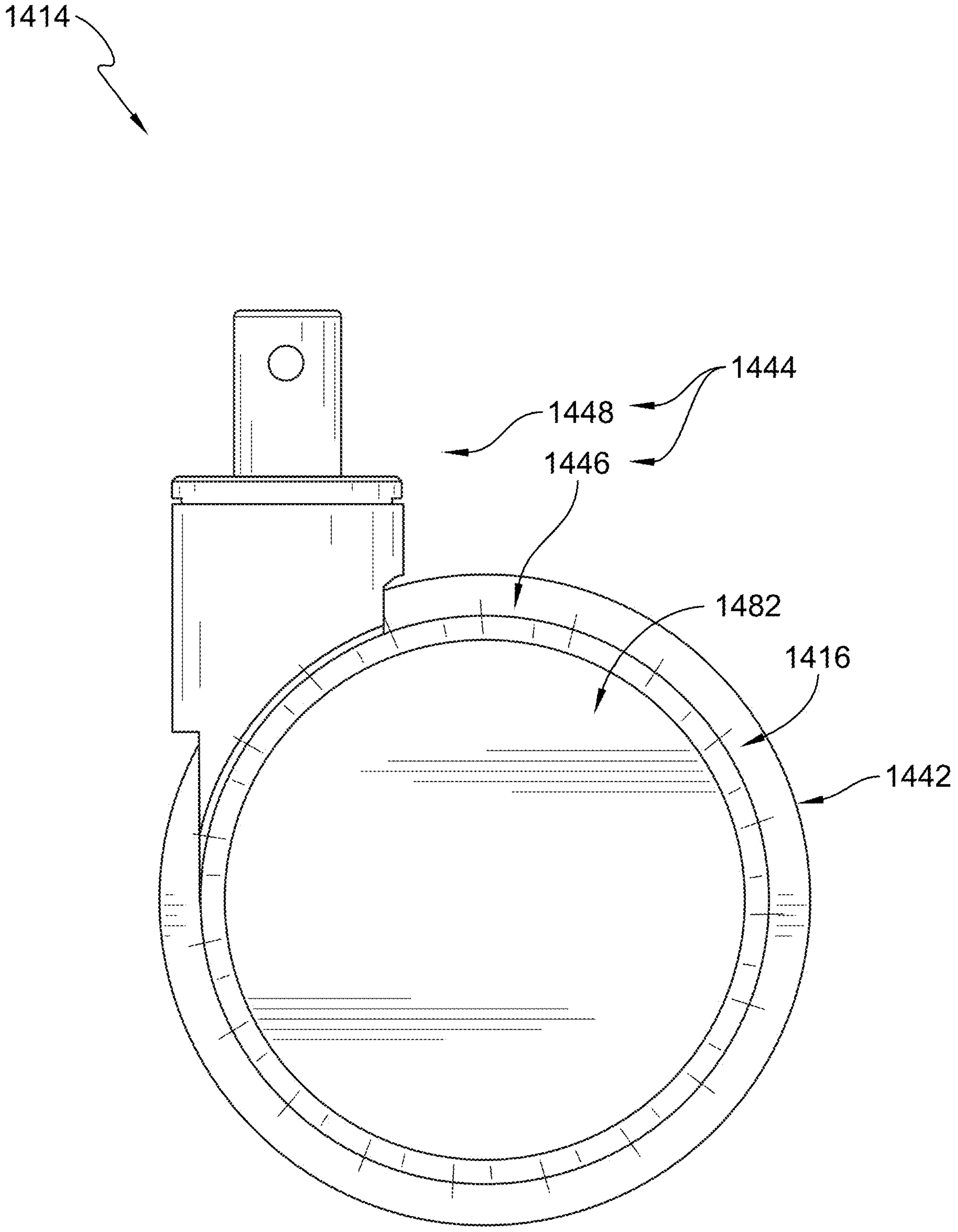
FIG. 28 is a perspective view of an alternative status indicator light assembly for use with the patient support apparatus of FIG. 1 showing that the status indicator light assembly includes a liquid crystal display (LCD) screen that displays the first, second, third, and fourth visual indicators.

Another embodiment of a status indicator light assembly 1416 and a caster 1414 for use with the patient support apparatus 10 of FIG. 1 is shown in FIG. 28. The status indicator light assembly 1416 is substantially similar to the status indicator light assembly 16, 216, 916, 1016, 1216, 1316. Accordingly, similar reference numbers in the 1400 series indicate features that are common between the status indicator light assembly 1416 and the status indicator light assembly 16, 216, 916, 1016, 1216, 1316. The description of the status indicator light assembly 16, 216, 916, 1016, 1216, 1316 is incorporated by reference to apply to the status indicator light assembly 1416, except in instances when it conflicts with the specific description and the drawings of the status indicator light assembly 1416.

A single caster 1414 is shown and described, however, the same description applies to each caster 1414 included in the plurality of casters 1414. The caster 1414 includes a caster wheel 1442 and a caster housing 1444, as shown in FIG. 28. The caster wheel 1442 rotates about a wheel axis to move the patient support apparatus 10 along the floor. The caster housing 1444 swivels about a housing axis to alter a direction of the patient support apparatus 10. The caster housing 1444 includes a body 1446 and a stem 1448 extending upwardly from the body 1446 to couple to the lower frame 18. The caster wheel 1442 is received in the caster housing 1444 so that the caster housing 1444 is arranged on both a right side and a left side of the caster wheel 1442.

The status indicator light assembly 1416 includes a liquid crystal display (LCD) screen 1482, as shown in FIG. 28. In illustrative embodiments, the status indicator light assembly 1416 includes two LCD screens 1482. The caster 1414 includes one LCD screen 1482 on a right side and one LCD screen 1482 on a left side of the caster 1414. Illustratively, the LCD screens 1482 are coupled to an outer wall of the body 1446 of the housing 1444 on both a right and left side thereof. In some embodiments, a translucent cover is positioned over each of the LCD screens 1482 to protect the LCD screens 1482.

The LCD screen 1482 displays the visual indicators V1, V2, V3, V4. In some embodiments, the visual indicators V1, V2, V3, V4 form a logo, a message, a symbol, a shape, a letter, an animation, a picture, an image, a graphic, a video, etc. on the caster 1414. As an example, the LCD screen 1482 may display a dinosaur foot. As another example, the LCD screen 1482 may display an animated dinosaur foot that is moving. As another example, the LCD screen 1482 may display patient information, patient characteristics, patient vitals, bed status information, etc.

As an example, the status indicator light assembly 1416 may illuminate the first visual indicator V1 on the caster 1414, and the first visual indicator V1 may include orange or red illumination and the letter B to indicate that the plurality of casters 1414 is in the brake mode. As another example, the status indicator light assembly 1416 may illuminate the second visual indicator V2 on the caster 1414, and the second visual indicator V2 may include blue illumination and the letter N to indicate that the plurality of casters 1414 is in the neutral mode. As another example, the status indicator light assembly 1416 may illuminate the third visual indicator V3 on the caster 1414, and the third visual indicator V3 may include green illumination and the letter S to indicate that the plurality of casters 1414 is in the steer mode.

Figure 29:
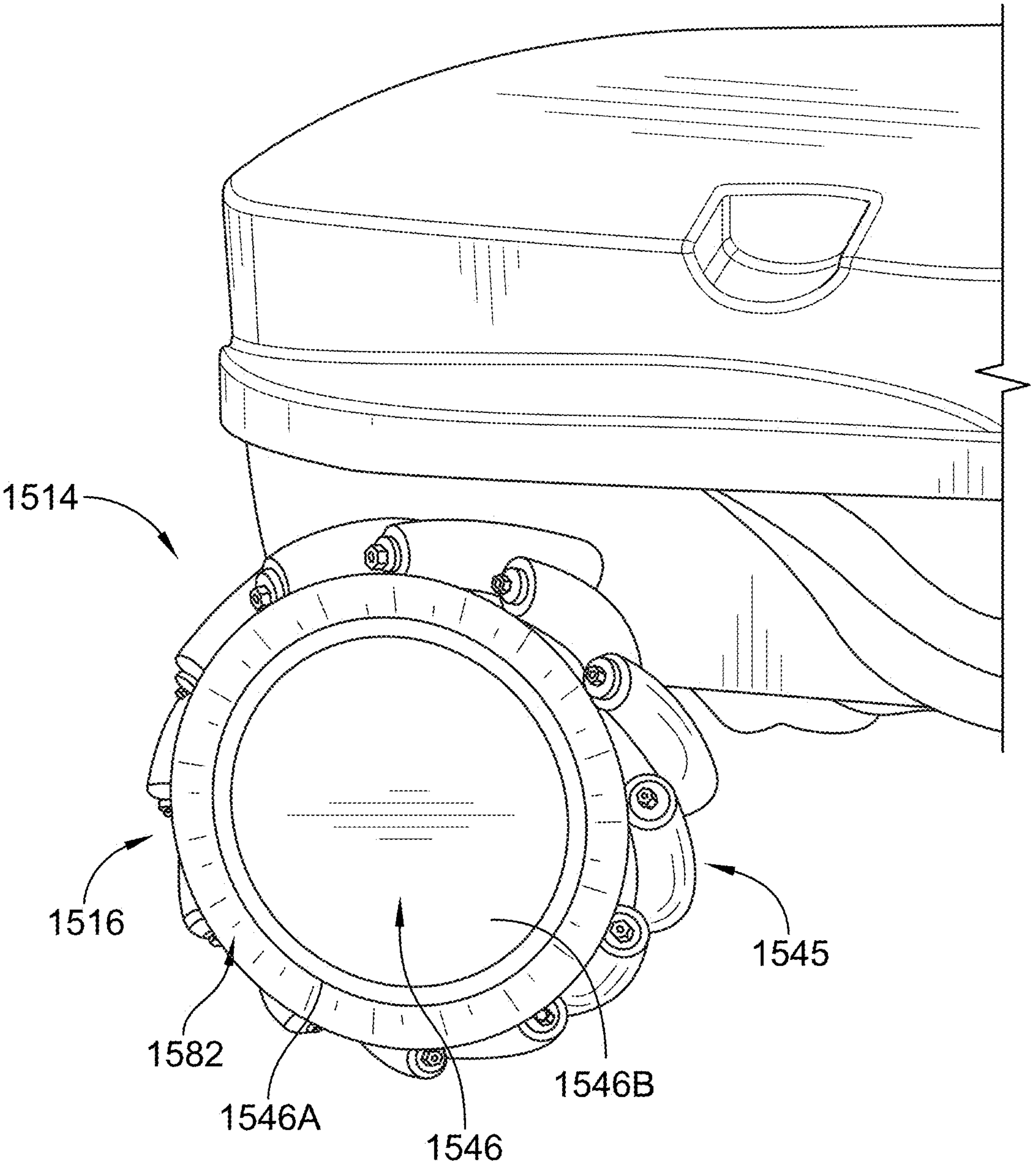

Another embodiment of a wheel 1514 for use with the patient support apparatus 10 of FIG. 1 is shown in FIG. 29. The wheel 1514 is substantially similar to the caster 14, 214', 314, 414, 414', 514, 614, 614', 714, 814, 914, 1014, 1214, 1314, 1414. Accordingly, similar reference numbers in the 1500 series indicate features that are common between the wheel 1514 and caster 14, 214', 314, 414, 414', 514, 614, 614', 714, 814, 914, 1014, 1214, 1314, 1414. The description of the caster 14, 214', 314, 414, 414', 514, 614, 614', 714, 814, 914, 1014, 1214, 1314, 1414 is incorporated by reference to apply to the wheel 1514, except in instances when it conflicts with the specific description and the drawings of the wheel 1514.

A single wheel 1514 is shown and described, however, the same description applies to each wheel 1514 included in the plurality of wheels 1514. The plurality of wheels 1514 can be used with any of the status indicator light assemblies described herein.

The wheel 1514 may be the mecanum wheel of U.S. Publication No. US20230277397A1 (U.S. application Ser. No. 18/177,837 filed 3 Mar. 2023), which is expressly incorporated by reference herein. Mecanum wheels 1514 are sometimes referred to as "omni-directional wheels" because, even though they do not swivel like casters, the devices to which they are mounted are able to be propelled by the motor-driven wheels in any desired direction in an X-Y plane, such as a plane defined by an underlying floor for example.

The wheel 1514 includes a set of diagonal rollers 1545 arranged circumferentially around a hub 1546 of the wheel 1514, as shown in FIG. 29. The hub 1546 includes a translucent portion 1546A and a non-translucent portion 1546B. Both the right side and the left side of the hub 1546 are identical such that the hub 1546 includes two translucent portions 1546A and two non-translucent portions 1546B.

The plurality of light emitting diodes 1582 of the status indicator light assembly 1516 is coupled to the wheel 1514 on both the right and left sides. The plurality of light emitting diodes 1582 emits light (the visual indicators V1, V2, V3, V4) through the translucent portion 1546A on each side of the wheel 1514. As such, both the right and left sides of the wheel 1514 are illuminated with the visual indicators V1, V2, V3, V4.

Although certain illustrative embodiments have been described in detail above, variations and modifications exist within the scope and spirit of this disclosure as described and as defined in the following claims.

The invention claimed is:

1. A patient support apparatus comprising:

a frame positioned above a floor, a plurality of wheels coupled to the frame, the plurality of wheels including a plurality of casters, and a status indicator light assembly coupled with at least one of the plurality of wheels and configured to change between a first mode in which the status indicator light assembly illuminates a first visual indicator on the at least one of the plurality of wheels in response to the plurality of casters being in a brake mode during which movement of the plurality of casters is prevented and a second mode in which the status indicator light assembly illuminates a second visual indicator different than the first visual indicator on the at least one of the plurality of wheels in response to the plurality of casters being in a non-brake mode during which the plurality of casters are free to move.

2. The patient support apparatus of claim 1, wherein the non-brake mode is a neutral mode during which a wheel of each of the plurality of casters is free to rotate and a housing of each of the plurality of casters is free to swivel.

3. The patient support apparatus of claim 2, wherein the status indicator light assembly is further configured to change to a third mode in which the status indicator light assembly illuminates a third visual indicator on the at least one of the plurality of wheels in response to the plurality of casters being in a steer mode during which the wheel of each of the plurality of casters is free to rotate and swiveling of the housing of at least one of the plurality of casters is prevented, and wherein the third visual indicator is different than the first and second visual indicators.

4. The patient support apparatus of claim 3, wherein the status indicator light assembly is further configured to change to a fourth mode in which the status indicator light assembly illuminates a fourth visual indicator on the at least one of the plurality of wheels indicative of a patient characteristic, and wherein the fourth visual indicator is different than the first, second, and third visual indicators.

5. The patient support apparatus of claim 1, wherein each of the plurality of casters includes a housing and a wheel configured to rotate relative to the respective housing, the housing of each of the plurality of casters includes a body and a stem extending upwardly from the respective body toward the frame.

6. The patient support apparatus of claim 5, wherein the at least one of the plurality of wheels is at least one of the plurality of casters, and wherein the first visual indicator and the second visual indicator are illuminated circumferentially around the housing of the at least one of the plurality of casters on a right side and a left side of the at least one of the plurality of casters.

7. The patient support apparatus of claim 6, wherein a gap is formed between the wheel and the housing of each of the plurality of casters and the first visual indicator and the second visual indicator emit light through the gap of the at least one of the plurality of casters.

8. The patient support apparatus of claim 5, wherein the status indicator light assembly includes a wire connector coupled to the stem of the at least one of the plurality of casters and configured to swivel with the respective stem about a housing axis, the wire connector including a first track extending around the housing axis and a second track extending around the housing axis radially outward of the first track relative to the housing axis.

9. The patient support apparatus of claim 8, wherein the status indicator light assembly further includes a first wire fixed to the first track on a downwardly-facing surface of the wire connector, a second wire fixed to the second track on the downwardly-facing surface of the wire connector, a third wire contacting the first track on an upwardly-facing surface of the wire connector, and a fourth wire contacting the second track on the upwardly-facing surface of the wire connector.

10. The patient support apparatus of claim 5, wherein the at least one of the plurality of wheels is at least one of the plurality of casters, and wherein the housing of the at least one of the plurality of casters includes a translucent portion, and wherein the first visual indicator and the second visual indicator emit light from the translucent portion.

11. The patient support apparatus of claim 1, wherein the status indicator light assembly includes a receiver coupled to the at least one of the plurality of wheels and wirelessly coupled with a controller of the patient support apparatus to receive instructions therefrom, a plurality of light emitting diodes coupled to the at least one of the plurality of wheels and configured to emit light based on the instructions, and a battery coupled with the plurality of light emitting diodes to provide power to the plurality of light emitting diodes.

12. A patient support apparatus comprising:

a frame positioned above a floor, a siderail coupled to the frame and moveable between a raised position and a lowered position, a plurality of wheels coupled to the frame, the plurality of wheels including a plurality of casters that are moveable between a brake mode in which movement of the plurality of casters is prevented and a non-brake mode in which movement of the plurality of casters is permitted, and a status indicator light assembly coupled with each of the plurality of wheels and configured to change between a first mode in which the status indicator light assembly illuminates a first visual indicator on each of the plurality of wheels in response to a plurality of safety features of the patient support apparatus being enabled and a second mode in which the status indicator light assembly illuminates a second visual indicator different than the first visual indicator on each of the plurality of wheels in response to at least one of the plurality of safety features of the patient support apparatus being disabled, wherein the plurality of safety features includes the plurality of casters, the siderail, and/or the frame.

13. The patient support apparatus of claim 12, wherein the plurality of casters is enabled when the plurality of casters is in the brake mode, and the plurality of casters is disabled when the plurality of casters is in the non-brake mode, and wherein the siderail is enabled when the siderail is in the raised position during which the siderail extends above an upper surface of a mattress of the patient support apparatus, and the siderail is disabled when the siderail is in the lowered position during which the siderails does not extend above the upper surface of the mattress.

14. The patient support apparatus of claim 12, wherein the status indicator light assembly includes a plurality of light emitting diodes and an inductive receiver coupled to the plurality of light emitting diodes and configured to provide power to the plurality of light emitting diodes.

15. The patient support apparatus of claim 12, wherein the frame includes an upper frame and a lower frame arranged between the upper frame and the floor, and wherein the frame is enabled when the upper frame is in a lowered position relative to the lower frame, and the frame is disabled when the upper frame is in a raised position relative to the lower frame.

16. The patient support apparatus of claim 12, wherein the status indicator light assembly is further configured to change to a third mode in which the status indicator light assembly illuminates a third visual indicator on at least one of the plurality of wheels indicative of a patient characteristic, and wherein the third visual indicator is different than the first and second visual indicators, and wherein the first visual indicator is a first color, the second visual indicator is a second color, and the third visual indicator is a third color.

17. A method comprising:

coupling a status indicator light assembly to a plurality of wheels of a patient support apparatus, determining a status of a plurality of casters included in the plurality of wheels, in response to determining that the status of the plurality of casters is a brake mode, changing the status indicator light assembly to a first mode in which the status indicator light assembly illuminates a first visual indicator on at least one of the plurality of wheels, and in response to determining that the status of the plurality of casters is a non-brake mode, changing the status indicator light assembly from the first mode to a second mode in which the status indicator light assembly illuminates a second visual indicator on the at least one of the plurality of wheels different than the first visual indicator.

18. The method claim 17, wherein the non-brake mode is a neutral mode, and wherein the method further comprises, in response to determining that the status of the plurality of casters is a steer mode, changing the status indicator light assembly from the first mode or the second mode to a third mode in which the status indicator light assembly illuminates a third visual indicator on the at least one of the plurality of wheels different than the first and second visual indicators.

19. The method claim 18, further comprising changing the status indicator light assembly to a fourth mode in which the status indicator light assembly illuminates a fourth visual indicator on the at least one of the plurality of wheels indicative of a patient characteristic, and wherein the fourth visual indicator is different than the first, second, and third visual indicators.

20. The method claim 17, wherein the step of coupling includes coupling a wire connector of the status indicator light assembly to the at least one of the plurality of wheels, the wire connector including a first track extending around a respective housing axis of the at least one of the plurality of wheels and a second track extending around the housing axis radially outward of the first track relative to the housing axis.

* * * * *